United States Patent
Kingston et al.

(10) Patent No.: US 10,545,491 B2
(45) Date of Patent: Jan. 28, 2020

(54) SYSTEMS AND METHODS OF USE FOR COMMODITIES ANALYSIS, COLLECTION, RESOURCE-ALLOCATION, AND TRACKING

(71) Applicant: Bext Holdings, Inc., Evergreen, CO (US)

(72) Inventors: Dean Michael Kingston, Arvada, CO (US); Daniel Paul Jones, Evergreen, CO (US); Corey Baker Kashiwa, Bellingham, WA (US)

(73) Assignee: Bext Holdings, Inc., Evergreen, CO (US)

( * ) Notice: Subject to any disclaimer, the term of this patent is extended or adjusted under 35 U.S.C. 154(b) by 219 days.

(21) Appl. No.: 15/703,134

(22) Filed: Sep. 13, 2017

(65) Prior Publication Data
US 2018/0074481 A1    Mar. 15, 2018

Related U.S. Application Data

(60) Provisional application No. 62/531,197, filed on Jul. 11, 2017, provisional application No. 62/394,923, filed on Sep. 15, 2016.

(51) Int. Cl.
*B07C 5/34* (2006.01)
*G05B 19/418* (2006.01)
(Continued)

(52) U.S. Cl.
CPC ...... *G05B 19/41875* (2013.01); *B07C 5/3422* (2013.01); *B07C 5/363* (2013.01);
(Continued)

(58) Field of Classification Search
CPC ..... B07C 5/342; B07C 5/3422; B07C 5/3425; G06T 7/0004; G06T 2207/10016;
(Continued)

(56) References Cited

U.S. PATENT DOCUMENTS 4,773,493 A * 9/1988 Goodier ............... G01G 3/16
177/210 FP
4,963,743 A   10/1990 Satake et al.
(Continued)

FOREIGN PATENT DOCUMENTS

EP       1 733 625 B2     8/2008
WO       1999/058959      11/1999
(Continued)

OTHER PUBLICATIONS

International Search Report and Written Opinion for Int. Appl. No. PCT/US2017/051309 dated Nov. 20, 2017, 15 pp.
(Continued)

*Primary Examiner* — Joseph C Rodriguez
(74) *Attorney, Agent, or Firm* — James A. Sheridan; Sheridan Law, LLC

(57) ABSTRACT

The disclosure provides systems and methods of use in the analysis, collection, resource allocation, and tracking associated with the sale of commodities. Embodiments include a vibratory-and-optical analysis and collection system that may be incorporated into a collection and storage machine. The analysis and collection system and/or the collection and storage machine may be associated with a consumption-based resource-allocation system that determines a payment price for a batch of commodity sold and then digitally allocates all transaction resources to the relevant stakeholders to the commodity sales transaction occurring at the analysis and collection system and/or the collection and storage machine. A commodity-to-consumer tracking system may be provided to track the batch of commodity sold from the point of harvest and sale through to the end consumer. Other embodiments are disclosed.

17 Claims, 49 Drawing Sheets

(51) Int. Cl.
*G06Q 30/04* (2012.01)
*G06T 7/00* (2017.01)
*H04N 5/247* (2006.01)
*B07C 5/342* (2006.01)
*B07C 5/36* (2006.01)
*B07C 5/38* (2006.01)
*G06K 19/07* (2006.01)
*G06Q 20/22* (2012.01)
*G06Q 10/06* (2012.01)
*G06Q 30/02* (2012.01)
*G06Q 10/08* (2012.01)
*H04L 9/06* (2006.01)
*H04N 7/18* (2006.01)
*G06F 3/0484* (2013.01)

(52) U.S. Cl.
CPC ............ *B07C 5/38* (2013.01); *G06K 19/0723* (2013.01); *G06Q 10/06315* (2013.01); *G06Q 10/0833* (2013.01); *G06Q 20/22* (2013.01); *G06Q 30/0283* (2013.01); *G06Q 30/04* (2013.01); *G06T 7/0004* (2013.01); *H04L 9/0643* (2013.01); *H04N 5/247* (2013.01); *H04N 7/181* (2013.01); *G05B 2219/32194* (2013.01); *G05B 2219/32204* (2013.01); *G06F 3/0484* (2013.01); *G06Q 10/06395* (2013.01); *G06T 2207/30128* (2013.01)

(58) Field of Classification Search
CPC .... G06T 2207/30128; G06Q 10/06395; G06Q 10/0833; G05B 19/41875
See application file for complete search history.

(56) References Cited

U.S. PATENT DOCUMENTS

| | | | |
|---|---|---|---|
| 5,034,609 A | | 7/1991 | Satake et al. |
| 5,060,290 A | * | 10/1991 | Kelly ................ B07C 5/342 348/89 |
| 5,152,401 A | | 10/1992 | Affeldt, Jr. et al. |
| 5,241,178 A | * | 8/1993 | Shields ................ G01N 21/359 250/339.02 |
| 5,245,188 A | * | 9/1993 | Satake ................ B07C 5/3416 250/339.06 |
| 5,379,949 A | | 1/1995 | Massen et al. |
| 5,406,084 A | | 4/1995 | Tobler et al. |
| 5,448,069 A | | 9/1995 | Tobler et al. |
| 5,875,437 A | | 2/1999 | Atkins |
| 5,900,634 A | | 5/1999 | Soloman |
| 5,917,927 A | * | 6/1999 | Satake ................ G06T 7/0004 356/237.1 |
| 5,930,773 A | | 7/1999 | Crooks et al. |
| 6,080,950 A | | 6/2000 | Jalink |
| 6,088,688 A | | 7/2000 | Crooks et al. |
| 6,397,678 B1 | * | 6/2002 | Popper ................ G01G 3/13 209/592 |
| 6,630,672 B1 | | 10/2003 | Brotherton et al. |
| 6,721,713 B1 | | 4/2004 | Guheen et al. |
| 6,753,966 B2 | | 6/2004 | Von Rosenberg |
| 6,888,082 B1 | | 5/2005 | Blanc |
| 6,950,806 B2 | | 9/2005 | Dines et al. |
| 7,124,101 B1 | | 10/2006 | Mikurak |
| 7,385,524 B1 | | 6/2008 | Orlosky |
| 7,389,214 B1 | | 6/2008 | Yelich et al. |
| 7,395,193 B1 | | 7/2008 | Yelich et al. |
| 7,447,605 B2 | | 11/2008 | Kuehnrich |
| 7,508,501 B2 | | 3/2009 | Zubkov et al. |
| 7,698,146 B2 | | 4/2010 | Cullen, III |
| 7,716,077 B1 | | 5/2010 | Mikurak |
| 7,830,530 B2 | | 11/2010 | Bjarang |
| 7,889,052 B2 | | 2/2011 | Berardi et al. |
| 8,032,409 B1 | | 10/2011 | Mikurak |
| 8,121,938 B1 | | 2/2012 | Zettner et al. |
| 8,131,599 B2 | | 3/2012 | Farmer et al. |
| 8,165,891 B2 | | 4/2012 | Roberts |
| 8,271,336 B2 | | 9/2012 | Mikurak |
| 8,306,871 B2 | | 11/2012 | Farmer et al. |
| 8,315,903 B2 | | 11/2012 | Zucker |
| 8,341,035 B2 | | 12/2012 | Mesaros |
| 8,364,558 B2 | | 1/2013 | Farmer et al. |
| 8,407,103 B2 | | 3/2013 | Farmer et al. |
| 8,442,675 B2 | | 5/2013 | Wietfrefe |
| 8,468,244 B2 | | 6/2013 | Redlich et al. |
| 8,519,321 B2 | | 8/2013 | Barna et al. |
| 8,533,002 B2 | | 9/2013 | Mesaros |
| 8,552,903 B2 | | 10/2013 | Julian et al. |
| 8,595,020 B2 | | 11/2013 | Marino |
| 8,597,710 B2 | * | 12/2013 | Miljkovic ................ A23F 3/34 426/596 |
| 8,646,685 B2 | | 2/2014 | Bishop et al. |
| 8,682,703 B2 | | 3/2014 | Britton et al. |
| 8,688,462 B2 | | 4/2014 | Gross |
| 8,719,041 B2 | | 5/2014 | Veres et al. |
| 8,732,023 B2 | | 5/2014 | Mikurak |
| 8,837,724 B2 | | 9/2014 | Rose et al. |
| 8,856,015 B2 | | 10/2014 | Mesaros |
| 9,009,058 B2 | | 4/2015 | Erickson et al. |
| 9,031,880 B2 | | 5/2015 | Bishop et al. |
| 9,170,155 B2 | | 10/2015 | Fraley |
| 9,218,585 B2 | | 12/2015 | Gupta et al. |
| 9,454,758 B2 | | 9/2016 | Desai et al. |
| 9,477,988 B2 | | 10/2016 | Haggerty et al. |
| 9,535,563 B2 | | 1/2017 | Hoffberg et al. |
| 9,551,636 B2 | * | 1/2017 | Deppermann ........... A01C 1/00 |
| 10,168,693 B2 | | 1/2019 | Kingston |
| 2002/0063215 A1 | | 5/2002 | Yagita |
| 2002/0133359 A1 | | 9/2002 | Brown |
| 2002/0147596 A1 | | 10/2002 | Vanderboom et al. |
| 2003/0069769 A1 | | 4/2003 | Hoffman et al. |
| 2003/0069772 A1 | | 4/2003 | Roberts et al. |
| 2003/0216971 A1 | | 11/2003 | Sick et al. |
| 2004/0122733 A1 | | 6/2004 | Hanschen et al. |
| 2004/0128196 A1 | | 7/2004 | Shibuno |
| 2004/0135783 A1 | | 7/2004 | Nishimura et al. |
| 2004/0193482 A1 | | 9/2004 | Hoffman et al. |
| 2005/0004682 A1 | | 1/2005 | Gaddis et al. |
| 2005/0072935 A1 | | 4/2005 | Lussier |
| 2005/0098021 A1 | | 5/2005 | Behr et al. |
| 2006/0040024 A1 | | 2/2006 | Srinivasan et al. |
| 2006/0100939 A1 | | 5/2006 | Boyer et al. |
| 2006/0111845 A1 | | 5/2006 | Forbis et al. |
| 2006/0169776 A1 | | 8/2006 | Hornbaker et al. |
| 2007/0153282 A1 | | 7/2007 | Zubkov et al. |
| 2007/0187491 A1 | | 8/2007 | Godwin et al. |
| 2007/0198432 A1 | | 8/2007 | Pitroda et al. |
| 2007/0288247 A1 | | 12/2007 | Mackay |
| 2008/0030348 A1 | | 2/2008 | Pape et al. |
| 2008/0294488 A1 | | 11/2008 | Gupta et al. |
| 2008/0300933 A1 | | 12/2008 | Britton et al. |
| 2009/0254572 A1 | | 10/2009 | Redlich et al. |
| 2010/0153182 A1 | | 6/2010 | Quinn et al. |
| 2010/0181496 A1 | | 7/2010 | Moise et al. |
| 2010/0250497 A1 | | 9/2010 | Redlich et al. |
| 2011/0112684 A1 | * | 5/2011 | Pellenc ................ A01D 46/285 700/223 |
| 2011/0258080 A1 | | 10/2011 | Lunenfeld |
| 2012/0089410 A1 | | 4/2012 | Mikurak |
| 2012/0101831 A1 | | 4/2012 | Pitroda et al. |
| 2012/0101832 A1 | | 4/2012 | Pitroda et al. |
| 2012/0101833 A1 | | 4/2012 | Pitroda et al. |
| 2012/0101834 A1 | | 4/2012 | Pitroda et al. |
| 2012/0101835 A1 | | 4/2012 | Pitroda et al. |
| 2012/0101836 A1 | | 4/2012 | Pitroda et al. |
| 2012/0109667 A1 | | 5/2012 | Pitroda et al. |
| 2012/0109668 A1 | | 5/2012 | Pitroda et al. |
| 2012/0109669 A1 | | 5/2012 | Pitroda et al. |
| 2012/0109670 A1 | | 5/2012 | Pitroda et al. |
| 2012/0109671 A1 | | 5/2012 | Pitroda et al. |
| 2012/0109672 A1 | | 5/2012 | Pitroda et al. |
| 2012/0109673 A1 | | 5/2012 | Pitroda et al. |
| 2012/0109674 A1 | | 5/2012 | Pitroda et al. |
| 2012/0116790 A1 | | 5/2012 | Pitroda et al. |

(56) References Cited

U.S. PATENT DOCUMENTS

| | | |
|---|---|---|
| 2012/0158476 A1 | 6/2012 | Neystadt et al. |
| 2012/0226585 A1 | 9/2012 | Kogan et al. |
| 2013/0046658 A1 | 2/2013 | Hulst et al. |
| 2013/0054308 A1 | 2/2013 | Jagyasi et al. |
| 2013/0144781 A1 | 6/2013 | Evans |
| 2013/0151428 A1 | 6/2013 | Hesse et al. |
| 2013/0168301 A1 | 7/2013 | Dell'Endice et al. |
| 2013/0218646 A1 | 8/2013 | Fargo et al. |
| 2013/0234853 A1 | 9/2013 | Kazerouni |
| 2014/0012698 A1 | 1/2014 | Walker et al. |
| 2014/0095382 A1 | 4/2014 | Desai |
| 2014/0100989 A1 | 4/2014 | Zhang et al. |
| 2014/0129383 A1 | 5/2014 | Farmer et al. |
| 2014/0149170 A1 | 5/2014 | Britton et al. |
| 2014/0172653 A1 | 6/2014 | Sribhibhadh et al. |
| 2014/0214565 A1 | 7/2014 | Takasu et al. |
| 2014/0282198 A1 | 9/2014 | Mayworm |
| 2015/0026011 A1 | 1/2015 | Chow |
| 2015/0039471 A1 | 2/2015 | Clayton et al. |
| 2015/0106281 A1 | 4/2015 | Klavins |
| 2015/0165484 A1 | 6/2015 | Deppermann et al. |
| 2018/0071789 A1 | 3/2018 | Kingston |
| 2018/0075386 A1 | 3/2018 | Kingston |
| 2018/0075406 A1 | 3/2018 | Kingston |

FOREIGN PATENT DOCUMENTS

| | | |
|---|---|---|
| WO | 2005/010505 | 2/2005 |
| WO | 2008/046914 | 4/2008 |
| WO | 2016/118979 A2 | 7/2016 |
| WO | 2018/052968 | 3/2018 |
| WO | 2018/052971 | 3/2018 |
| WO | 2018/052972 | 3/2018 |

OTHER PUBLICATIONS

International Search Report and Written Opinion for Int. Appl. No. PCT/US2017/051314 dated Nov. 28, 2017, 8 pp.

International Search Report and Written Opinion for Int. Appl. No. PCT/US2017/051318 dated Nov. 24, 2017, 17 pp.

International Search Report and Written Opinion for Int. Appl. No. PCT/US2017/051319 dated Nov. 17, 2017, 11 pp.

* cited by examiner

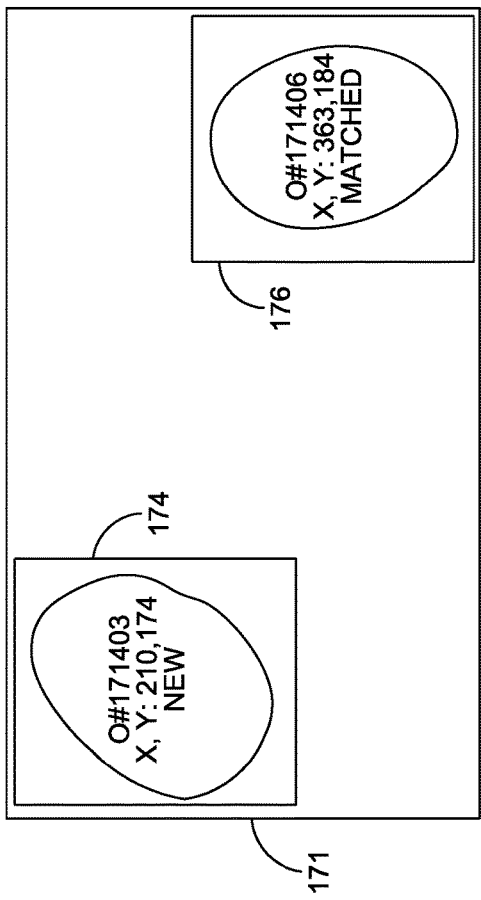
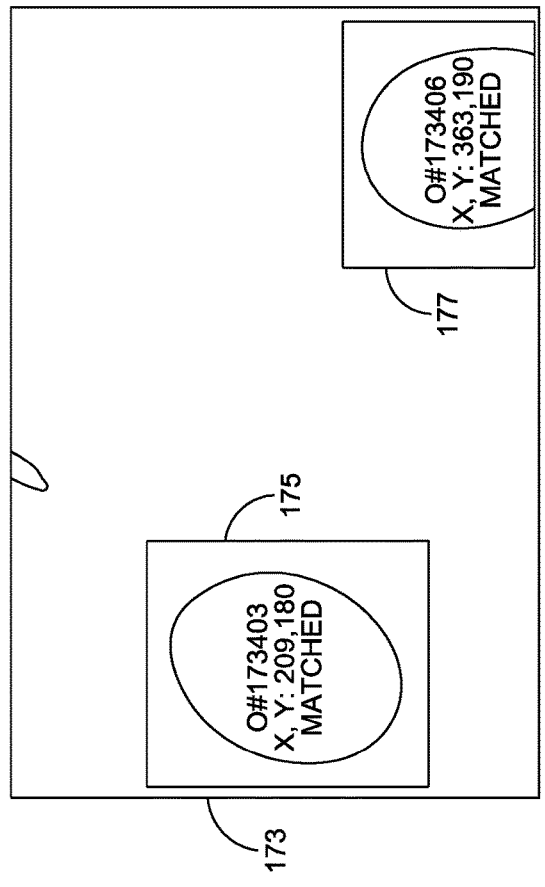
FIG. 8A
FIG. 8B

| Attributes for Samples:82 Batch: NESKGCDBB16047A Transaction#22 | | | | | |
|---|---|---|---|---|---|
| Attribute | Value | Unit | Measure | Group | Method |
| Weight | 53 | double | KG | General | Weight |
| WaterContent | 0.087 | double | percent | General | Calculated |
| TotalDefects | 32 | int | count | Defects | Calculated |
| NYBrazilMethodType | 3-15 | string | calculated | NYBrazilMethod | Calculated |
| NYBrazilMethodPoints | 35 | int | calculated | NYBrazilMethod | Calculated |
| Grade0CoteDIvore | 0.166 | double | percent | CoteDIvore | Image |
| Grade1CoteDIvore | 0.322 | double | percent | CoteDIvore | Image |
| Grade2CoteDIvore | 0.228 | double | percent | CoteDIvore | Image |
| Grade3CoteDIvore | 0.103 | double | percent | CoteDIvore | Image |
| Grade4CoteDIvore | 0.181 | double | percent | CoteDIvore | Image |
| TotalIntrinsicDefects | 0 | int | sum | NYBrazilMethod | Calculated |
| TotalForeignDefects | 7 | int | sum | NYBrazilMethod | Calculated |
| BlackBean | 0 | int | count | IntrinsicDefects | Image |
| SourBeans | 0 | int | count | IntrinsicDefects | Image |
| Shells | 1 | int | count | IntrinsicDefects | Image |
| Green | 2 | int | count | IntrinsicDefects | Image |
| Broken | 0 | int | count | IntrinsicDefects | Image |
| InsectDamage | 0 | int | count | IntrinsicDefects | Image |
| Malformed | 2 | int | count | IntrinsicDefects | Image |
| DriedCherry | 3 | int | count | ForeignDefects | Image |
| Floater | 0 | int | count | ForeignDefects | Image |
| LargeRock | 0 | int | count | ForeignDefects | Image |
| MediumRock | 1 | int | count | ForeignDefects | Image |
| SmallRock | 5 | int | count | ForeignDefects | Image |
| LargeSkin | 0 | int | count | ForeignDefects | Image |
| MediumSkin | 1 | int | count | ForeignDefects | Image |
| SmallSkin | 4 | int | count | ForeignDefects | Image |
| Mesh20 | 0.342 | double | percent | Size | Image |
| Mesh19 | 0.145 | double | percent | Size | Image |
| Mesh18 | 0.125 | double | percent | Size | Image |
| Mesh17 | 0.044 | double | percent | Size | Image |
| Mesh16 | 0.344 | double | percent | Size | Image |
| Mesh15 | 0 | double | percent | Size | Image |

FIG. 9

Coffee Weight & Quality collected on Machine #6 owned by Collector5

| ID T | Stage | Grade | Price ($$) | Quantity (Kg) | Date Created |
|---|---|---|---|---|---|
| 22 | Collection | GradeA | 5.50 | 2.1 | 5/9/2016 10:12:25 |
| 22 | Collection | GradeB | 4.50 | 4.2 | 5/9/2016 10:12:25 |
| 22 | Collection | GradeC | 3.50 | 14.7 | 5/9/2016 10:12:25 |

Buyer Payment Structure for #6 owned by Collector5

```
     Commodity   coffee
      BuyerNum   3
  CollectorNum   5
  SellerPayment  67.50 %
CollectorPayment 20.00 %
 Bank Covenant % 20.00 %
    Bank Total % 4%
 CollectorTotal% 16%
    CoopPayment  10.00 %
 ServicePayment  2.50 %
```

Assumed Coffee Quality Percentages for Machine #6 owed by Collector5

| SupplyChainStage | QualityGrade | QualityPercent |
|---|---|---|
| Collection | GradeA | 10.00 % |
| Collection | GradeB | 20.00 % |
| Collection | GradeC | 70.00 % |
| Washing | GradeA | 20.00 % |
| Washing | GradeB | 30.00 % |
| Washing | GradeC | 50.00 % |
| Export | GradeA | 30.00 % |
| Export | GradeB | 35.00 % |
| Export | GradeC | 35.00 % |

FIG. 24A

Loan from Bank1 for Machine #6 owned by Collector5

| M# | L# | T# | Total | Int Due | Int Paid | Prin Paid | Orig Loan | Remain | Current |
|---|---|---|---|---|---|---|---|---|---|
| 6 | 6 | 23 | 3.27 | 0.00 | 0.00 | 3.27 | 1800.00 | 595.83 | 10/10/2017 12:02:58 AM |
| 6 | 6 | 22 | 3.27 | 1.88 | 1.88 | 1.39 | 1800.00 | 599.11 | 10/9/2017 10:12:25 PM |
| 6 | 6 | 21 | 3.27 | 5.15 | 3.27 | 0.00 | 1800.00 | 600.51 | 10/9/2017 10:09:33 PM |

Payments Made from Buyer1 for Transaction #22

| ID P | ID T | Payment From | Payment To | Cur $$ | Payment Reason | Date |
|---|---|---|---|---|---|---|
| 172 | 22 | Buyer1 | Seller2 | 55.28 | Collection | 10/9/2017 10:12:25 PM |
| 173 | 22 | Buyer1 | Collector5 | 13.10 | Collection | 10/9/2017 10:12:25 PM |
| 174 | 22 | Buyer1 | Bank1 | 3.27 | Collection | 10/9/2017 10:12:25 PM |
| 175 | 22 | Buyer1 | Coop1 | 8.19 | Collection | 10/9/20167 10:12:25 PM |
| 176 | 22 | Buyer1 | ServiceProvider1 | 2.04 | Collection | 10/9/2017 10:12:25 PM |

FIG. 24B

SYSTEMS AND METHODS OF USE FOR COMMODITIES ANALYSIS, COLLECTION, RESOURCE-ALLOCATION, AND TRACKING

REFERENCE TO PENDING PRIOR PATENT APPLICATIONS

This application claims the benefit under 35 U.S.C. 119(e) of U.S. Provisional Patent Application Nos. 62/394,923, filed Sep. 15, 2016 by Dean Michael Kingston, Daniel Paul Jones, and Corey Baker Kashiwa for "COMMODITIES COLLECTION, ANALYSIS, AND COMPENSATION SYSTEM," and 62/531,197, filed Jul. 11, 2017 by Dean Michael Kingston, Daniel Paul Jones, and Corey Baker Kashiwa for "COMMODITIES COLLECTION, ANALYSIS, AND COMPENSATION SYSTEM," both of which patent applications are hereby incorporated herein by reference.

BACKGROUND

The global leasing industry currently exceeds over $1 Trillion in new leases annually, and the total value of loans globally has surpassed $134 Trillion. Greater than 40% of global banking revenue comes from interest, fees, and origination charges associated with these leases and loans, most of which are linked to assets that are rapidly being linked to the Internet through Internet of Things ("IoT") technology.

Recent data from the International Finance Corporation ("IFC") indicates a global financing shortfall that exceeds $2.5 Trillion and suggests that an estimated one-half to two-thirds of small and medium businesses lack proper access to finance. A large portion of this shortfall is caused by the high cost to financial institutions to monitor and collect payment on loans and leases. That is, due to the high cost and inefficiency in payment collection, financial institutions often forego financing opportunities. As a result, potential banking customers are unable to secure financing, which ripples through the global economy in the form of lost interest, fees, and charges on the institutional level, as well as lost innovation, economic and business development, and revenue opportunities on the banking-consumer level.

Certain banking customer segments—namely millennials, small businesses, and the under-banked of emerging and/or developing economies—present factors that make the customer segments amenable to improvements in asset-backed, loan-related banking and financial technologies. These customer segments present sensitivity to cost and an openness to remote payment delivery and distribution. These customer segments are also large in size, which creates an opportunity for technological improvements in the areas of monitoring and collection of loan and lease payments to have a significant impact in terms of efficiency, cost reduction, and scaling sustainable businesses that add value.

In cases of loans collateralized by commodity assets, loan and lease payments are often made from the proceeds of commodity sales. In these instances, remote payment may hinge on real-time, accurate, and yet remote analysis and collection of the commodity asset(s) being sold in exchange for payment proceeds to be applied to the collateralized loan. Existing remote commodity analysis systems present numerous challenges in terms of analysis capabilities, depth of analysis, and analysis system integration into larger resource-allocation and commodity tracking platforms.

SUMMARY

This Summary is provided to introduce a selection of concepts in a simplified form that are further described below in the Detailed Description. This Summary is not intended to identify key aspects or essential aspects of the claimed subject matter. Moreover, this Summary is not intended for use as an aid in determining the scope of the claimed subject matter One embodiment provides a system for analyzing a quality of a batch of commodity particles. The system may include (1) a material hopper having an inlet and an outlet, the inlet configured to receive the batch of the commodity particles; (2) a vibratory assembly, comprising (a) a vibratory input feeder; and (b) a vibratory plate having a proximal end and a distal end, the vibratory plate positioned to receive at the proximal end a continuous stream of the commodity particles exiting the outlet of the material hopper, the vibratory input feeder configured to vibrate the vibratory plate, causing the vibratory plate to repeatedly apply a vibrational force to each of the commodity particles on the vibratory plate, thereby translating each of the commodity particles toward the distal end of the vibratory plate by an incremental displacement with each application of the vibrational force; (3) a first imaging assembly comprising a first camera, the first imaging assembly configured to capture a first image set of each of the commodity particles as they translate from the proximal end toward the distal end of the vibratory plate; (4) a second imaging assembling comprising second and third cameras, the second imaging assembly configured to capture second and third image sets of each of the commodity particles as they free fall from the distal end of the vibratory plate; and (5) one or more processors communicatively coupled with the vibratory assembly, the first imaging assembly, and the second imaging assembly, the one or more of the processors executing an analysis and collection module that uses the first, the second, and the third image sets, along with the vibrational force applied to each of the commodity particles, to perform a quality analysis for each of the commodity particles.

Another embodiment provides an optical-sorting system for commodity particles, the optical-sorting system having a quality analysis system. The quality analysis system may include (1) a vibratory plate having a proximal end in receipt of a stream of the commodity particles and a distal end, the vibratory plate configured to repeatedly apply a vibratory force to the stream of the commodity particles to translate each of the commodity particles proximally-to-distally through incremental displacements of each of the commodity particles in response to each application of the vibratory force; (2) at least two cameras configured to capture a series of images of each of the commodity particles translating proximally-to-distally across the vibratory plate and falling from the distal end of the vibratory plate; and (3) a processor communicatively coupled with the at least two cameras, the processor executing an analysis and collection module to: (a) based on data collected from the series of the images and the vibratory force applied to the commodity particles translating across the vibratory plate, determine a number of analysis attributes associated with each of the commodity particles; and (b) based on the number of the analysis attributes, sort each of the commodity particles into acceptable particles that are retained or defective particles that are rejected.

Yet another embodiment provides method for analyzing a batch of commodity particles using a quality analysis system including (1) a vibratory assembly including a vibratory input feeder coupled with a vibratory plate having a proximal end and a distal end, (2) a material hopper positioned to feed material to the proximal end of the vibratory plate, (3) an overhead imaging assembly having a first camera positioned to view a first image-capture zone located on a top surface of the vibratory plate, (4) an imaging box assembly having a distally-facing second camera and a proximally-facing third camera positioned to view a second image-capture zone located below the distal end of the vibratory plate, and (5) a processor communicatively coupled with the vibratory assembly, the overhead imaging assembly, and the imaging box assembly, the processor configured to execute an analysis and collection module. The method may include the steps of (a) dispensing a batch of commodity particles into the material hopper; (b) actuating the vibratory input feeder to repeatedly generate a vibratory force that is applied by the vibratory plate to the commodity particles exiting the material hopper onto the proximal end of the vibratory plate, causing the commodity particles to translate proximally-to-distally across the vibratory plate; (c) using the overhead imaging assembly, capturing a first set of images of each of the commodity particles as the commodity particles move through the first image-capture zone; (d) using the imaging box assembly, capturing second and third sets of images of each of the commodity particles after the commodity particles fall from the distal end of the vibratory plate and move through the second image-capture zone; and (e) using the processor along with the analysis and collection module, analyzing each of the commodity particles to determine a number of analysis attributes associated with each of the commodity particles.

Another embodiment provides a commodity analysis, collection, and storage machine for a batch of commodity particles. The commodity analysis, collection, and storage machine may include (1) an outer shell; (2) an analysis system disposed within the outer shell, the analysis system comprising a vibratory assembly and an imaging assembly communicatively coupled with an analysis processor for executing an analysis and collection module to, based on data collected from the vibratory assembly and the imaging assembly, determine a number of analysis attributes associated with each of the commodity particles and, based on the number of the analysis attributes, optically sort the batch of the commodity particles into acceptable particles and defective particles; (3) a collection system disposed within the outer shell and adjacent to the analysis system, the collection system comprising a weigh hopper supported by a weigh scale lift assembly, the collection system configured to collect the acceptable particles from the analysis system in the weigh hopper and measure a total weight of the acceptable particles collected within the weigh hopper; (4) a bulk storage container disposed within the outer shell and adjacent to the collection system, the bulk storage container configured to receive the acceptable particles from the collection system; and (5) a display system having a graphical user interface configured to facilitate user operation of the commodity analysis, collection, and storage machine.

Yet another embodiment provides a machine for processing a batch of commodity particles pursuant to a sales transaction for the batch of the commodity particles. The machine may include (1) a weather-proof shell, the weather-proof shell comprising a locking access door; (2) two analysis and collection systems disposed adjacent to one another within the weather-proof shell, each of the analysis and collection systems comprising: (a) an analysis system configured to receive the batch of the commodity particles, analyze each of the commodity particles, and optically sort each of the commodity particles according to whether the particle is an acceptable particle or a defective particle; (b) a collection system comprising a weigh hopper supported by a weigh hopper mount disposed above a weigh scale lift assembly; and (c) a good product chute positioned at an outlet of the analysis system, the good product chute positioned to gravity feed the acceptable particles from the analysis system to the weigh hopper of the collection system, wherein the weigh scale lift assembly is configured to lift a weigh scale until the weigh hopper is supported upon the weigh scale such that the weigh scale registers a total weight of the acceptable particles within the weigh hopper. The machine may also include (3) a bulk storage container disposed adjacent the two analysis and collection systems and within the weather-proof shell; and (4) a material collection chute configured to gravity feed the acceptable particles from the weigh hopper into the bulk storage container.

A further embodiment may provide a method of transacting a sale for a batch of commodity particles using an analysis, collection, and storage machine comprising a weather-proof shell that contains analysis system having a vibratory assembly and one or more imaging assemblies communicatively coupled with an analysis processor, a collection system having a weigh hopper suspended above a weigh scale of a weigh scale lift assembly, and a storage system adjacent to the collection system. The method may include (1) receiving, within a material hopper of the analysis system, the batch of the commodity particles; (2) feeding the batch of the commodity particles from the material hopper to the vibratory assembly; (3) applying, via the vibratory assembly, a repetitive vibrational force to each of the commodity particles; (4) recording, via the one or more of the image assemblies, a volume of each of the commodity particles and a response of each of the commodity particles to the repetitive vibrational force; (5) determining, by the analysis processor and based on the volume and the response to the repetitive vibrational force of each of the commodity particles, a number of analysis attributes associated with each of the commodity particles; (6) determining, by the analysis processor and based on the number of the analysis attributes associated with each of the commodity particles, whether each of the commodity particles is an acceptable particle or a defective particle; (7) gravitationally passing, via a good product chute, each of the acceptable particles to the weigh hopper of the collection system; (8) raising the weigh scale lift assembly until the weigh hopper is isolated on the weigh scale; (9) determining, using the weigh scale, a total weight of the acceptable particles; and (10) gravitationally passing, via a material collection chute, the acceptable particles to the storage system.

An additional embodiment provides a resource-allocation system. The resource-allocation system may include (1) a consumption-based sales system having one or more sensors for acquiring a record of a sales transaction for a transfer of a product or a rendering of a service; (2) a memory for storing transaction data including one or more of a quality and a quantity of the product or the service subject to the sales transaction, stakeholder data including a number of stakeholders to the sales transaction, and resource-allocation data including a payment structure that applies to the sales transaction; and (3) an allocation processor that is configured to manage an allocation of resources for the sales transaction by performing the steps of: (a) recording the transfer of the product or the rendering of the service; (b) determining a payment price for the product or the service; (c) collecting the payment price; and (d) automatically distributing the payment price for the sales transaction amongst the stakeholders to the transaction according to the payment structure.

Still another embodiment provides a system for determining, collecting, and distributing a payment price for a sales transaction involving a transfer of a batch of material particles. The system may include a material analysis and collection system for receiving the batch of the material particles and analyzing each of the material particles, the material analysis and collection system comprising a vibratory assembly and one or more imaging assemblies communicatively coupled with an analysis processor configured to execute an analysis and collection module for determining a quality rating associated with the batch of the material particles. The system may also include a memory and an allocation processor configured for: (1) storing a transaction record associated with the sales transaction for the batch of the material particles, the transaction record including transaction data comprising the quality rating and a quantity associated with the batch of the material particles, stakeholder data including a number of stakeholders to the sales transaction, and resource-allocation data including a payment structure that applies to the sales transaction; (2) determining, based upon at least the quality rating and the quantity associated with the batch of the material particles, the payment price for the batch of the material particles; (3) collecting the payment price; and (4) automatically distributing the payment price amongst the number of the stakeholders to the transaction according to the payment structure.

Yet another embodiment provides a method of managing a sales transaction involving a product or a service, the method comprising: (1) operating a consumption-based sales system having one or more sensors for (a) transferring the product or rendering the service; and (b) generating a transaction record associated with the sales transaction, the transaction record including transaction data comprising a quality rating and a quantity associated with the product or the service, stakeholder data detailing a number of stakeholders to the sales transaction, and resource-allocation data including a payment structure that governs a distribution of a payment price for the sales transaction. The method also includes (2) storing the transaction record in a memory; (3) determining, using an allocation processor executing a resource-allocation module and based on the quality rating and the quantity associated with the product or the service, the payment price for the transfer of the product or the rendering of the service; (4) collecting, using the allocation processor executing the resource-allocation module, the payment price; and (5) automatically distributing, using the allocation processor executing the resource-allocation module, the payment price amongst the number of the stakeholders to the transaction according to the payment structure.

Still another embodiment provides a method of tracking a batch of commodity particles from a point of harvest to an end consumer, the method comprising: (1) obtaining a transaction record of a commodity sales transaction from an analysis and collection system for receiving, analyzing, and collecting the batch of the commodity particles, the analysis and collection system comprising a quality analysis subsystem and a collection subsystem; (2) storing in a memory a set of tracked variables from the transaction record; (3) generating, by a tracking processor, a tracking identifier associated with the set of the tracked variables; (4) associating the tracking identifier with a portion of the batch of the commodity particles; (5) at a next point in the supply chain for the portion of the batch of the commodity particles, updating the set of the tracked variables; (6) repeating the steps (3) through (5) until the portion of the batch of the commodity particles is transferred to an end consumer; and (7) transmitting, by the tracking processor via one or more communication channels, the set of the tracked variables to a computing device of the end consumer.

A further embodiment provides a tracking method for a commodity sales transaction. The method includes (1) operating a commodity analysis, collection, and storage machine to obtain a set of analysis and collection data associated with a batch of commodity particles, the commodity analysis, collection, and storage machine comprising: (a) at least one analysis assembly having a vibratory assembly and one or more cameras coupled with an analysis processor that executes an analysis and collection module to analyze each of the commodity particles and determine whether each of the commodity particles is an acceptable particle or a defective particle; (b) at least one collection assembly configured to collect the acceptable particles from the analysis assembly and measure a total weight of the acceptable particles collected from the analysis assembly; and (c) at least one bulk storage container positioned adjacent to the at least one collection assembly and configured to receive and store the acceptable particles collected by the at least one collection assembly. The method may also include (2) storing, in a tracking database of a memory, the set of the analysis and collection data obtained by the commodity analysis, collection, and storage machine, a set of harvest data, and a set of transaction-allocation data; (3) generating, using a tracking processor, a tracking identifier that maps to the set of the analysis and collection data, the set of the harvest data, and the set of the transaction-allocation data in the tracking database; (4) associating the tracking identifier with an electronic tracking tag; (5) associating the electronic tracking tag with the acceptable particles stored in the bulk storage container; (6) at a next step in the supply chain, storing in the tracking database a set of downstream supply chain data; and (7) updating the tracking identifier to additionally map to the set of the downstream supply chain data in the tracking database.

Another embodiment provides a system for tracking a batch of commodity particles transferred in a sales transaction. The system may include (1) an analysis system having (a) a vibratory plate having a proximal end in receipt of a stream of the commodity particles and a distal end, the vibratory plate configured to repeatedly apply a vibratory force to the stream of the commodity particles to translate each of the commodity particles proximally-to-distally through incremental displacements of each of the commodity particles in response to each application of the vibratory force; (b) at least two cameras configured to capture a series of images of each of the commodity particles translating proximally-to-distally across the vibratory plate and falling from the distal end of the vibratory plate; and (c) an analysis processor communicatively coupled with the at least two cameras, the analysis processor executing an analysis and collection module to obtain a set of analysis and collection data associated with the batch of the commodity particles transferred in the sales transaction. The system may also include (2) a memory for storing the set of the analysis and collection data, a set of harvest data, a set of transaction-allocation data, and a set of downstream supply chain data; (3) an electronic tracking tag for association with the batch of the commodity particles, the electronic tracking tag configured to store a unique tracking identifier that maps to the set of the analysis and collection data, the set of the harvest data, the set of the transaction-allocation data, and the set of the downstream supply chain data stored in the memory; and (3) a tracking processor that is configured to:

(a) generate the unique tracking identifier at the sales transaction; (b) update the set of the analysis and collection data, the set of the harvest data, the set of the transaction-allocation data, and the set of the downstream supply chain data after each step in a supply chain for the batch of the commodity particles; and (c) update the unique tracking identifier after each step in the supply chain for the batch of the commodity particles.

Other embodiments, and other variations on the above embodiments, are also disclosed.

Additional objects, advantages and novel features of the technology will be set forth in part in the description which follows, and in part will become more apparent to those skilled in the art upon examination of the following, or may be learned from practice of the technology.

BRIEF DESCRIPTION OF THE DRAWINGS

Non-limiting and non-exhaustive embodiments of the present invention, including the preferred embodiment, are described with reference to the following figures, wherein like reference numerals refer to like parts throughout the various views unless otherwise specified. Illustrative embodiments of the invention are illustrated in the drawings, in which:

FIGS. 8A-8B illustrate exemplary image frames captured of individual commodity particles flowing through the quality analysis system of FIGS. 5-7;

FIG. 9 provides an exemplary set of commodity-batch analysis results generated by the quality analysis system of FIGS. 4-7;

FIGS. 24A-B illustrate an exemplary embodiment of a payment summary produced by the consumption-based resource-allocation system of FIG. 23;

DETAILED DESCRIPTION

Figure 1:
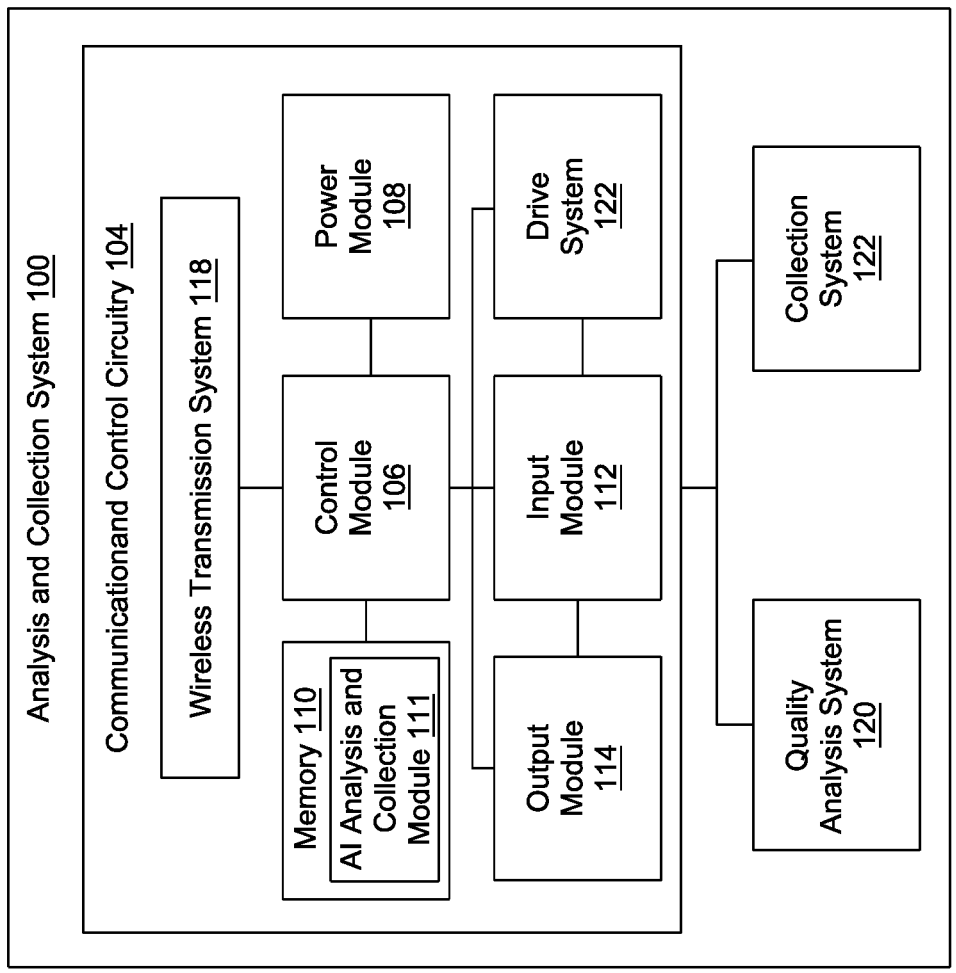
FIG. 1 provides a functional schematic of one embodiment of a commodity analysis and collection system.

Embodiments are described more fully below in sufficient detail to enable those skilled in the art to practice the disclosed systems and methods. However, embodiments may be implemented in many different forms and should not be construed as being limited to the embodiments set forth herein. The following detailed description is, therefore, not to be taken in a limiting sense.

Overview

As discussed above in the Background section, a large percentage of global banking revenue comes from interest, fees, and origination charges associated with loans that are linked to assets. Oftentimes the assets in question are commodities, or farmed agricultural products or mined raw materials that can be bought and sold, such as coffee, rubber, cashews, cocoa, palm oil, copper, tin, gold, tungsten, and so on. Turning to an example of a farmer who has received a bank loan linked to a harvest of coffee cherries in an emerging economy (e.g., Ethiopia, Kenya, Rwanda, Burundi, etc.), the existing process of selling the commodity to make loan payments involves a number of inefficiencies.

From the farmer's perspective, once the farmer harvests the goods, she is forced to sell to an intermediary at a low price or risk not getting paid. The local intermediary sells the harvest to the next party in the supply chain (e.g., the international processor or trader), and the farmer has no link with other steps in the supply chain, especially not with overseas wholesalers, retailers, and/or consumers, and the farmer does not receive real-time feedback regarding the quality of the product sold. Within this system, the farmer is generally forced to travel a long distance to sell goods to a reputable intermediary, or alternatively, the farmer is forced to accept an artificially low price or even only a promise of payment from a collector intermediary that comes to the farmer's farm or village. Today's payments are oftentimes 30-40% of the payments made in the 1990s.

At the time of sale, goods are typically purchased based on weight and an intermediary/collector's subjective assumption of quality. Any subsequent product analysis is performed on aggregated batches collected from many different farmer sellers, with only a small sample of the larger collective batch being hand selected and analyzed. This process is antiquated and doesn't produce consistent results that are relevant to any individual farmer seller, further obscuring the seller's feedback regarding the quality of his or her product and the price he or she can command.

Currently, payment to the farmer seller is generally made at the discretion of the buyer, as many buyers have a monopoly in rural, developing markets. Payments to the farmer seller are generally made by the intermediary/collector in cash or are merely promised, and cash payments can create security issues in remote areas.

If fair trade payments are targeted for payment to the farmer seller, much of the funds supposedly allotted for the payments are used to calculate the payments themselves, and payments can take months to be completed. Social initiative entities (e.g., Church, Hospital, Internet, Power, and School ("CHIPS") initiatives) are handled separately from product sales transactions and outside of the supply chain. As a result, such payments are not determined by the local community.

After payment to the farmer seller, the seller must separately arrange a loan or lease payment to the lending bank, further complicating and possibly compromising the ultimate payment due. Because there is no link between the farmer seller and the supply chain and/or the farmer seller and the bank, the lending bank must independently monitor asset/product performance, location, and payments to ensure the loan is performing.

Once the commodity product is sold by the farmer seller to the intermediary/collector, it is processed for shipping to foreign markets with little traceability to the origin of the product. As a result, the international trader buys large lots without traceability to the local suppliers of the product. This lack of transparency and traceability flows through to the wholesaler, the roaster, the coffee shop, and ultimately, the consumer, all who cannot know the details and/or the impact of the coffee they are purchasing.

Thus, current systems fail to provide for remote, real-time, in-depth, and accurate commodity analysis, as well as commodity collection, stakeholder payment/resource allocation based on the analysis and the collection, and tracking of the purchased batch of commodity as it progresses through the supply chain. As a whole, the current process by which the commodity supplier/seller, the financial institution, and the various parties and/or stakeholders throughout the supply chain transact commodity sales for the repayment of loans linked to commodities is inefficient, error prone, vulnerable to corruption, and unapproachable for all of the stakeholders involved. The process also undermines the social and quality initiatives that are important to many international consumers. The systems and methods described below provide technical solutions that address the existing challenges presented with collecting and analyzing a batch of commodity particles pursuant to a sales transaction, digitally and contemporaneously compensating or allocating resources appropriately amongst all stakeholders to the transaction, and tracking the batch of sold commodity particles through the supply chain, from the seller through to the end consumer, for publication and review by all of the stakeholders to the initial transaction and the various points along the supply chain.

Exemplary Systems and Methods

The technology discussed herein relates to systems and methods by which commodities may be efficiently and contemporaneously analyzed, collected, and sold using a commodity analysis and collection system and a commodity collection, analysis, and storage machine, with appropriate compensation automatically being deposited within the associated accounts of the various stakeholders to the transaction, as well as supply-chain tracking and publication to the various stakeholders to the transaction, including the commodity farmer or seller (the "seller"), the financial institution/lender (the "bank"), the collector-machine owner or operator (the "collector"), collector-machine personnel, machine-maintenance providers, social-initiative entities, coop/fair-trade entities, government entities (i.e., for tax payments), the buyer (e.g., an international trader), the wholesaler, the retailer, the consumer, and/or any other relevant and/or appropriate stakeholder(s) to the transaction.

Various embodiments of the disclosed analysis, collection, resource allocation, and tracking systems and methods enable efficient loan or lease payments to be made based upon the sale of loan and lease assets/commodities. Essentially the disclosed systems and methods enable loan assets to execute loan and lease payments, purchase supplies, and pay for collector-machine maintenance and support. The analysis, collection, compensation, and tracking systems and methods also enable a loan/lease "repay-as-you-go" regime that accounts for all of the stakeholders to the commodity sales transaction, all while providing the seller with real-time feedback regarding the quality of product sold and creating a traceable supply chain that may be viewed and relied upon by later purchasing, processing, and/or consuming parties.

Generally, when elements are referred to as being "connected" or "coupled," the elements can be directly connected or coupled together or one or more intervening elements may also be present. In contrast, when elements are referred to as being "directly connected" or "directly coupled," there are no intervening elements present.

The subject matter may be embodied as devices, systems, methods, and/or computer program products. Accordingly, some or all of the subject matter may be embodied in hardware and/or in software or in a combination thereof (including firmware, resident software, micro-code, state machines, gate arrays, etc.). As used herein, a software component may include any type of computer instruction or computer executable code located within or on a non-transitory computer-readable storage medium/memory. A software component may, for instance, comprise one or more physical or logical blocks of computer instructions, which may be organized as a routine, program, object, component, data structure, etc., that performs one or more tasks or implements particular data types.

Furthermore, the subject matter may take the form of a computer program product on a computer-usable or computer-readable storage medium/memory having computer-usable or computer-readable program code embodied in the medium for use by or in connection with an instruction execution system. In the context of this document, a computer-usable or computer-readable storage medium may be any medium that can contain, store, communicate, propagate, or transport the program for use by or in connection with the instruction execution system, apparatus, or device. The computer-usable or computer-readable medium may be, for example but not limited to, an electronic, magnetic, optical, electromagnetic, infrared, ultraviolet, or semiconductor system, apparatus, device, or propagation medium. By way of example, computer readable media may comprise computer storage media and communication media.

Computer storage media/memory includes volatile and nonvolatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium that can be used to store the desired information and that can be accessed by an instruction execution system. Note that the computer-usable or computer-readable medium could be paper or another suitable medium upon which the program is printed, as the program can be electronically captured, via, for instance, optical scanning of the paper or other medium, then compiled, interpreted, of otherwise processed in a suitable manner, if necessary, and then stored in a computer memory.

Communication media typically embodies computer readable instructions, data structures, program modules, or other data in a modulated data signal such as a carrier wave or other transport mechanism and includes any information delivery media/network channel. The term "modulated data signal" means a signal that has one or more of its characteristics set or changed in such a manner as to encode information in the signal. By way of example, and not limitation, the term communication media or channel includes wired media such as a wired network or direct-wired connection, and wireless media such as satellite, wireless networking technologies (e.g., Wi-Fi, WLAN, WiMAX), acoustic, RF, infrared, Bluetooth, and other wireless media. Combinations of the any of the above should also be included within the scope of communication media and/or channels.

When the subject matter is embodied in the general context of computer-executable instructions, the embodiment may comprise program modules or tools, executed by one or more systems, computers, processors, or other devices. Generally, program modules include routines, programs, objects, components, data structures, etc. that perform particular tasks/functions or implement particular data types. Typically, the functionality of the program modules may be combined or distributed as desired in various embodiments. Software implementations may include one or more computer programs comprising executable code/instructions that, when executed by a processor, may cause the processor to perform a method defined at least in part by the executable instructions. The computer program/module can be written in any form of programming language, including complied or interpreted languages, and can be deployed in any form, including as a standalone program or as a module, component, subroutine, or other unit suitable for use in a computing environment.

Commodity Analysis and Collection System

Figure 2:
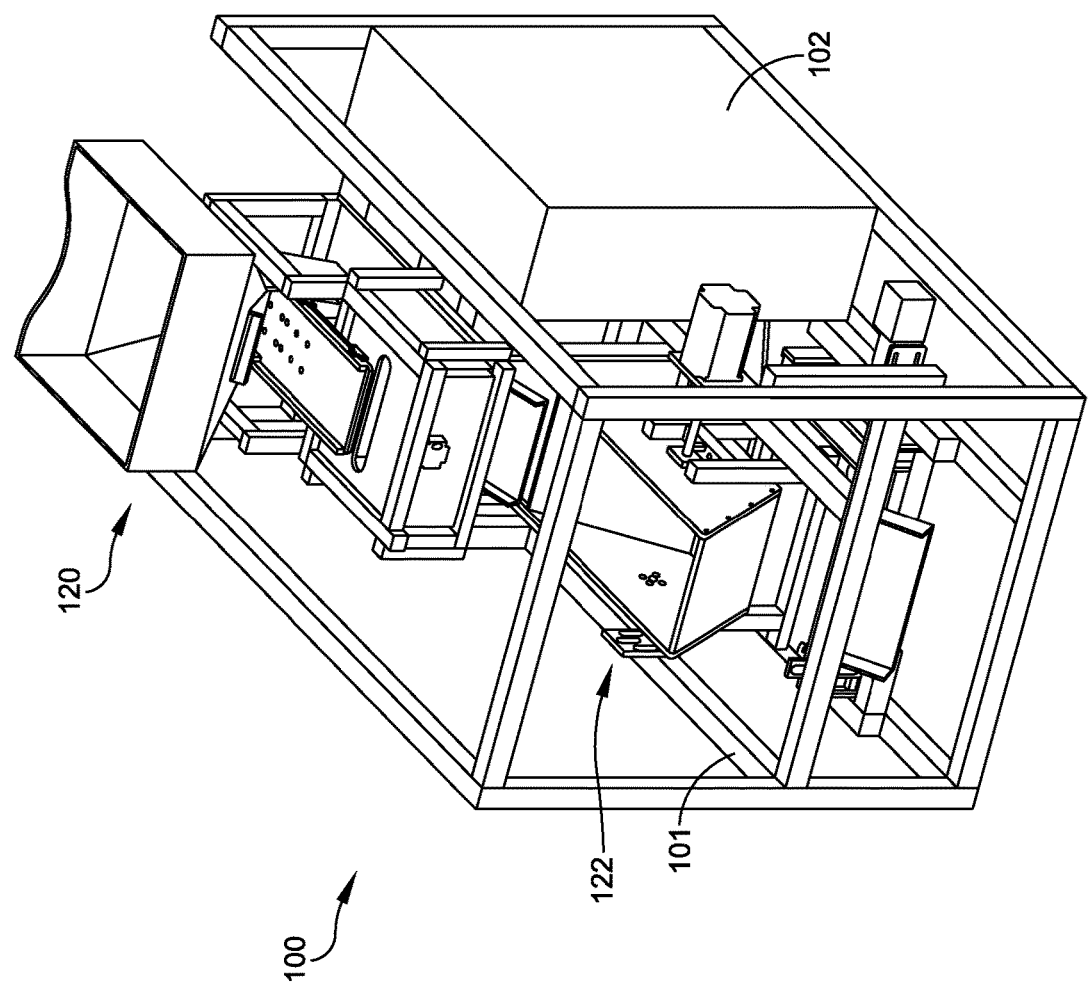
FIG. 2 illustrates a perspective view of the commodity analysis and collection system of FIG. 1.
Figure 3:
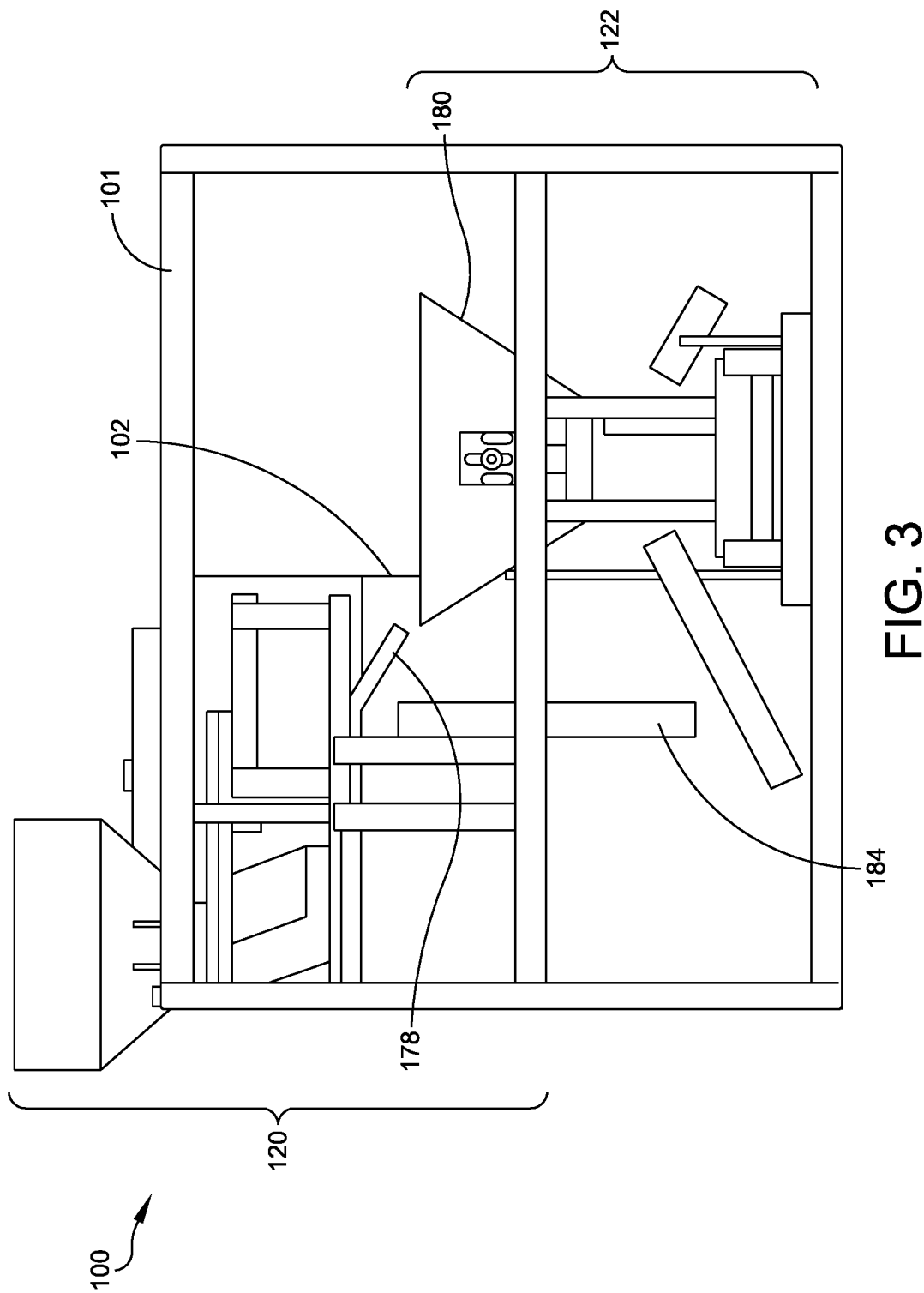
FIG. 3 illustrates a side view of the commodity analysis and collection system of FIG. 1.

FIG. 1 provides a functional block diagram of one embodiment of a commodity analysis and collection system 100 for analyzing each individual object or particle forming a collective batch of commodity particles dispersed into the system 100. FIGS. 2-3 illustrate perspective and side views of the analysis and collection system 100. For explanatory purposes, the systems and methods disclosed herein are discussed in terms of a batch of coffee cherries. However, it should be understood that the disclosed systems and methods may apply to any appropriate batch of material or particles including, by way of limited example, a batch of coffee parchment, cocoa, nuts, mined ore, cooking oil, and/or fish and seafood products (e.g., scallops).

Turning to FIGS. 1-3, this embodiment of the analysis and collection system 100 includes a frame 101 that supports a quality analysis system 120 and a collection system 122, both communicatively coupled with communication and control circuitry 104 housed within an electrical panel 102. The frame 101 may form a ridged, open base that provides a support structure for the components discussed below. The frame 101 may comprise a welded steel and/or aluminum extrusion construction and may be powder coated to guard against humidity, heat, and other extreme conditions. The frame 101 may feature an open plan to provide necessary component support as well as allow product transfer into and out of the quality analysis system 120 and the collection system 122.

In this embodiment, the communication and control circuitry 104 incorporates a number of components that combine to power and control the system 100, including a primary control module 106 configured to control system functionality. The control module 106 may be one or more analysis microprocessors, microcontrollers, Application Specific Integrated Circuits (ASICs), and/or the like coupled with a memory 110 storing an artificial intelligence (AI) analysis and collection module 111. The control module 106 is configured to execute the AI analysis and collection module 111 to cause the system 100 to carry out a number of material analysis and collection functions, detailed further below.

In this embodiment, the control module 106 is also operatively coupled with a power module 108, which may include a battery power supply, an inverter, and a safety system including grounding, insulation, and one or more safety switches, and which may be associated with a supplemental solar power system (not shown). The primary control module 106 may also be communicatively coupled with an input module 112 that controls system sensors and monitors the states of system equipment, an output module 114 that drives system equipment actions as the system 100 processes the batch of material, and a drive system 116 that includes and/or operatively couples with system/equipment motors (e.g., gear motors, stepper motors). The primary control module 106 is further coupled with a wireless transmission system 118 equipped with wireless networking and communications technologies such as, for example, satellite, radio, Wi-Fi, cellular, and/or Bluetooth transmitters, receivers, transponders, and/or transceivers for connecting the system to the Internet/intranet.

Figure 4:
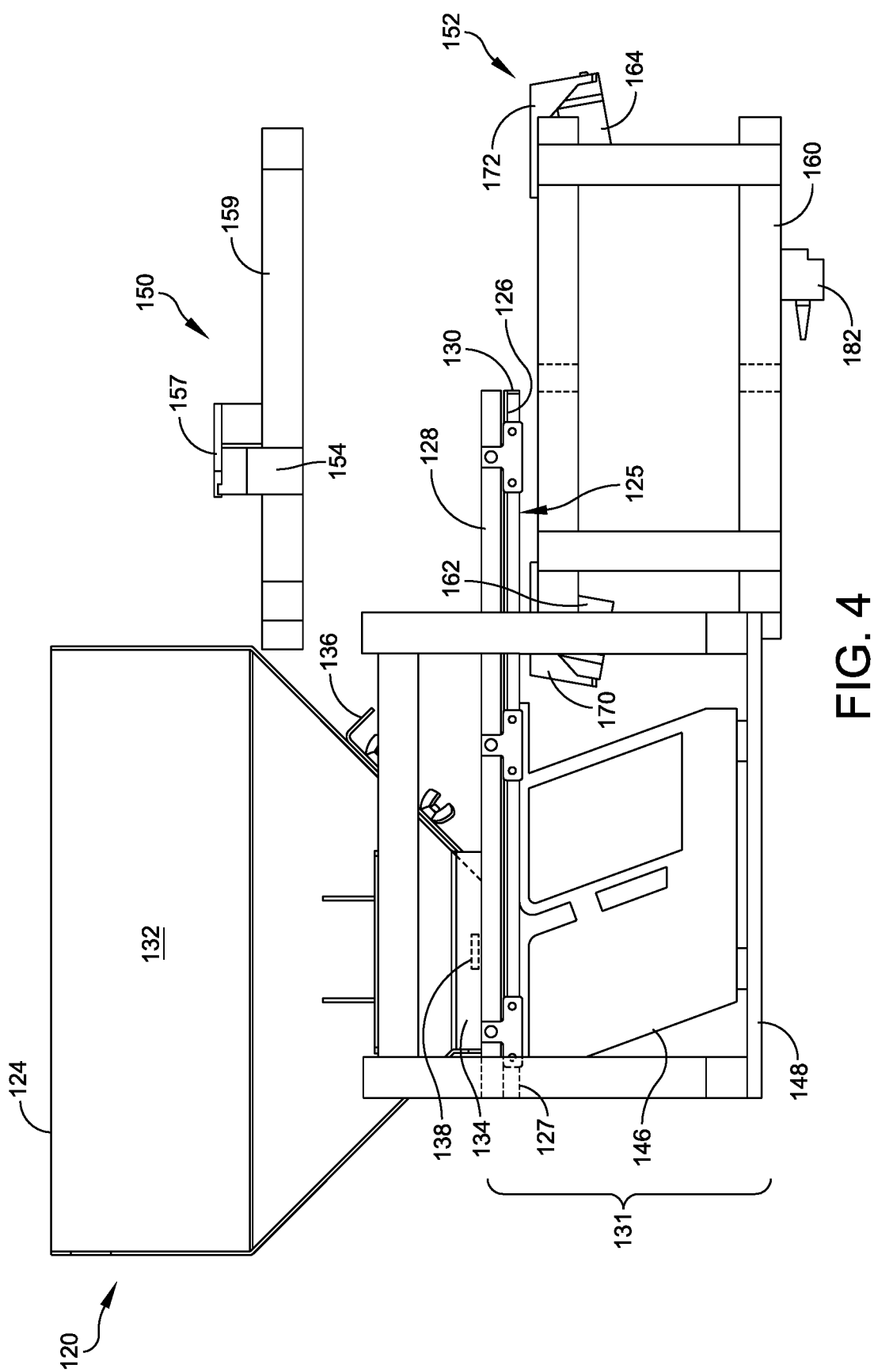
FIG. 4 illustrates a side view of one embodiment of a quality analysis system incorporated within the commodity analysis and collection system of FIGS. 1-3.
Figure 5:
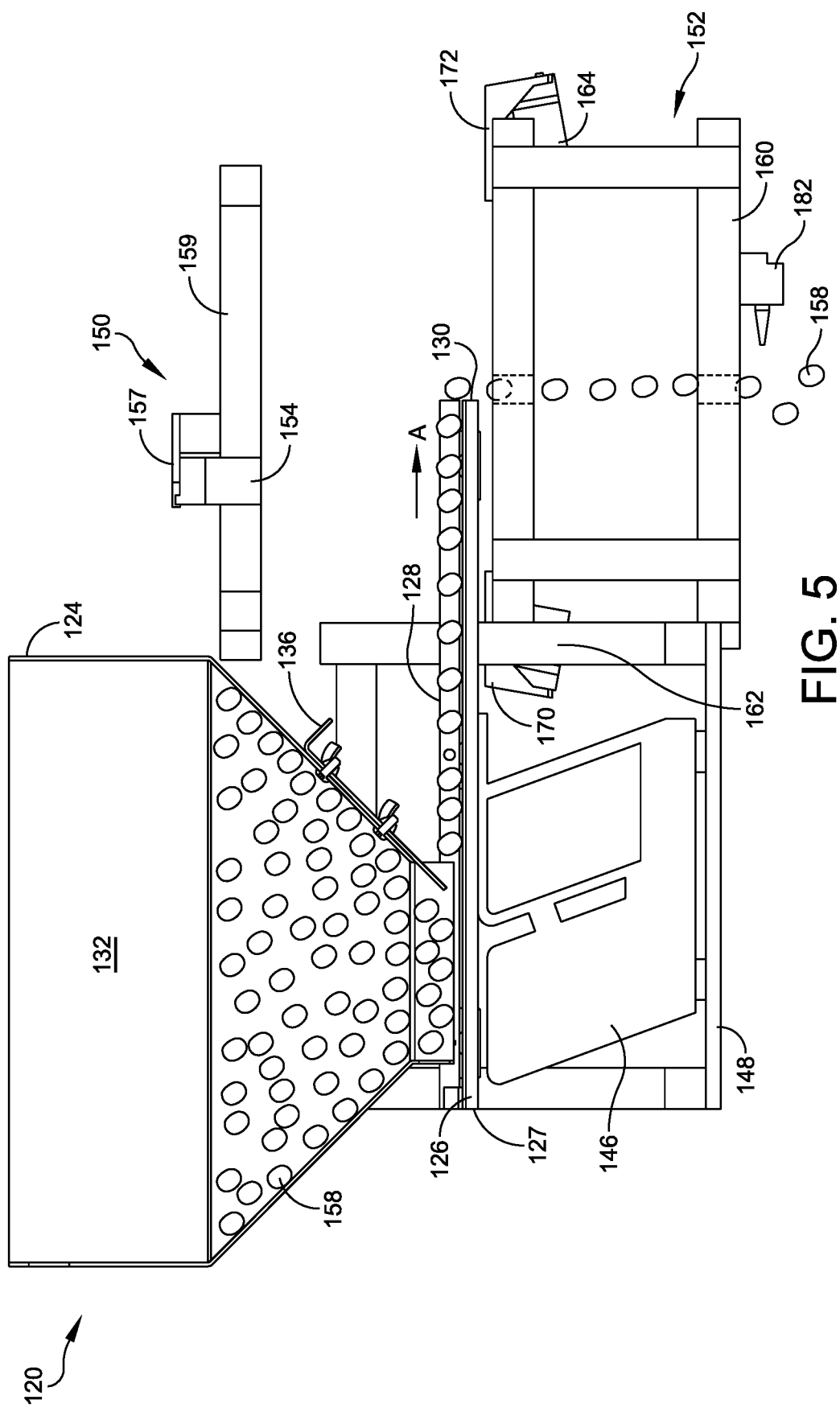
FIG. 5 illustrates a cross-sectional view of the quality analysis system of FIG. 4, having a batch of commodity particles flowing through the system for analysis.
Figure 6:
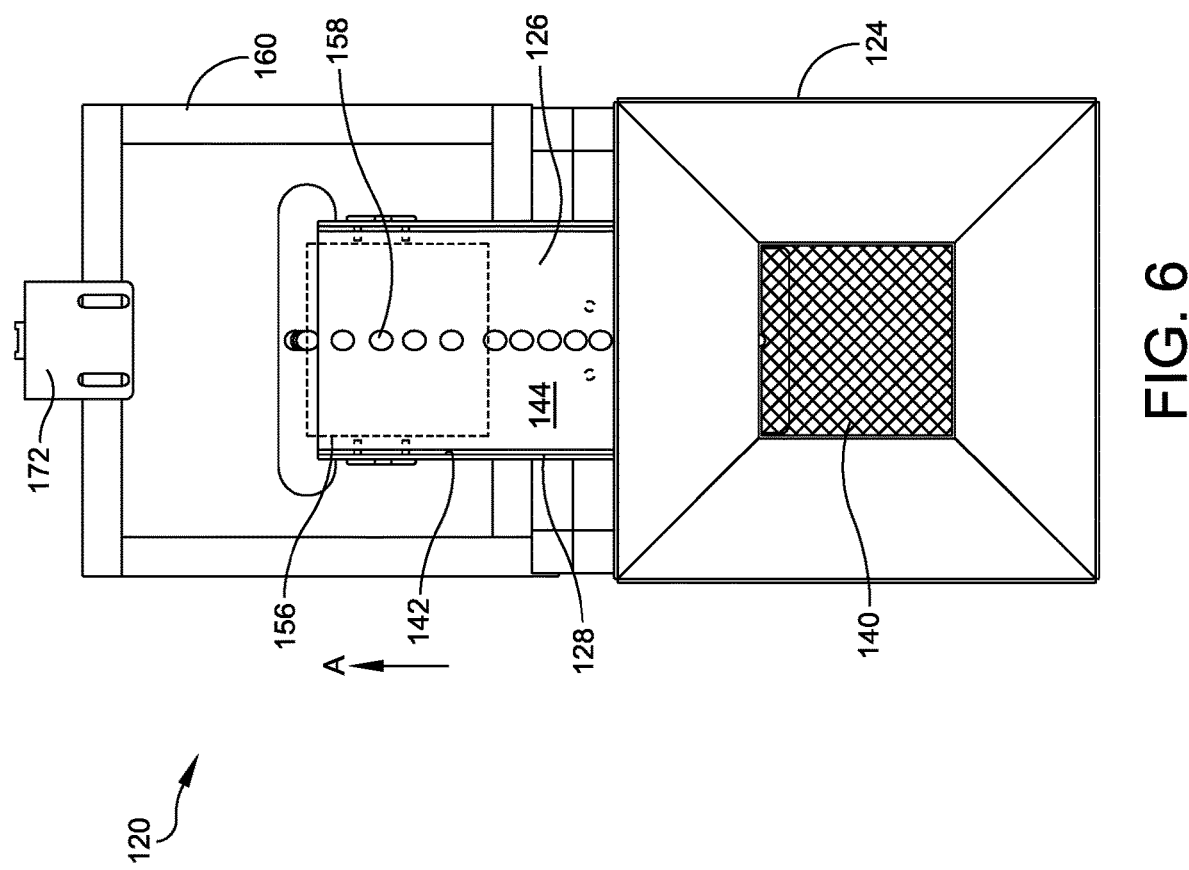
FIG. 6 illustrates a top view of the quality analysis system of FIG. 5.
Figure 7:
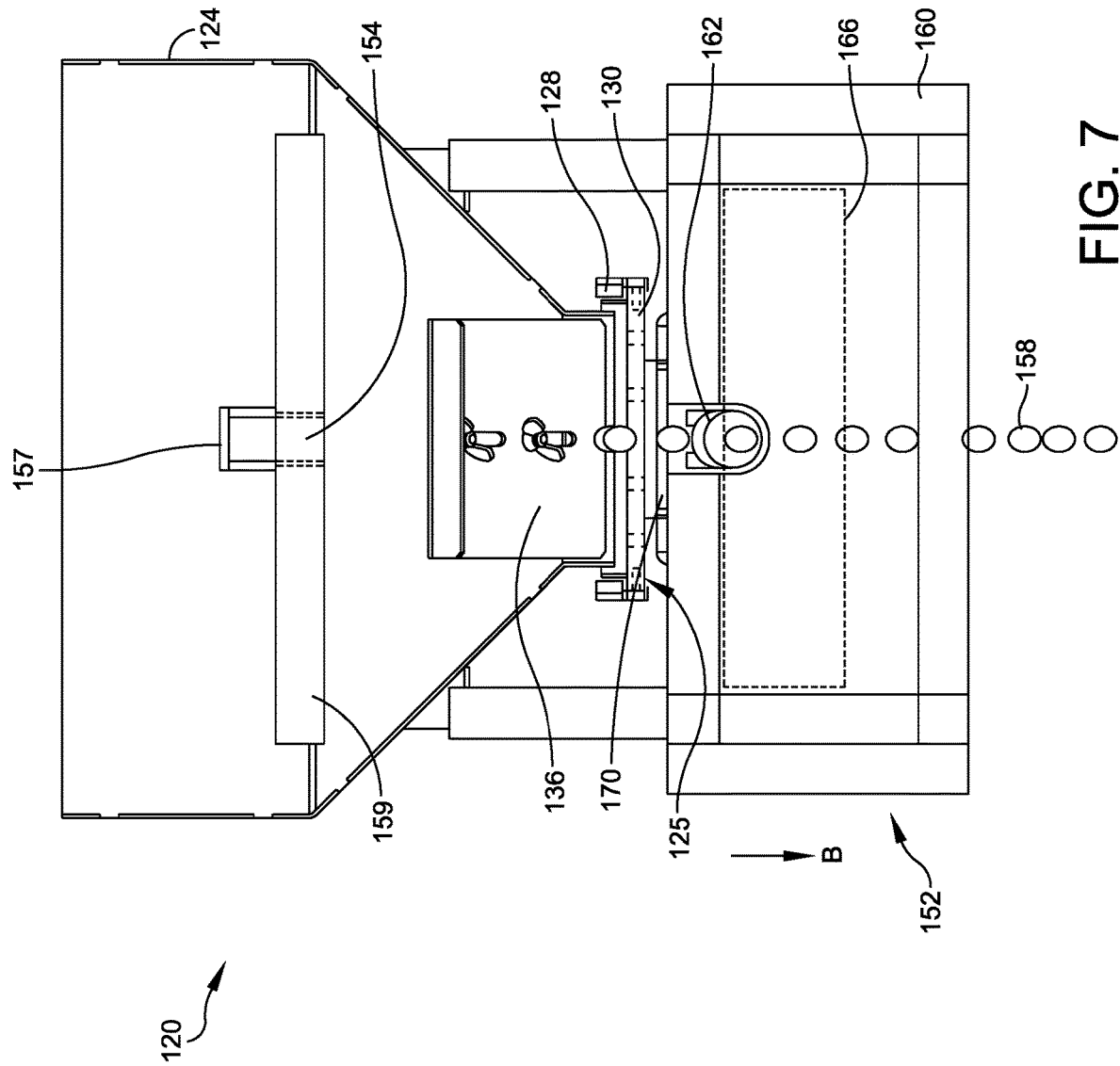
FIG. 7 illustrates a front view of the quality analysis system of FIG. 5.

As discussed above, the communication and control circuitry 104 is communicatively coupled with a material quality analysis system 120 and a material collection system 122. FIG. 4 illustrates a side view of one embodiment of the quality analysis system 120, where FIGS. 5-7 illustrate side, top, and front views of the system 120 having individual particles 158 of a batch of coffee cherries proceeding through the system 120. In this embodiment, the quality analysis system 120 leverages a vibratory material feeder and plate that operate in conjunction with a series of cameras to provide optical sorting and analysis relative to each individual particle 158 forming the collective batch of material dispersed into the system 100.

In further detail and in this embodiment, the quality analysis system 120 includes a material hopper 124 configured to feed a vibratory assembly 131. Specifically, the material hopper 124 may be disposed above a proximal end 127 of a vibratory plate 126 such that a batch of material dispersed into the hopper 124 travels downward and exits the hopper 124 onto the vibratory plate 126. The material hopper 124 may be formed of welded, powder-coated steel and have any appropriate capacity to service the commodity to be dispersed into the quality analysis system 120. For example, the hopper 124 may have a 30-kg capacity, which amounts to approximately 17,000 individual particles for analysis for coffee cherries, and an 80-kg capacity for denser green and parchment coffee.

The material hopper 124 may have a rectangular or square body 132 that tapers at a 45-degree angle to a lower outlet 134, while a screen 140 (FIG. 6) may be positioned within the hopper 124 to capture foreign and oversized objects and only allow particles under a defined size to pass through the hopper outlet 134 to the vibratory plate 126. In this embodiment, the hopper 124 may include an adjustable height gate 136 that may be positioned as necessary to meter flow from the hopper outlet 134 onto the proximal end 127 of the vibratory plate 126. A low-level capacitive sensor 138 may be positioned at or near the hopper outlet 134 to provide an indication that the hopper 124 is empty.

The vibratory plate 126 may be bordered along each longitudinal edge by a guide rail 128, which may be positioned at an offset 142 from the longitudinal edge of the vibratory plate 126 between the plate's proximal and distal ends 127, 130. In this configuration, the guide rail 128 guides objects traveling from the proximal end 127 toward the distal end 130 of the plate 126, while the offset 142 allows smaller but irregular or extraneous particles that have passed through the screen 140 to the plate 126 to exit the system 120 before they enter an analysis zone. In this embodiment, the vibratory plate 126 may feature a textured top surface 144 designed to reduce surface tension and keep objects positioned thereupon from stalling as they travel toward the distal end 130 of the plate 126.

In this embodiment, a bottom surface 125 of the vibratory plate 126 is supported by a vibratory input feeder 146 and a vibratory base plate 148, which is operably coupled with the drive system 116. In one embodiment, the vibratory input feeder 146 may be a Syntron F-T01 2-ton/hour vibratory feeder. In operation, the vibratory input feeder 146 may operate or be actuated to vibrate the vibratory plate 126 such that the vibratory plate 126 generates and applies a consistent force component, F, to each object or particle 158 resting on the vibratory plate 126. This vibration, along with the continual addition of new particles 158 entering the proximal end 127 of the vibratory plate 126 from the hopper 124, causes each of the objects to traverse from the proximal end 127, along a length of the vibratory plate 126 and within view of an overhead imaging assembly 150, to the distal end of the plate 130, where the particles 158 free fall from the plate 126 through an imaging box assembly 152. Notably, the consistent force component, F, applied to each of the particles 158 may be applied in any appropriate manner. For example, one embodiment may employ an air jet nozzle or nozzles to separately apply the consistent force, F, to each of the particles 158. In one embodiment, the vibratory input plate 148, vibratory feeder 146, and vibratory plate 126 of the vibratory assembly 131 may have a two-ton per hour capacity and be configured for either continuous or intermittent use. Other embodiments may be configured for any appropriate capacity and/or use model.

The overhead imaging assembly 150 may be mounted above the distal end 130 of the vibratory plate 126 and may include a first camera 154, a camera mount 157, and an overhead LED light panel 159. The camera mount 157 may be configured such that a lens of the first camera 154 is directed downward toward the vibratory plate 126 to capture images of the particles 158 as they pass through a first image-capture zone 156 (FIG. 6). In this embodiment, the first image-capture zone 156 may be a 6-inch×6-inch zone located at the distal end 130 of the vibratory plate 126.

The imaging box assembly 152 may be mounted below the distal end 130 of the vibratory plate 126 and may include a 6-sided LED light box 160, a second camera 162 mounted at a proximal end of the light box 160 and facing distally, and a third camera 164 mounted at a distal end of the light box 160 and facing proximally, such that the lenses of the second and the third cameras 162, 164 are directed toward an interior of the light box 160 to capture images of the particles 158 as they fall from the distal end 130 of the vibratory plate 126 and pass through a second image-capture zone 166 (FIG. 7). In this embodiment and as shown in FIG. 7, the second image-capture zone 166 may be a 2-inch×7-inch zone located within the light box 160, below the distal end 130 of the vibratory plate 126. The imaging box assembly 152 may also include second and third camera mounts 170, 172 configured such that the second and third cameras 162, 164, respectively, are optimally directed toward the second image-capture zone 166 (e.g., angled at 10 degrees, 20 degrees, etc.).

To provide optimal image quality, the overhead light panel 159 and the light box 160 may provide diffused LED lighting in a color temperature between 4000-5600 K. The overhead light panel 159 and the light box 160 may also be designed to produce light in UV wavelengths to reveal particle aspects not apparent under visible light. Each of the first, second, and third cameras 154, 162, 164 may be an industrial camera with a 4-mm lens shooting at 125 frames per second (fps) (e.g., Basler industrial camera, 4 mm lens, 125 fps).

In operation, data collected from the vibratory assembly 131, operating in conjunction with the overhead imaging assembly 150 and the imaging box assembly 152, is processed via the AI analysis and collection module 111 of the communication and control circuitry 104 to determine the quality of each object or particle 158 passing through the quality analysis system 120. That is, a batch of material particles 158 are loaded into the hopper 124. The vibratory input feeder 146 is powered on, and the analysis begins. As shown in FIGS. 5-7, particles 158 move down the hopper 124, out the hopper outlet 134, and onto the proximal end 127 of the vibratory plate 126, where the vibratory plate 126 repeatedly applies the known vibrational force, F, to the particles 158 to displace them proximally-to-distally in the direction of arrow A toward the distal end 130 of the vibratory plate 126.

As the particles 158 pass through the first image-capture zone 156 beneath the first camera 154, the first camera 154 captures a first set of images of each particle 158. When the particles fall from the distal end 130 of the vibratory plate 126, the particles 158 travel in the direction of arrow B to enter the light box 160 and pass through the second image-capture zone 166 between the second and the third cameras 162, 164, where the second and the third cameras 162, 164 capture respective second and third sets of images of each of the particles 158. Due to the distal and proximal positioning of the second and the third cameras 162, 164, the second and the third image sets capture each of the particles 158 from distal and proximal sides.

For purposes of explanation, FIGS. 5-7 illustrate a single-file progression of the particles 158 in the direction of arrows A and B. It should be understood that the particles 158 may fill an entirety of the vibratory plate 126, forming a matrix of particles flowing through the system 120.

FIGS. 8A-8B provide an exemplary partial set of images captured by a single one of the first, second, or third cameras 154, 162, 164. As shown, the images may be machine labeled according to frame number, object number, x-y location, and whether the image is the first image of the object (i.e., "new") or the image is a subsequent image of the object to be matched with previous images such that the particle may be tracked through the analysis system 120 (i.e., "matched"). For example, FIG. 8A illustrates an exemplary frame number 171. The frame includes images 174 and 176 of object numbers 403 and 406 and provides the objects' x-y locations with respect to a defined origin, respectively. Object 403 is "new" and has not been imaged prior to frame 171, while object 406 is "matched" and has been imaged prior to frame 171. FIG. 8B illustrates an exemplary frame number 173, which includes images 175 and 177 of the same object numbers 403 and 406 and provides the objects' new x-y locations with respect to the defined origin.

Using data collected from the first, second, and third image sets and the vibratory assembly 131, the control module 106 executes an algorithm or algorithms of the trained AI analysis and collection module 111 to perform a continuous analysis relating to a number of analysis attributes for each individual one of the particles 158 passing through the quality analysis system 120. Specifically, as discussed above, the vibratory plate 126 or another appropriate force input source generates and applies a known repetitive force, F, to each of the particles 158 progressing along the plate 126. With each application of the force, F, the first camera 154 measures an incremental displacement, d, within the first image-capture zone 156 of each of the particles in response to the force, F, as well as a time, $\Delta t$, over which the displacement occurs. In addition, the second and third cameras 162, 164 capture images of each of the particles 158 as they free fall through the second image-capture zone 166. The second and third cameras 162, 166 capture images of the particles 158 from two sides (e.g., facing proximally and facing distally) to enable a determination of an angle of view and a spatial volume, V, (i.e., a size) for each of the falling particles 158 using machine vision.

Using the analysis attributes of applied force, F, displacement in response to the applied force, $\Delta d$, the time over which the displacement occurs, $\Delta t$, and the spatial volume of the particle, V, the control module 106 and the AI module 111 may calculate a number of additional analysis attributes for each of the particles 158. Initially, the momentum, p, of each particle may be calculated using the formula:

$$p = \Delta t * F = \text{velocity} * \text{mass} = v * m$$
$$\text{where velocity, } v = \frac{\Delta d}{\Delta t}$$

From the momentum, p, the AI module 111 may calculate the mass, m, of each of the particles 158 using the formula:

$$m = \frac{\Delta t * F}{v} = \frac{\Delta t * F}{\frac{\Delta d}{\Delta t}} = \frac{\Delta t * F * \Delta t}{\Delta d} = \frac{\Delta t^2 * F}{\Delta d}$$

From the mass, m, and the volume, V, the AI module 111 may calculate the density, $\rho$, of each of the particles 158 using the formula:

$$\rho = \frac{m}{V}$$

In addition to the mass, volume, and density of each of the particles, the first, second, and third cameras 154, 162, 164 may also optically qualify a color and color consistency of each of the particles 158. Thus, in this embodiment, the AI module 111 is able to analyze, both continuously and in real time, each individual particle 158 for size, size consistency, volume, color, color consistency, extrinsic defects (e.g., surface imperfections upon the particle, extraneous rocks, sticks), mass, and density. From the density of each of the particles, the AI module 111 may evaluate each of the particles 158 for intrinsic defects. For example, in the case of coffee cherries, a low cherry density may indicate a "potato" defect, which is caused by airborne bacteria that enter the coffee cherry through a puncture or tear in the outer skin and cause a pronounced potato-like flavor in the resulting coffee beverage. Low density cherries may also reflect a bug or worm infestation or simply an underdeveloped, low-quality cherry. These types of intrinsic defects have previously been found by "floating" cherries in water to determine their relative low densities in comparison to the other particles, which is a time-consuming process lacking in thoroughness. In some embodiments, the calculated mass of each of the particles 158 may be aggregated to determine the total weight, w, of the batch of material dispersed into the system 120.

The algorithms of the AI analysis and collection module 111 may be label trained using training particles that are associated or machine labeled with a specific quality rating they represent based upon customer/buyer characterizations of desired analysis attributes in the relevant commodity. Then, based on defined or threshold quality limits, the AI module 111 may make a threshold determination regarding whether each particle 158 is acceptable or defective. If a particle is defective and unacceptable, a spatially aligned air jet 182, selected from a bank or array of air jet nozzles positioned below the light box 160 and adjacent the stream of falling particles 158, may be cycled, as shown in FIG. 5. Cycling the air jet 182 causes the defective particle 158 to redirect into a first reject chute 184 (FIG. 3) for return to the seller. In one embodiment, the air jets 182 may be powered by a high-speed solenoid valve. If a particle is acceptable, the particle 158 is allowed to drop directly into a good product chute 178 (FIG. 3), which transfers the particle 158 into a rotating weigh hopper 180 of the collection system 122, discussed below in relation to FIGS. 10-13.

From the analysis of each individual particle 158, the AI analysis and collection module 111 can extrapolate quality indicators or ratings relating to the batch of material dispersed into the quality and quantity system 120. That is, based on machine recognition of associations between the analysis attributes that are collected, measured, and/or calculated for each of the particles 158 (e.g., mass, volume, density, shape, color, color consistency, defects, etc.), and the quality ratings assigned to those analysis attributes and/or combination of attributes, the AI module 111 may classify relevant proportions of the particles 158 into a number of predefined quality ratings (e.g., industry standard ratings). Embodiments of the AI module 111 may characterize the quality of the batch of particles 158 according to (i) the highest proportion; (ii) a weighted average; or (iii) a quality associated with each particle of the batch or with any other segment or proportion of the batch.

FIG. 9 provides a chart depicting an exemplary record of analysis results 190 for a batch of coffee cherries analyzed by the quality analysis system 120. The results 190 indicate a number of analysis attribute types associated with the batch including, for example, a total weight, detected water content, total defects detected and the types of those defects (e.g., black beans, sour beans, stinker beans, shells, green, broken, malformed, insect damage, dried, floater, large rock, medium rock, small rock, large skin, medium skin, small skin, etc.), and size breakdowns of the particles 158 forming the batch (e.g., mesh20, mesh19, mesh18, mesh17, mesh16, mesh15). The analysis results 190 also indicate a breakdown of quality ratings according to established coffee classification methods (e.g., NY-Brazil Method, Grade0CoteD'lvoire, Grade1CoteD'lvoire, Grade2CoteD'lvoire, etc.). For each of the analysis attributes and quality ratings, the record of analysis results 190 provides a value along with the corresponding unit of measure (e.g., count, percent, kg, etc.), a group within which the attribute or rating belongs (e.g., foreign defects, size, CoteD'lvoire, etc.), and the determination method used to determine the attribute or rating (e.g., calculated, image, weight, etc.). The analysis results 190 may be transmitted for review on an application or Internet/intranet portal on a stakeholder computing device via the wireless transmission system 118, using any appropriate and/or available transmission technologies and/or communication networks.

Figure 10:
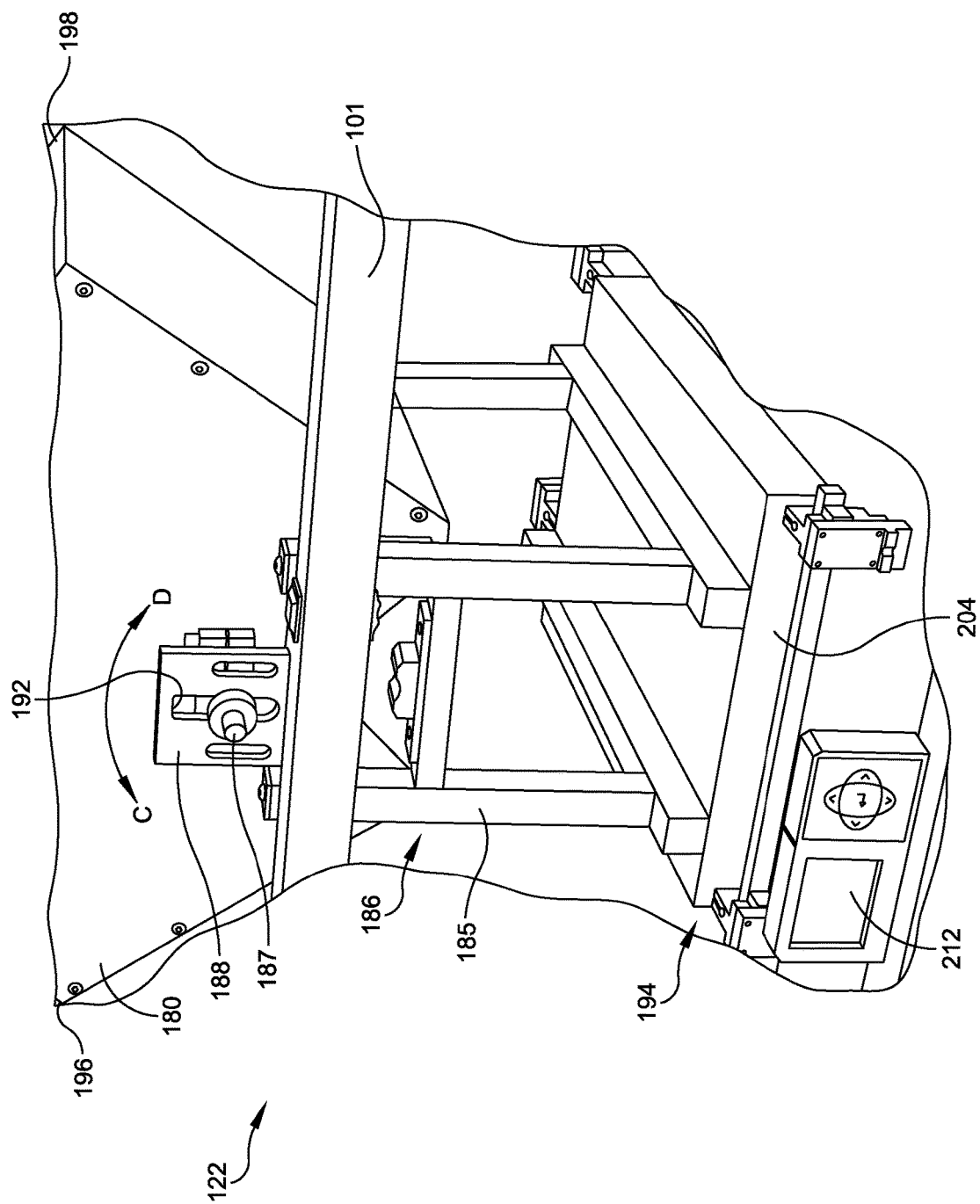
FIG. 10 illustrates a perspective view of one embodiment of a collection system incorporated within the commodity analysis and collection system of FIGS. 1-3.
Figure 11:
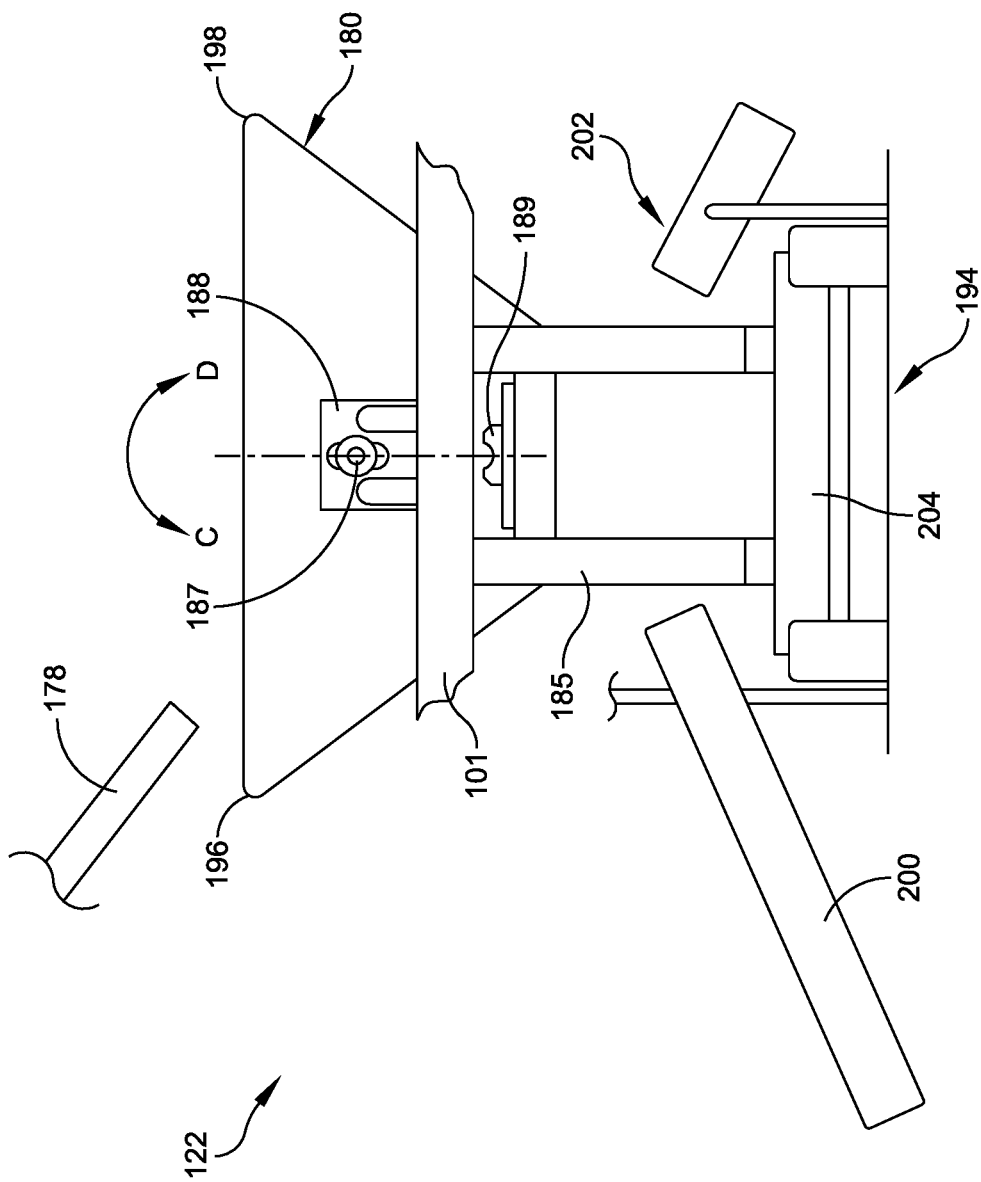
FIG. 11 illustrates a side view of the collection system of FIG. 10.

The analysis continues until all the particles 158 have passed through the quality analysis system 120, either to the first reject chute 184 and back to the seller or to the good product chute 178 and to the rotating weigh hopper 180 of the collection system 122. FIGS. 10-11 illustrate respective perspective and side views of one embodiment of the collection system 122. In this embodiment, the collection system 122 may include the rotating weigh hopper 180, a weigh hopper mount 186, and a weigh scale lift assembly 194 configured to rise vertically until the weigh hopper 180 is isolated or fully supported on a weigh scale 204 so as to measure a total weight of the acceptable particles 158 passed to the hopper 180 by the analysis system 120.

Figure 12:
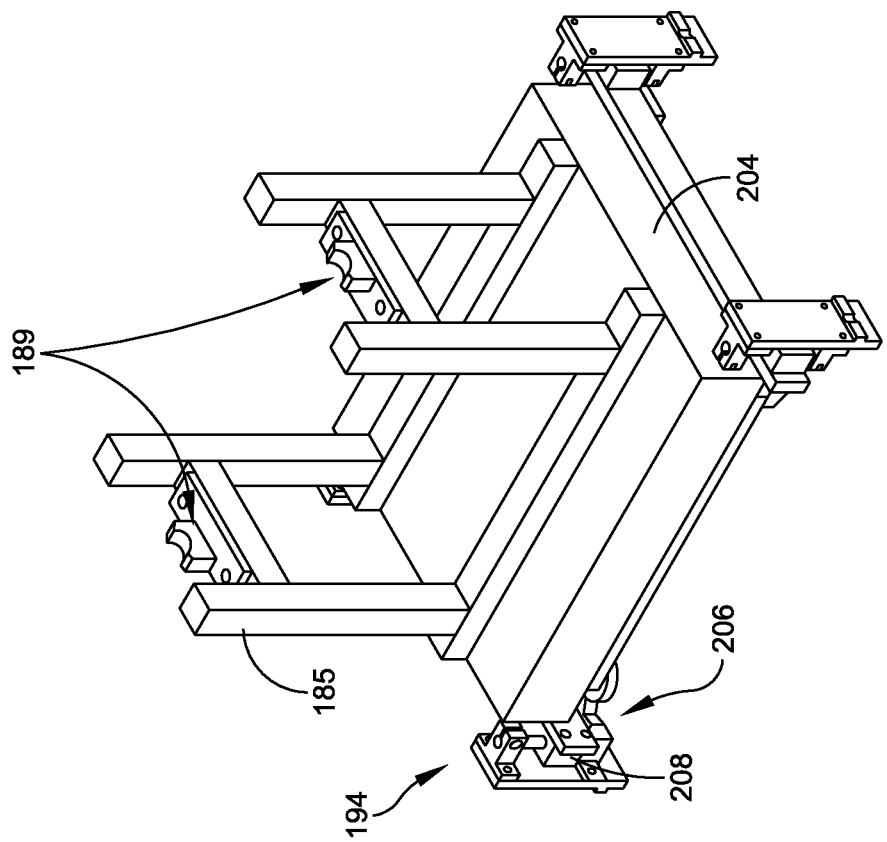
FIG. 12 illustrates a perspective view of a weigh hopper mount frame and a weigh scale lift assembly of the collection system of FIGS. 10-11.

In further detail, the rotating weigh hopper 180 may be rotatively supported on each side by the weigh hopper mount 186. The weigh hopper mount 186 may include a floating mount frame 185 that rests upon the weigh scale 204 at a bottom end and that supports the weigh hopper 180 at top end cradles 189 (FIG. 12). The weigh hopper mount 186 may also include opposing adjustable support panels 188 that are affixed to and supported by the system frame 101. Each of the adjustable support panels 188 may include a vertical adjustability slot 192.

When mounted upon the hopper mount 186, the hopper 180 may rest upon the cradles 189 of the mount frame 185 in a manner that causes opposing support shafts 187 protruding from each side of the weigh hopper 180 to extend through the vertical adjustability slots 192 of the adjustable support panels 188 of the hopper mount 186. At least one of the support shafts 187 may be outfitted with a rotary bearing and stepper motor assembly, with releasable clamp rotation, configured to rotate the weigh hopper 360 degrees about a longitudinal axis defined by the support shafts 187, in the direction of arrows C and D, enabling the weigh hopper 180 to selectively disperse material therein from a first side 196 to a second reject chute 200 or from a second side 198 to a material collection chute 202. The second reject chute 200 may extend partially beneath the hopper 180 and may be angled to allow gravity to transfer the rejected material from the rotating weigh hopper 180 to an exterior of the system 100 or any larger system or machine that encompasses the system 100.

Figure 13:
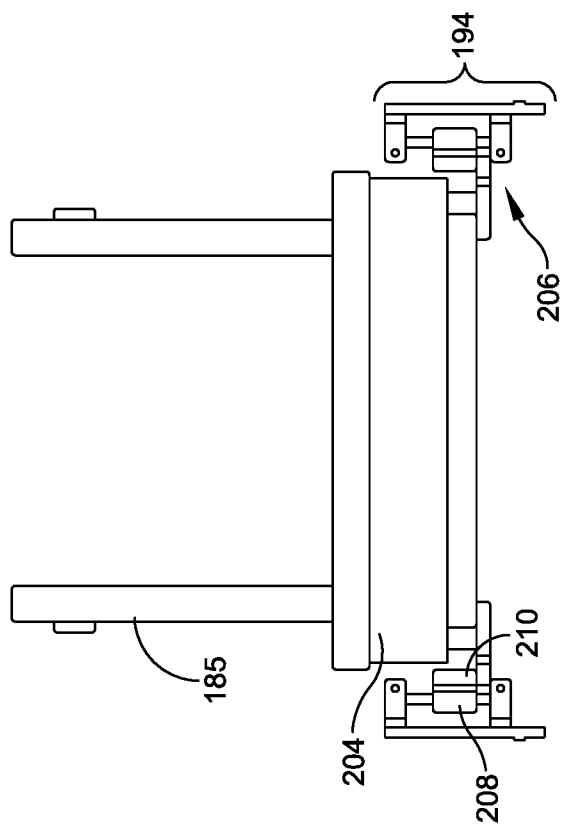
FIG. 13 illustrates a side view of the weigh hopper mount frame and the weigh scale lift assembly of FIG. 12.

The weigh scale lift assembly 194, shown in further detail in FIGS. 12-13, may be positioned directly beneath the floating mount frame 185 of the weigh hopper mount 186. In this embodiment, the weigh scale assembly 194 may include a weigh scale 204 coupled to a weigh scale lift 206 comprising a number of linear bearings 208 and associated stepper motors 210 positioned about/beneath the four corners of the scale 204. As discussed above, the weigh scale lift 206 may be activated to raise the weigh scale 204, thereby lifting the floating mount frame 185 until the supported weigh hopper 180 rises relative to and hovers within the vertical adjustability slots 192, such that the weigh hopper 180 is fully supported on the weigh scale 204, rather than the adjustable support panels 188. This enables a measurement of the total weight of the acceptable particles 158 dispersed the weigh hopper 180 by the analysis system 120. In some embodiments, the total weight may be reflected, as discussed above, in the overall analysis results 190 of FIG. 9. In another embodiment, the weigh scale 204 may include an independent weight display 212, as shown in FIG. 10. In one embodiment, the weigh scale 204 may be a Mettler Toledo BC-60 scale with 60-kg capacity and 10-g resolution or any appropriate load cell configuration.

Applying the analysis discussed above and performed by the quality analysis system 120, including the proportioned quality ratings and the total weight, a value of the batch of material dispensed into the commodity analysis and collection system 100 may be calculated, and a pay price may be communicated to the seller, as detailed further below in relation to the consumption-based resource-allocation system of FIG. 23.

Figure 14:
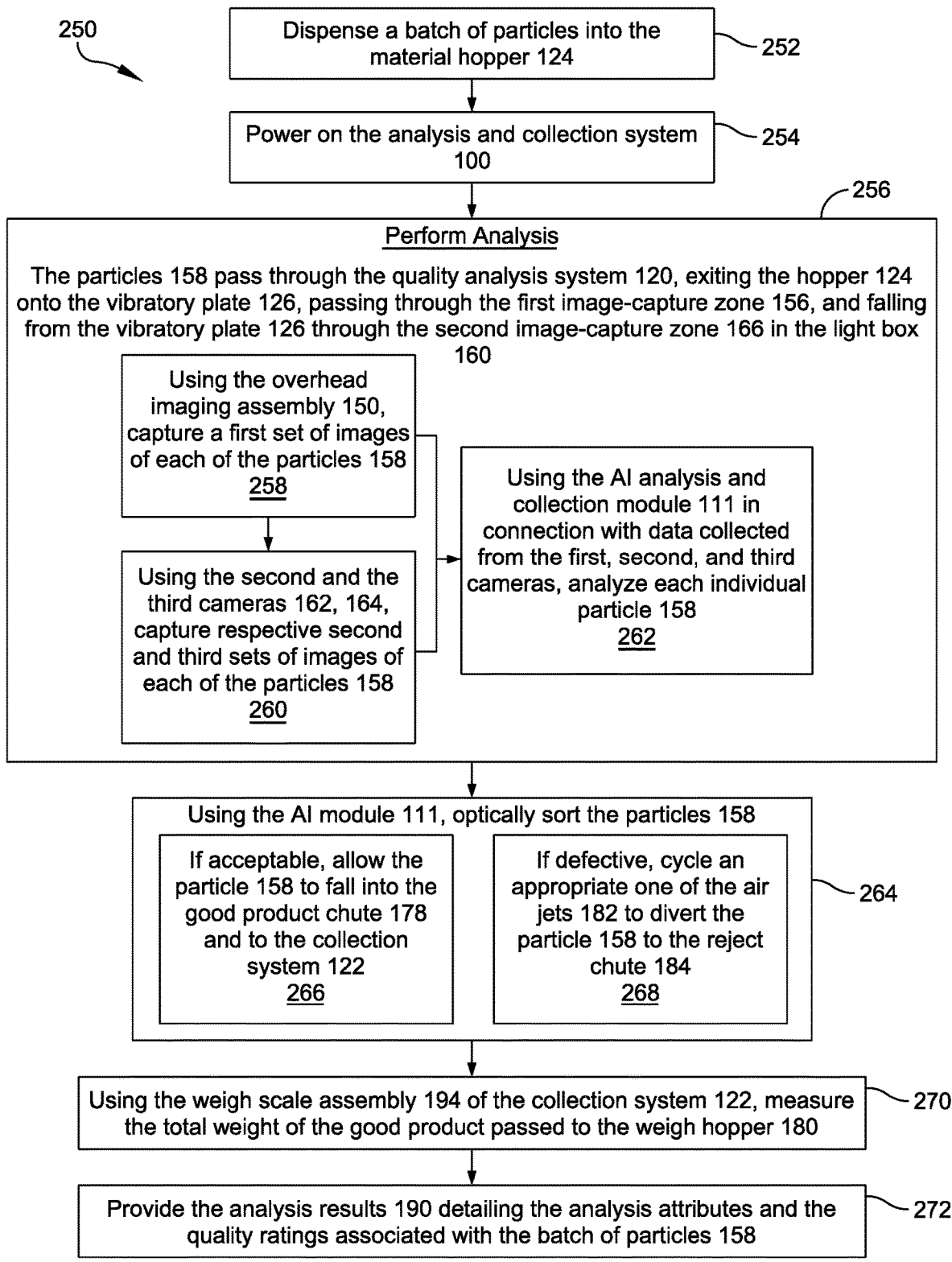
FIG. 14 provides a flowchart depicting an exemplary commodity analysis method using the commodity analysis and collection system of FIGS. 1-3.

FIG. 14 provides a flowchart depicting an exemplary material analysis method (250) using an embodiment of the commodity analysis and collection system 100. To begin, a user such as, for example, a material seller, dispenses a batch of commodity particles 158 into the material hopper 124 of the quality analysis system 120 of the commodity analysis and collection system 100 (252). The analysis and collection system 100, including the vibratory input feeder 146, is powered on and the continuous, particle-by-particle analysis begins (254). Particles 158 first exit the material hopper 124 onto the proximal end 127 of the vibratory plate 126, pass through the first image-capture zone 156, free fall from the distal end 130 of the vibratory plate 126, and pass through the second image-capture zone 166 within the light box 160 (256).

Within the first image-capture zone 156, a first set of images of each of the particles 158 is captured by the overhead imaging assembly 150 (258). Within the second image-capture zone 166, the second and the third cameras 162, 164 capture respective second and third sets of images depicting both sides of each of the particles 158 (260). In parallel with image capture (258, 260), the control module 106 executes the AI analysis and collection module 111 to analyze each of the individual particles 158 (262). In this embodiment, this analysis includes performing a series of optical measurements and AI calculations relating to the number of analysis attributes associated with each individual particle 158 such as, for example, (1) optically determining the volume, V, of each particle, (2) optically determining a time, $\Delta t$, for a displacement, $\Delta d$, of each particle in response to the known input force, F, (3) calculating the mass, m, of each particle, and (4) calculating the density, $\rho$, of each particle. From the mass and the density, the AI module 111 may identify a variety of intrinsic defects such as low-density "floater" particles or other defects associated with low-density particles and may calculate a total weight, w, of the batch of particles. The analysis attributes may also include an optical determination regarding a number of visual attributes including, for example, color, color consistency, shape, shape consistency, size, size consistency, and a number of extrinsic defects, either upon the particles themselves or in the identification of non-particle materials such as sticks and/or rocks present in the batch.

After each particle 158 has been analyzed (262) using the AI module 111, the AI module may optically sort the particles (264), to make a determination regarding whether each particle 158 is acceptable or defective. If acceptable, the particle is allowed to free fall into the good product chute 178, which gravity feeds the particle 158 into the rotating weigh hopper 180 of the collection system 122 (266). If defective, an appropriate one of the air jets 182 is cycled to divert the particle 158 into the reject chute 184 and back to the seller (268).

Once all of the particles 158 have been analyzed (262), sorted (264), and passed either out of the quality analysis system 120 and back to the seller or out of the quality analysis system 120 and to the rotating weigh hopper 180 of the collection system 122, the collection system 122 may be used to weigh the good product collected within the weigh hopper 180 using the weigh scale assembly 194 (270). Then, using the AI module 111, the analysis attributes measured, determined, and/or calculated by the analysis and collection systems 120, 122 may be compared with defined quality limits to classify proportions of the analyzed batch according to predefined and industry-known quality ratings. A set of analysis results 190 may be provided to report the analysis attributes associated with the batch of particles 158 and to provide the associated quality ratings (272). These analysis and quality ratings may then be used to determine a pay price to be offered the seller, as discussed below in relation to the consumption-based resource-allocation system of FIG. 23.

As discussed above, the algorithm(s) of the AI module 111 may employ machine learning and label training techniques to drive specificity in determining the analysis attributes associated with the particles 158, individually and/or collectively. That is, in reading supervised labels that define the analysis attributes associated with sample particles having known characteristics and iteratively recording the relationships between the labeled analysis attributes and the data collected in connection with the sample particles (i.e., the force and image data), the AI module may employ a convolutional neural network to iteratively learn the relationships between particle characteristics and analysis attributes without being explicitly programmed, thus enabling data-driven determinations of the analysis attributes after machine training through the use of a variety of labeled samples. By way of limited example, the AI module 111 may be machine or label trained to recognize, without explicit programming, such analysis attributes as color, color consistency, size, size consistency, shape, volume, and/or extrinsic and intrinsic defects, and to classify the particles, individually or collectively, into or according to an associated monetary value, which may be represented as a number of cryptocurrency tokens, discussed further below.

Figure 15:
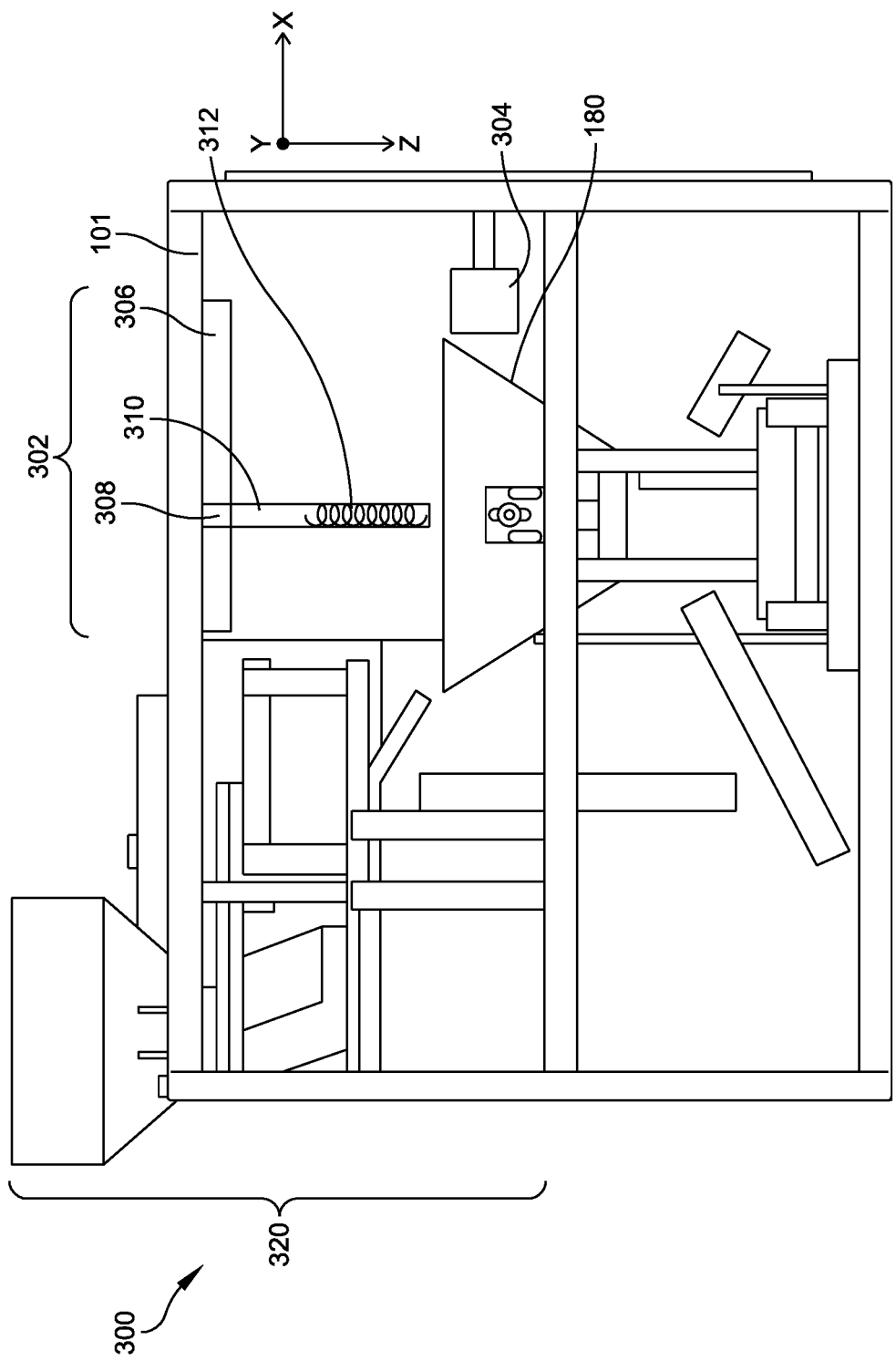
FIG. 15 illustrates a side view of another embodiment of a commodity analysis and collection system having a quality analysis system with an x-y-z gantry sample collection system and a sample analysis pod.

Embodiments of the quality analysis system of the commodity analysis and collection system discussed above may incorporate a mechanism for providing further technical analysis of a select sampling of particles collected from the larger batch passed to the rotating weigh hopper 180. In this embodiment, and as shown in FIG. 15, one embodiment of a commodity analysis and collection system 300 may include a quality analysis system 320, which may feature an x-y-z gantry sample collection system 302 that works in conjunction with a sample analysis pod 304.

In this embodiment, the gantry sample collection system 302 may include x-y linear rails 306, 308 that are affixed to the frame 101 and support an x-axis linear actuator and a y-axis linear actuator for x-y positioning, as well as a z-axis sample collector 310 that is configured to descend into the particles contained within the rotating hopper 180 for sample collection. All axes actuators may be driven by geared stepper motors, with belt and pulley system drives along the x and y axes. The z-axis actuator may comprise an auger 312 rotated by a geared stepper motor adapted for collecting and transferring multiple product samples from various x-y locations and depths within the particles contained within the rotary hopper 180 to the sample analysis pod 304, which may be positioned adjacent to the rotating hopper 180 and configured to receive the sample particles collected by the x-y-z gantry sample collection system 302 for further analysis.

Figure 17:
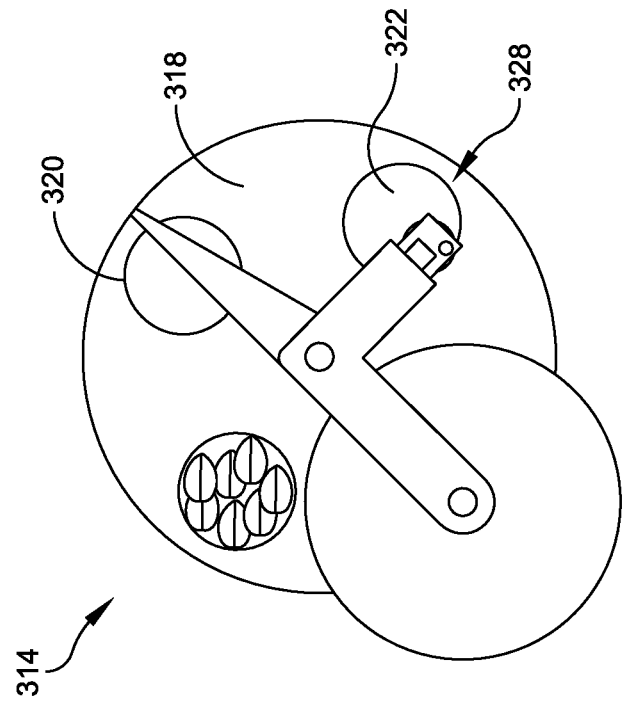
FIG. 17 illustrates a top view of the cam system of FIG. 16.
Figure 16:
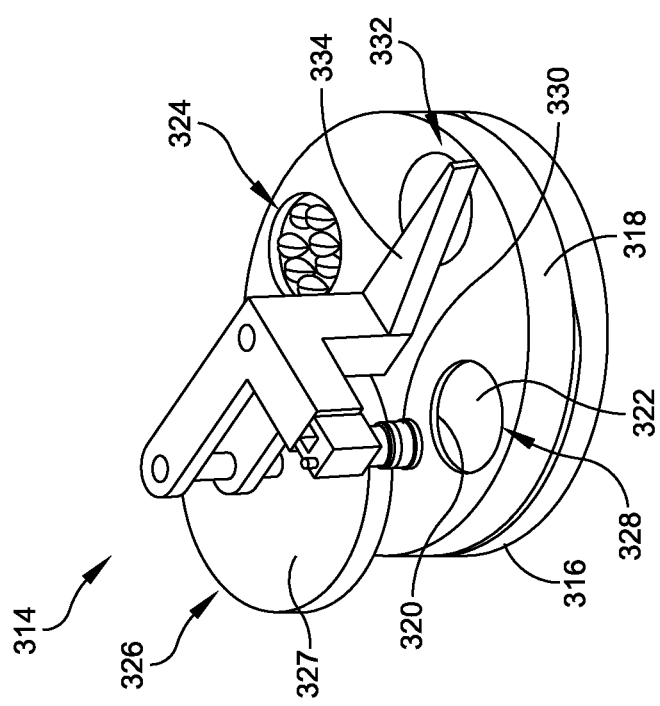
FIG. 16 illustrates a perspective view of one embodiment of a cam system for incorporation within the sample analysis pod of FIG. 15.

FIGS. 16-17 illustrate perspective and top views of one embodiment of a cam system 314 positioned within the sample analysis pod 304 and configured to prepare particle samples for further investigation and analysis to determine additional analysis attributes. In this embodiment, the cam system 314 may include a base or cam plate 316 stacked beneath an indexing plate 318 that forms a number of positioning cups 320, each configured to receive sample particles 158 collected from the rotary hopper 180. Each of the positioning cups 320 may have a spring-loaded cup base 322 that is retained within the positioning cup 320 but that has the ability to slide vertically within the cup 320. The base/cam plate 316 may be etched at graduated heights such that when the indexing plate 318 rotates relative to the cam plate 316, the spring-loaded cup bases 322 move up and/or down within the positioning cups 320.

In operation, the indexing plate 318 may rotate relative to the cam plate 316 such that particles 158 placed within each of the positioning cups 320 may be sequenced between a number of analysis stations. In one embodiment, the stations include a loading station 324 in which sample product is dispensed into a positioning cup from the z-axis sample collector 310, a cutting/grinding station 326 featuring a cutting or grinding plate 327 at which the sample may be sheared or ground down to expose a cross-section of the particles within the cup 320, an imaging station 328 at which a fourth image set of the sample particles may be captured by a fourth camera 330, and a discharge station 332 at which the sample particles 158 may be pushed up and out of the positioning cup 320 and swept away by a discharge arm 334. In one embodiment, a wash head may then dispense cleaning fluid at high pressure into the empty cup 320 to ready the cam system 314 for further testing and analysis.

In one embodiment, molten polymer may be injected into the positioning cup to form a "puck" of product that captures the particles in position for further processing (grinding, cutting, etc.) and analysis. The analysis pod 304 may also include a spectral analysis station for further examination of the raw particles or the polymerized "puck." Using the sample analysis pod 304, the quality analysis system 300 may incorporate a number of analysis technologies to determine additional analysis attributes associated with the particles 158 including, for example, moisture content and defects that only become visible in the particle cross-sections. Exemplary analysis technologies and/or techniques may include, for example, ELISA, PCR, MassSpec, GC MS, LC MS, IHC, Clinical Chemistry, Hematology, Lateral Flow, POC, Cell Analyzer, Hyperspectral Image, Immunology, DNA sequencer, Biolog, and Enzyme activity analysis systems, technologies, and/or techniques.

Figure 18:
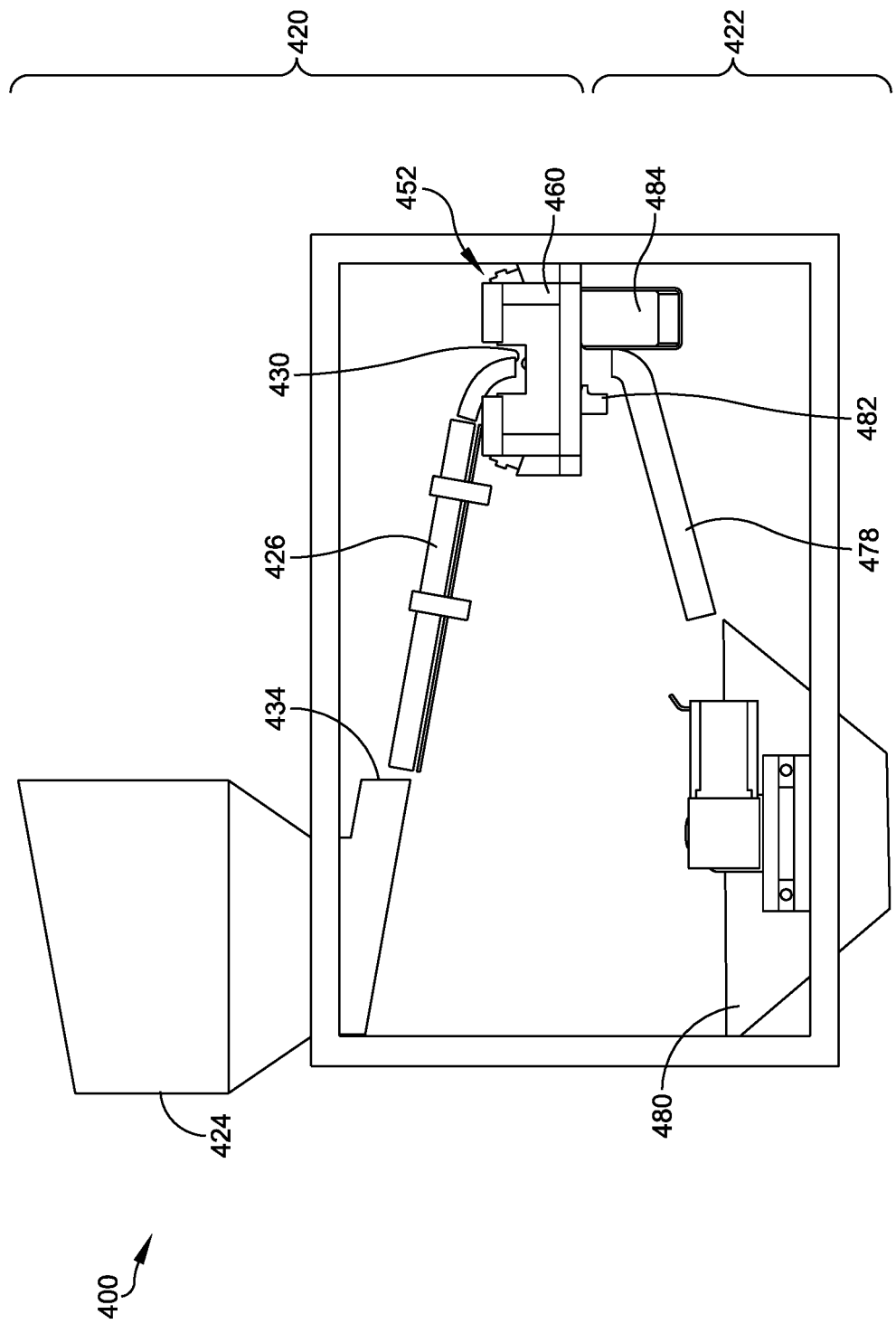
FIG. 18 illustrates a side view of another embodiment of a commodity analysis and collection system having a gravimetric quality analysis system.

FIG. 18 illustrates a side view of a commodity analysis and collection system 400, which is similar in structure and function to the commodity analysis and collection system 100, discussed above, but which does not employ a vibratory assembly 131. In this embodiment, the system 400 includes a gravimetric quality analysis system 420. The quality analysis system 420 may include a gravimetric, rather than vibratory, feed plate 426 that is disposed at and slopes downwardly away from an exit 434 of a material hopper 424. Particles exiting the material hopper 424 flow down the gravimetric feed plate 426 due to gravitational forces upon the particles 158. The particles 158 falling from a distal end 430 of the gravimetric feed plate 426 enter into an imaging box assembly 452, where at least first and second sets of images are captured via one or more cameras positioned within a light box 460 of the imaging box assembly 452. The images are analyzed, as discussed above, and a determination is made regarding whether each individual particle 158 is acceptable or unacceptable. Acceptable particles 158 exiting the light box 460 fall directly into a good product chute 478 and are transferred to a rotating weigh hopper 480 of a collection system 422. Unacceptable particles 158 exiting the light box 460 are diverted to a reject chute 484 via the cycling of an appropriate air jet 482.

Commodity Collection, Analysis, and Storage Machine

Embodiments of the commodity analysis and collection system including, for example, exemplary systems 100, 300, and 400 discussed above, may function to analyze batches of commodity independently. In other embodiments, the analysis and collection system may be incorporated within a larger consumption-based product and/or service sales mechanism, system, or machine that incorporates one or more of the analysis and collection systems.

Figure 19:
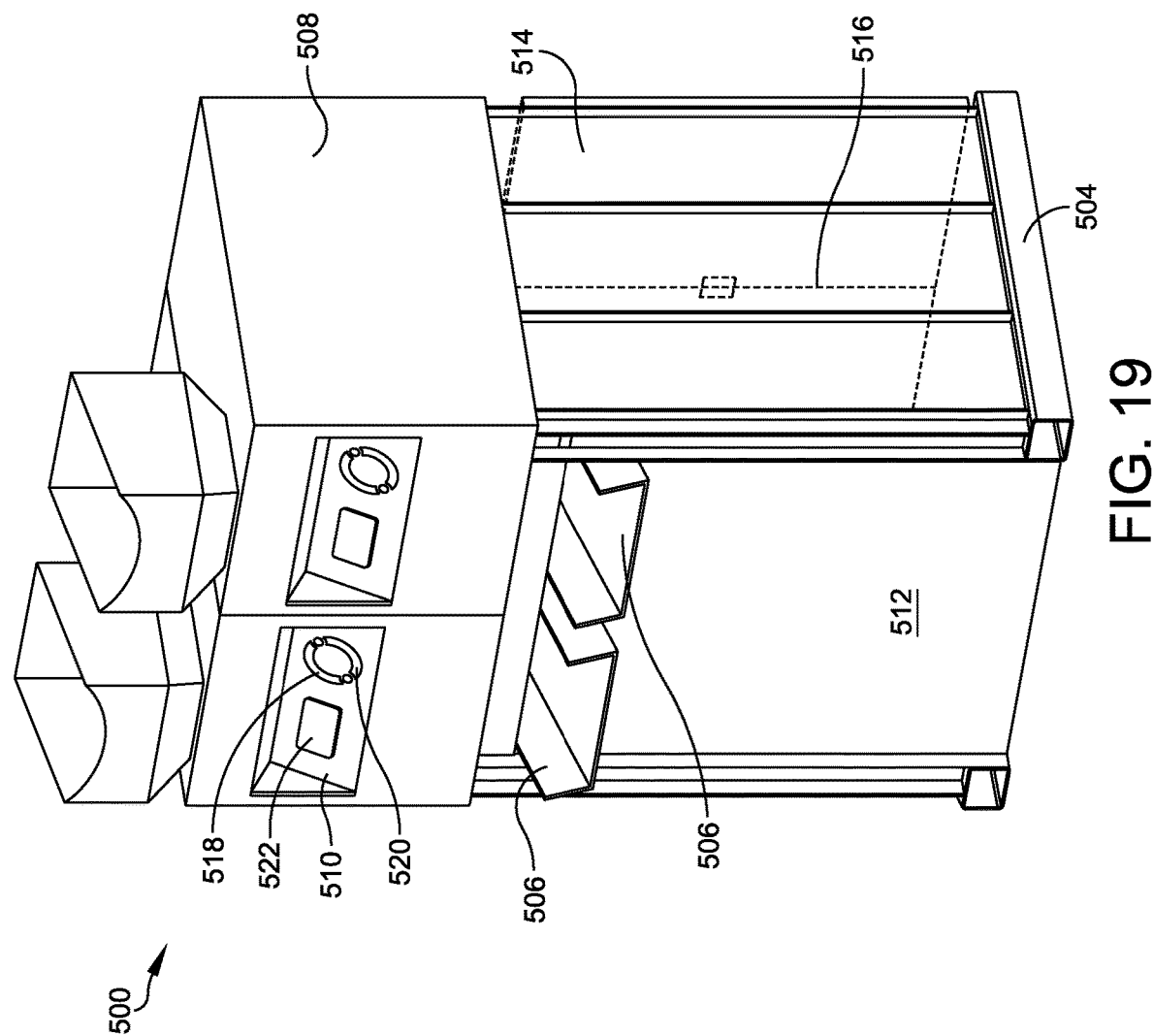
FIG. 19 illustrates a perspective view of one embodiment of a commodity analysis, collection, and storage machine.
Figure 20:
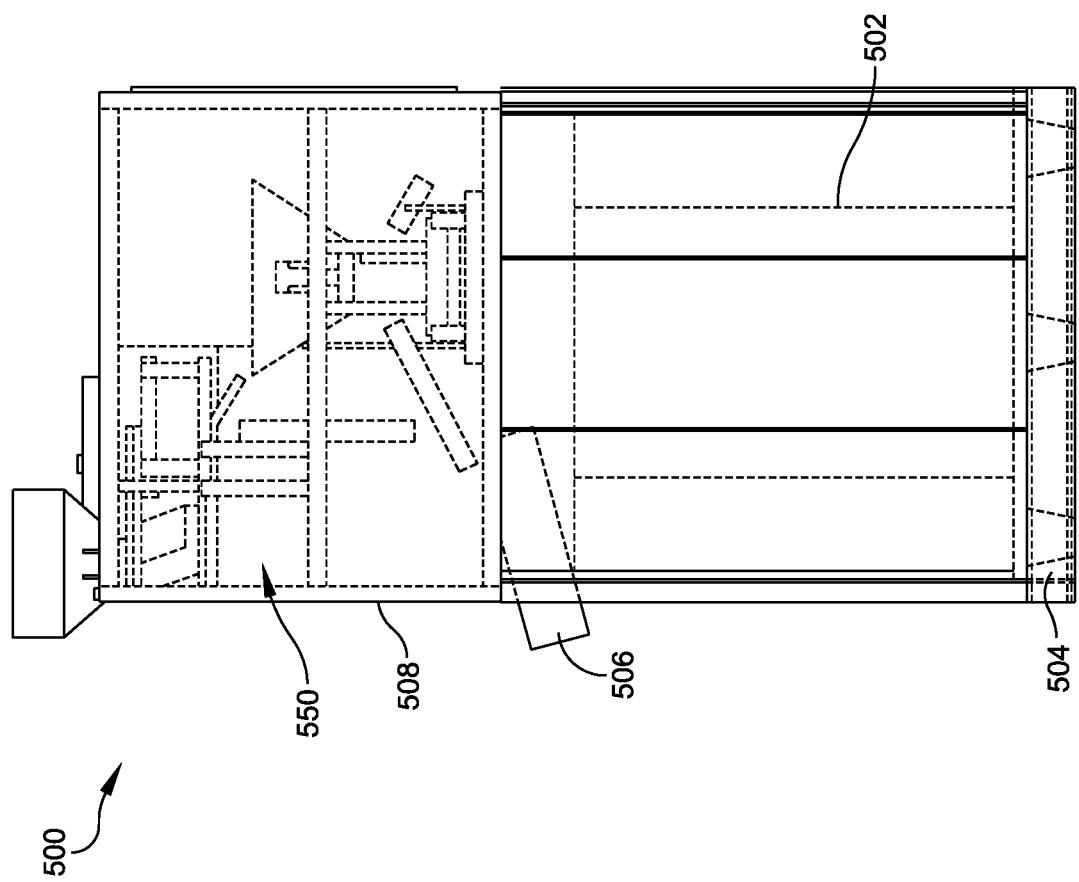
FIG. 20 illustrates a side view of the commodity analysis, collection, and storage machine of FIG. 19.

FIGS. 19-20 illustrate perspective and side views of one embodiment of a consumption-based sales system in the form of a commodity analysis, collection, and storage machine 500. In this embodiment, the commodity analysis, collection, and storage machine 500 may incorporate two side-by-side analysis and collection systems 550 stacked above a bulk storage container 502. Each analysis and collection system 550 may be a system similar to the analysis and collection system 100 or 300 discussed above. The bulk storage container 502 may be large enough to support or fit a standard Gaylord box. In one embodiment, the bulk storage container 502 may include three solid walls 512 and a fourth wall 514 comprising a single or double set of hinged, locking access doors 516. The bulk storage container 502 may be formed from a combination of welded-steel and aluminum extrusion construction. The container 502 may be powder coated for longevity.

In this embodiment, the machine 500 may also include a support base 504, and a return chute 506 associated with each of the analysis and collection systems 550. The internal workings of the analysis and collection systems 550 may be protected by and wrapped within a shell 508, with two display panel systems 510 disposed at the front of the shell 508. One display panel systems 510 is operably coupled with a corresponding one of the commodity analysis and collection systems 550.

In this embodiment, the display panel system 510 includes a number of indicators and a user interface 522 that allows a user such as the commodity seller or an operator of the machine 500 to interact with the machine 500, including the analysis and collection system 550 situated therein. More specifically, and by way of example, the display panel system 510 may include a machine ready (e.g., green) indicator light 518 and a machine fault (e.g., red) indicator light 520. The display panel system 510 may also include a user interface 522 incorporated within a computing device (e.g., an Android or Apple OS device) running a machine interface application in communication with the AI analysis and collection module 111 of the analysis and collection system 100. The graphical user interface 522 may provide and/or display a number of selections, options, and/or notifications to the user operating the machine 550 including, for example, machine power, machine ready, transaction in progress, analysis in process, rejecting goods, making payment, collecting goods, machine fault, analysis results, and/or machine reset.

Figure 21:
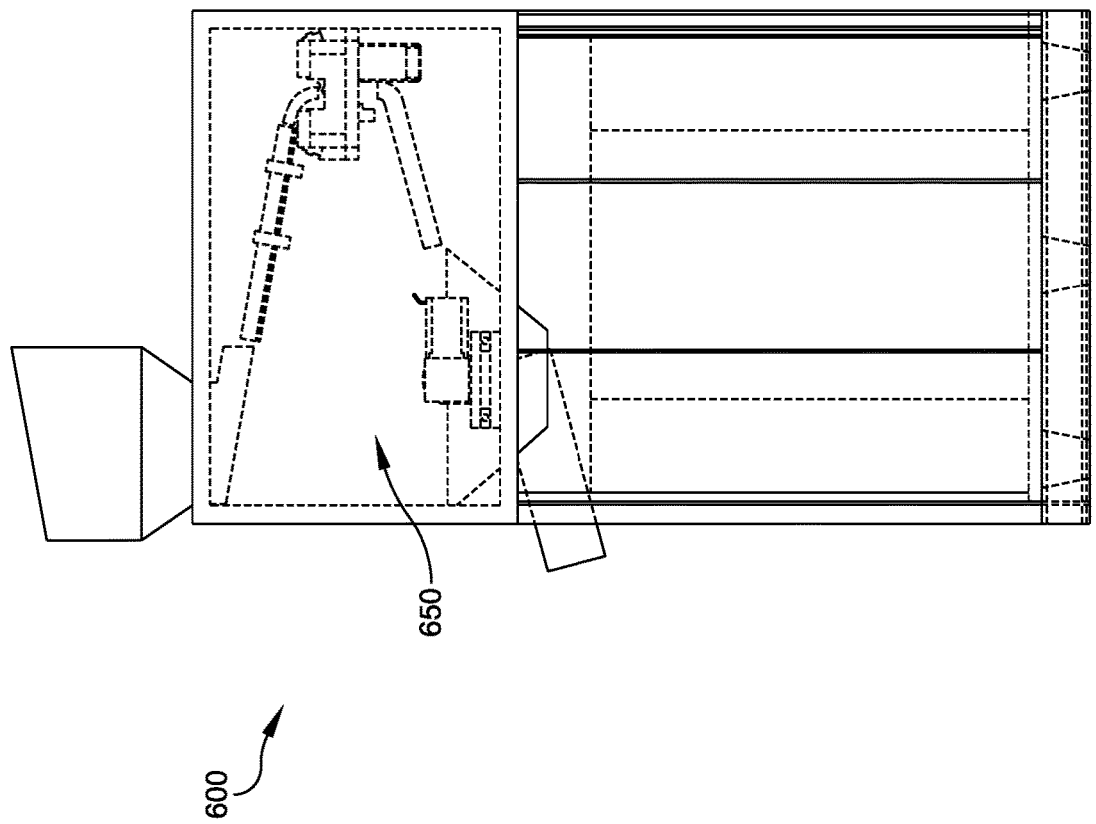
FIG. 21 illustrates a side view of another embodiment of a commodity analysis, collection, and storage machine.

FIG. 21 illustrates a side view of another embodiment of a commodity analysis, collection, and storage machine 600. The machine 600 may be similar to the machine 500 discussed above in relation to FIGS. 19-20, but may incorporate two side-by-side analysis and collection systems 650. Each analysis and collection system 650 may be a system similar to the analysis and collection system 400 discussed above in relation to FIG. 18.

Using embodiments of the machine 500, 600, a commodity seller such as, by way of limited example, a coffee farmer may approach the machine 500, 600, which may be located in a remote area that is typically underserviced within the existing commodity-sales paradigm, and disperse his or her batch of material into the machine to initiate a sales transaction. The sales transaction may entail real-time analysis, collection, and, if the seller agrees to a payment price offered on the basis of the analysis results, immediate sale of the seller's batch of commodity particles, with all payments automatically and digitally distributed to the various stakeholders to the transaction, as detailed below in relation to the consumption-based resource allocation system of FIG. 23.

An embodiment of a single commodity analysis, collection, and storage machine 500, 600 may be configured to serve the needs of a particular geographic region depending on the commodities sold in that region, the quantities in which those commodities are produced, ease of travel, the political climate, maintenance availability, and so on. For example, one machine 500, 600 may cover a region encompassing approximately 346 hectares (ha), which equals approximately 1.33 mi² or the relative size of Central Park in New York City, N.Y. Embodiments of the machine 500, 600 may be positioned within production areas such as, for example, the coffee production region or regions of Côte d'Ivoire, Africa or any other commodity-production regions across the world, as necessary or desired.

Figure 22:
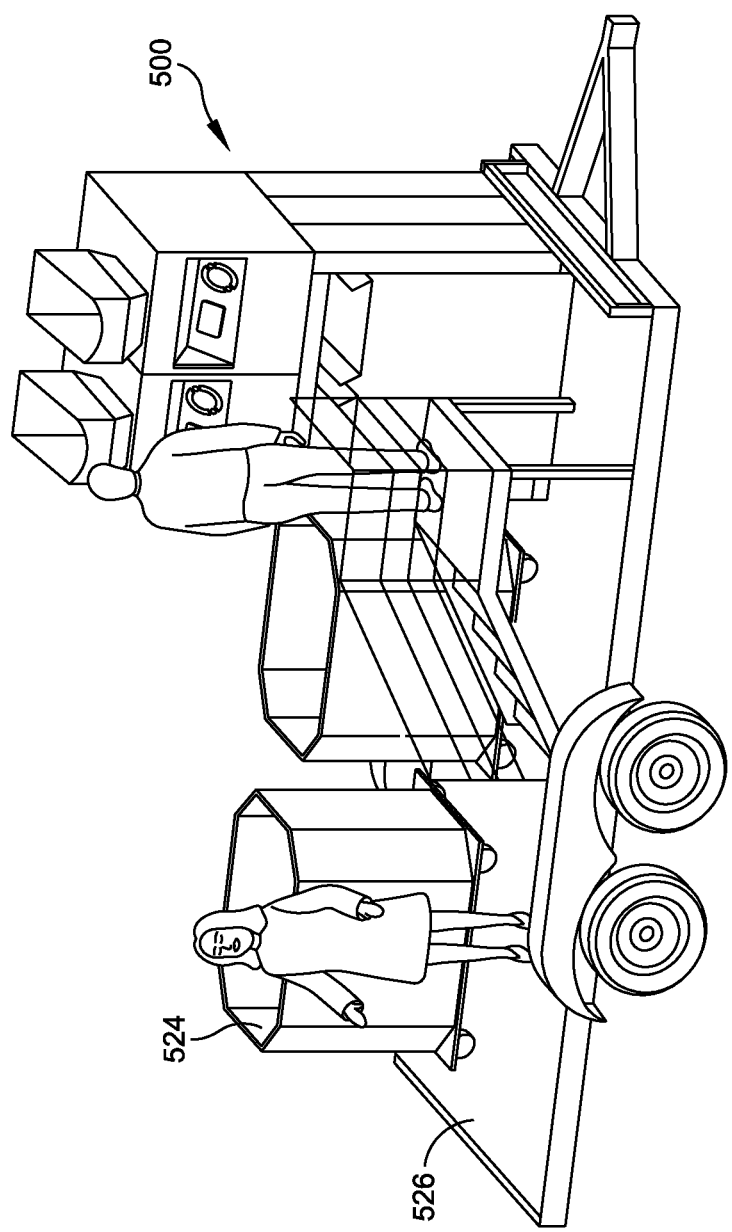
FIG. 22 illustrates the commodity analysis, collection and storage machine of FIG. 19, as mounted upon a trailer for portability.

Embodiments of the machine 500, 600 may be permanently or semi-permanently installed for stationary use or they may be mobile such that the machine 500, 600 is transportable between serviced regions as necessary (e.g., seasonally, etc.). For example, FIG. 22 illustrates a perspective view of an embodiment of the machine 500 installed upon a pull trailer 526, along with extra bulk storage bins 524.

Consumption-based Resource-allocation System

Embodiments of the commodity analysis, collection, and storage machine 500, 600 may incorporate, include, or be associated with a consumption-based resource-allocation system. FIG. 23 illustrates a functional diagram depicting the commodity collection, analysis, and storage machine 500, as associated with one exemplary embodiment of a consumption-based resource-allocation system 700. The functionality of the resource-allocation system 700 may be combined in a single computing platform or distributed across a number of computing platforms as desired and/or necessary in various embodiments. The distribution of processing, storage, software instructions and algorithms, and user interfaces may be distributed in any appropriate manner across any number of computing platforms that are similarly or disparately geographically situated.

Figure 23:
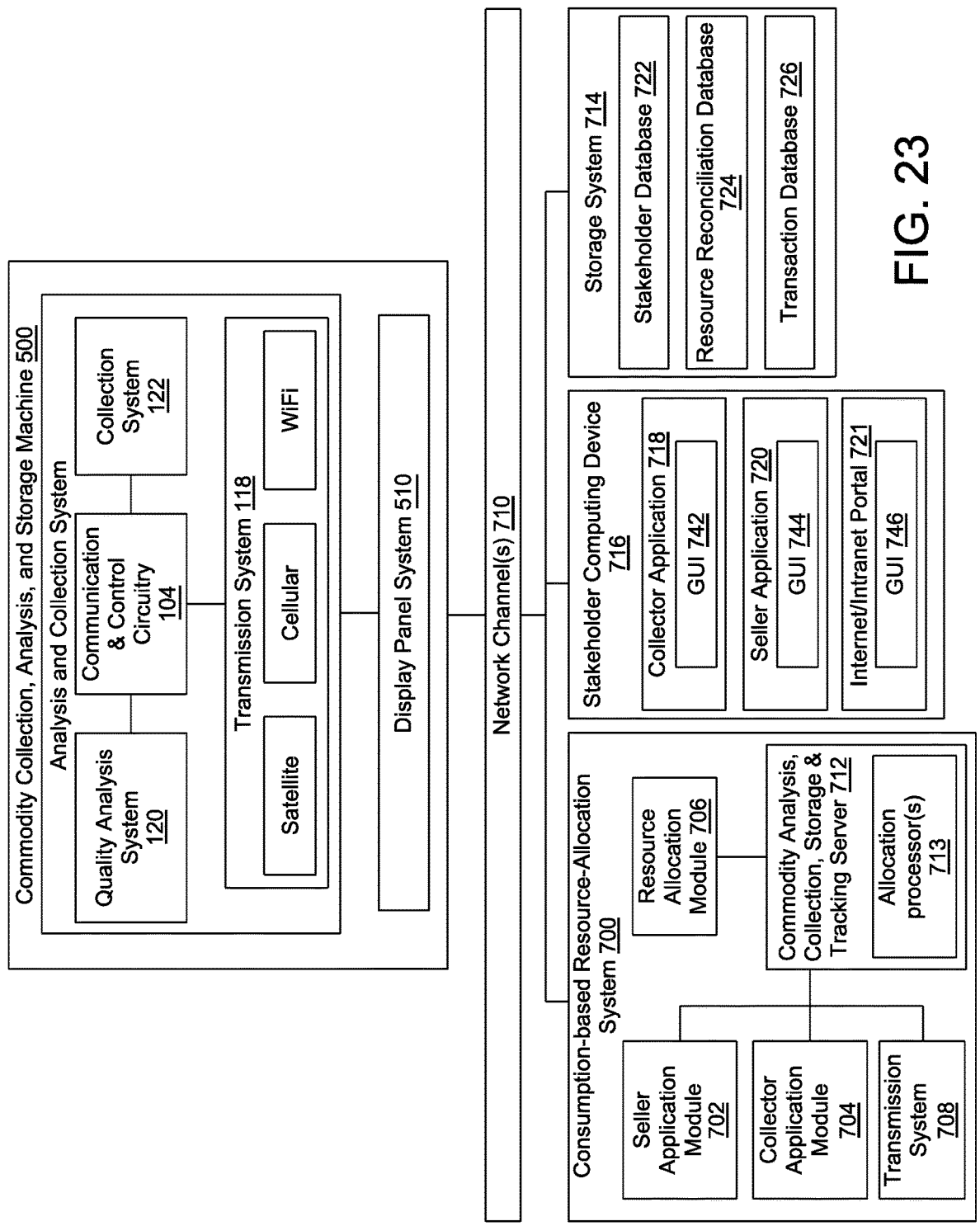
FIG. 23 illustrates a functional schematic of one embodiment of a consumption-based resource-allocation system in communication with an embodiment of a commodity collection, analysis, and storage machine, a stakeholder computing device, and a storage system.

In this embodiment, shown in FIG. 23, the resource-allocation system 700 may include a seller application module 702, a collector application module 704, a resource-allocation module 706, and a commodity analysis, collection, storage and tracking server 712 having one or more allocation processors 713, each in communication via a wireless transmission system 708 and one or more network/communication channels 710 with the collection, analysis, and storage machine 500, as well as a storage system 714 and one or more stakeholder computing devices 716 such as, for example, a laptop computer, tablet computer, desktop computer, and/or smartphone. In this embodiment, the storage system 714 may house a variety of databases storing information and/or data relevant to the sales transactions occurring at the machine 500 and in collaboration with the resource allocation system 700. For example, the storage system may house a stakeholder database 722, a resource reconciliation database 724, and a transaction database 726.

In one embodiment, the stakeholder database 722 may include stakeholder data such as an entity name or ID, contact information, and banking information (e.g., a bank account number, a routing number, authorized personnel, etc.) associated with a number of stakeholders to the commodity sales transaction completed at the machine 500. Stakeholders may include, for example, the seller (e.g., the farmer, miner, COOP), the collector machine 500 owner or operator (the "collector"), the buyer (e.g., regional or international trader such as Starbucks, Nestle, Stumptown, Wholefoods, etc.), the lending financial institution, governmental entities (e.g., local, regional, and/or national government taxation entities), social initiative entities (e.g., churches, hospitals, Internet, power, and/or schools ("CHIPS") entities), NGOs running the social initiative entities, and entities that will later enter the supply chain such as, in the case of coffee, the roaster, the wholesaler, the coffee shop, and the end consumer.

The resource reconciliation database may 724 may include resource-allocation data and/or details regarding the various contracts between, and/or the legal requirements of, the various stakeholders to the transaction, all of which define how the payment price or proceeds from the transaction occurring at the machine 500 must be dispersed amongst the stakeholders upon completion of the transaction. In the example of a seller who has a bank loan secured by his coffee plantation, where the proceeds from the sale of coffee cherries harvested from the plantation are to be used to pay down the loan, the resource reconciliation database 724 may include loan terms such as the principal amount of the loan, the current principal balance, the interest rate, loan duration, and so on. In another example, the resource reconciliation database 724 may define the taxation rates applicable to the sale of commodities within the region and/or the country of the transaction. In yet another example, the resource reconciliation database 724 may define contractual obligations made by stakeholders to the transaction to one or more social initiative entities. For instance, the owner of the collector machine 500 may have pledged or contracted to donate a certain percentage of the payment price of every transaction made within a specific region to local educational or medical programs.

The transaction database 726 may store analysis and collection or transaction data, or details specific to each of the transactions, including, for example, a batch ID, a farm ID, a farmer ID, a COOP ID, a buyer ID, a country ID, a date of harvest, a date of collection, a date of drying, a size/weight of the batch, a latitude and longitude of the of the harvest site or the collector machine 500, the analysis results for the batch including quality ratings and a specific gravity of the batch, weather history during batch growth, the payment price, the benefiting social initiative entity, the current goal of the social initiative entity, the amount raised to date, the status of the social initiative entity, and/or relevant images/video of the batch of particles during growth or otherwise.

In this embodiment, the resource-allocation module 706 may include instructions regarding particle pricing based on analysis attributes, including the total weight and the total or proportioned quality ratings, assigned to a batch of commodity particles that has been analyzed and collected by an embodiment of the analysis and collection system 100 and its quality analysis system 120, discussed above. That is, the analysis, collection, storage and tracking server 712 may utilize the allocation processor(s) 713 to execute the resource-allocation module 706. By accessing the stored data within the stakeholder, resource, and transaction databases 722, 724, 726 to apply the analysis results 190 (FIG. 9) of the analysis and collection system 100, the processor(s) 713 and the resource allocation module 706 may determine a value, expressed as a payment price, for the batch of particles dispersed into the analysis and collection system 100 of the machine 500. The value may be represented as a number of cryptocurrency tokens that may have an exchange rate, as desired and/or appropriate, into any relevant currency including, for example, a local fiat currency or any other currency for which a validated exchange rate to the cryptocurrency token has been established such as USD, EUR, Bitcoin, Ether, Lumen, etc.

The payment price may be presented to the seller via a seller application 720 and to an operator/owner of the machine 500, or the collector, via a collector application 718. Each of the seller application 720 and the collector application 718 may be downloaded to the respective stakeholder computing device 716 from an application store (e.g., Google play, Apple Store, etc.) or from a proprietary website and installed upon the device 716. Alternatively, the seller and the collector applications 718, 720 may be web based and accessible through an Internet or Intranet portal 721 available on the computing device 716. While the collector and the seller applications 718, 720 are described herein as independent applications, the functionality of each may be incorporated into one mobile or web-based application having different user logins, access permissions, and graphical user interfaces for each of the seller and the collector.

In addition to instructions regarding determining the payment price, the resource allocation module 706 may also include instructions regarding an allocation of the payment price, if accepted by the seller and the transaction completed, amongst the various stakeholders to the transaction. These instructions may leverage data stored in the databases 722, 724, and 726 including, for example, the loan terms between the seller and the lending bank, contracts between the seller and other stakeholders, taxes and/or fees owed to governmental entities, and so on. Using the stored data, the server 712 may execute the resource allocation module 706 to determine a payment structure for the transaction. Based on the payment structure, the consumption-based resource-allocation system 700 may automatically and digitally transfer all appropriate payments to the relevant stakeholders.

FIGS. 24A-B provide an exemplary payment summary 730 that may be presented to the collector and the seller via the collector and the seller applications 718, 720 upon completion of a transaction. The payment structure may present a weight and quality summary 732. The quality summary 732 may summarize any relevant weights, percentages, quality ratings, and/or analysis attributes determined by the quality analysis system 120 and/or the collection system 122, discussed above. In this embodiment shown in FIG. 24A, the quality summary 732 includes a transaction ID ("ID T"), along with a quality grade, quantity, and price per unit associated with each grade of coffee cherry of the batch dispersed into the machine 500. Here, transaction number 22 included 2.1 kg of Grade A coffee at $5.50/kg, 4.2 kg of Grade B coffee at $4.50/kg, and 14.7 kg of Grade C coffee at $3.50/kg, for a total payment price of $81.90.

The payment summary 730 may also include a payment structure 734, which provides a breakdown of the payment price for the transaction, as mandated by contract, agreement, judicial judgement, national or local regulation, or any other authority. In the example shown in FIG. 24A, the payment structure 734 provides that a payment price for a batch of coffee purchased by buyer number 3 (BuyerNum 3) at machine number 6, which is owned by collector number 5 (CollectorNum 5) is divided into four primary parts: 67.50% equaling a seller payment, 20% equaling a collector payment, 10% equaling a coop payment, and 2.5% equaling a service payment for the machine and resource-allocation system. Of the 20% collector payment, 4% is directed to the lending bank and 16% is directed to the collector.

In this embodiment, the payment summary 730 may also include a quality summary 736, which provides a breakout of the coffee quality ratings at various stages of the supply chain. For example, the quality summary 736 may provide a breakout of the quality ratings at the stage of collection at the machine 500 (10% Grade A, 20% Grade B, and 70% Grade C), as well as a breakout of the assumed quality ratings for later stages in the supply chain, such as at the washing stage (20% Grade A, 30% Grade B, and 50% Grade C) and the export stage (30% Grade A, 35% Grade B, and 35% Grade C). The assumed quality percentages may be made based upon statistical probabilities associated with quality progressions as coffee cherries proceed through the supply chain.

The payment summary 730 may also provide a loan balance sheet 738, which tracks a loan associated with the seller and/or the batch of material dispersed into the machine 500 (e.g., the seller's plantation is loan collateral, the seller's farm equipment is loan collateral, etc.). As shown in FIG. 24B, the loan balance sheet 738 reflects the balance of loan number 6 (L #6), originally for $1800.00 USD, at machine number 6 (M #6) after transaction numbers 21, 22, and 23 (T #21-23). After transaction number 21 for a total bank payment of $3.27, the loan balance is $600.51, with $3.27 interest paid on $5.15 interest owed and $0.00 principal paid. After transaction number 22 for a total bank payment of $3.27, the loan balance is $599.11, with $1.88 interest paid on $1.88 interest owed and $1.39 principal paid. After transaction number 23 for a total bank payment of $3.27, the loan balance is $595.83, with $0.00 interest paid on $0.00 interest owed and $3.27 principal paid.

The payment summary 730 may also present a payment record 740 of the payments automatically and digitally transferred by the consumption-based resource-allocation system 700 at the completion of a transaction. As shown in FIG. 24B, the payment record 740 for transaction 22 reflects five payments 172-176, each from Buyer1 and respectively to Seller2 for $55.28, Collector5 for $13.10, to Bank1 for $3.27, to Coop1 for $8.19, and to ServiceProvider1 for implementing and supporting the system 700 for $2.04, totaling the payment price of $81.90 for transaction 22.

Figure 25:
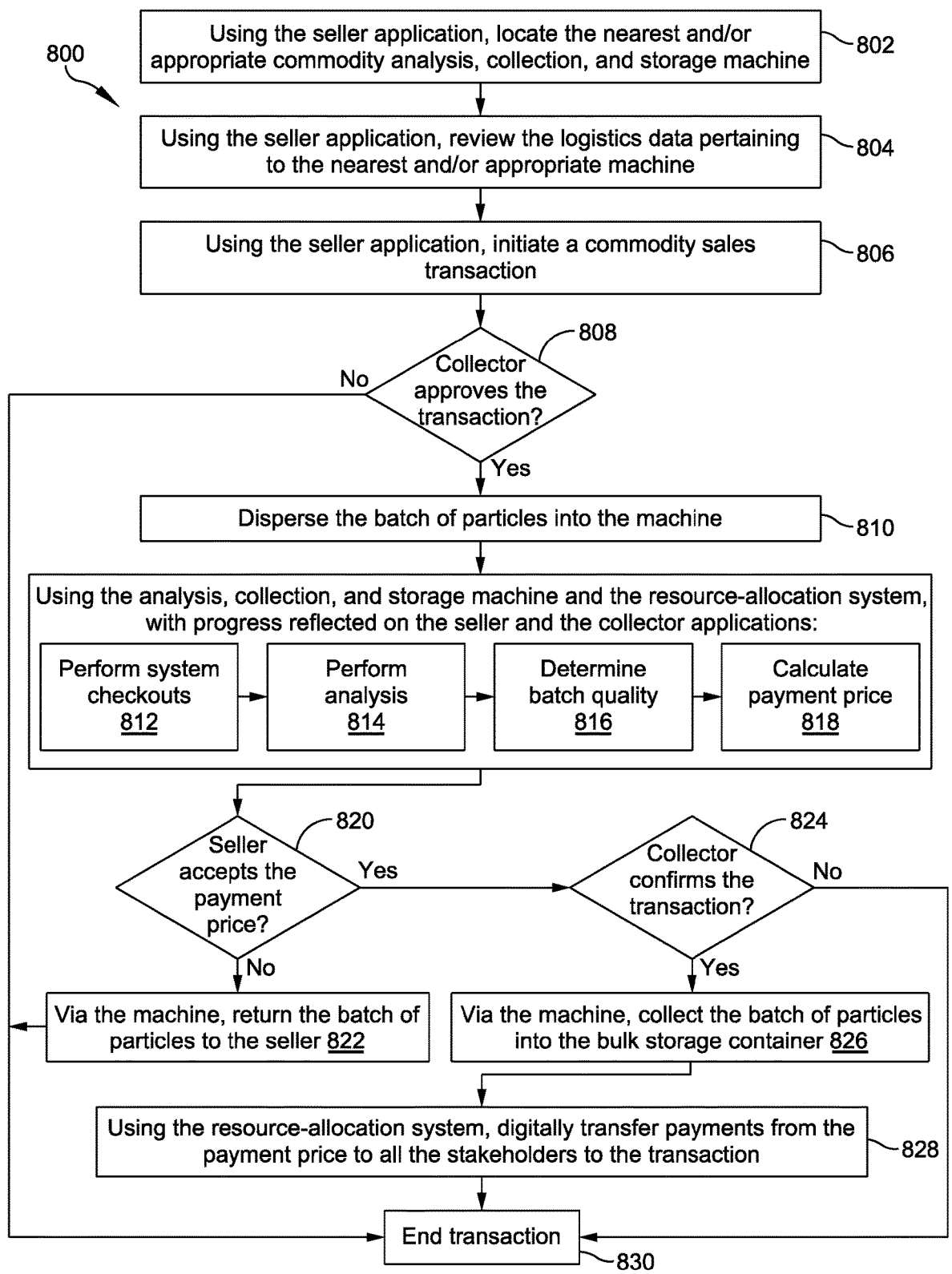
FIG. 25 provides a flowchart depicting an exemplary method of using an embodiment of an analysis, collection, and storage machine, as associated with an embodiment of the consumption-based resource-allocation system of FIG. 23, for the analysis, collection, and allocation of resources associated with a sales transaction for a batch of commodity material particles.
Figure 26A:
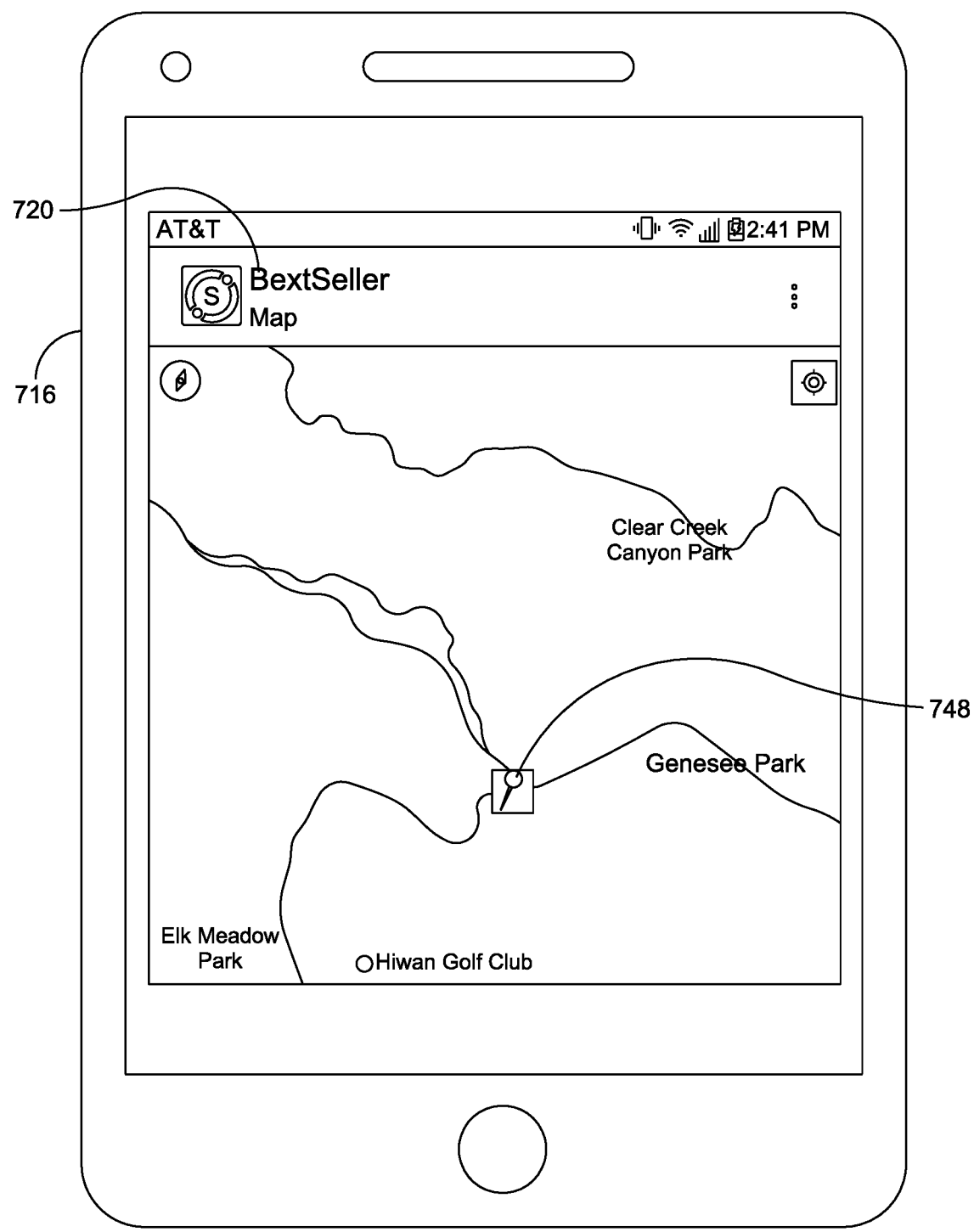
FIGS. 26A-P illustrate the steps of the method of FIG. 25 through a series of screenshots captured from a collector application and a seller application operating on a stakeholder computing device in connection with the consumption-based resource-allocation system of FIG. 23.
Figure 26B:
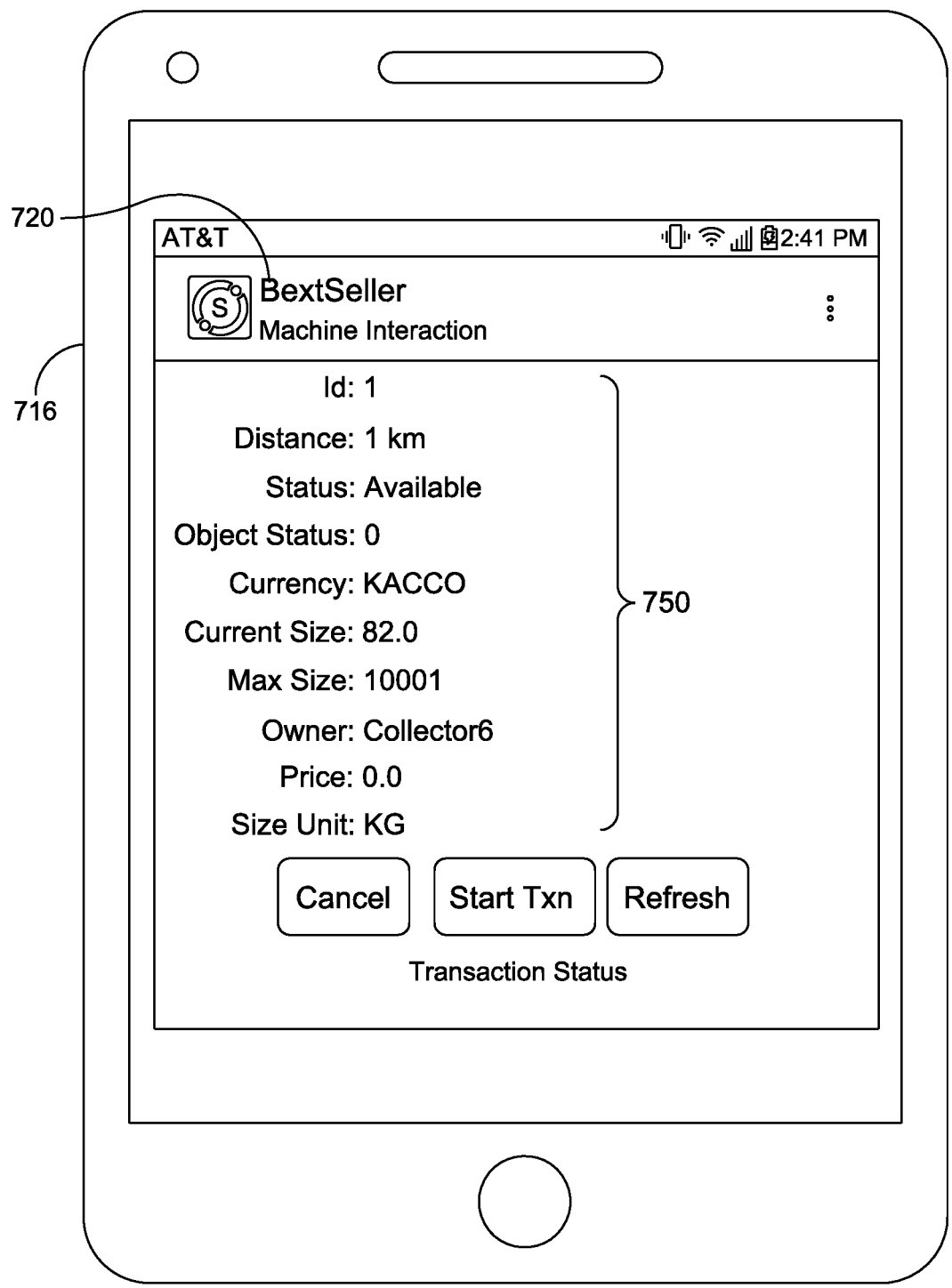

FIG. 25 provides a flowchart depicting an exemplary method (800) of using an embodiment of the machine 500, 600, as including or associated with an embodiment of the consumption-based resource-allocation system 700, for the analysis, collection, and allocation of resources associated with a sales transaction for a batch of commodity material particles 158. FIGS. 26A-P provide a number of screenshots illustrating the steps of the method (800) via exemplary graphical user interfaces 742, 744 of the collector application 718 and the seller application 720, respectively.

The method (800) begins at FIG. 26A, where the seller may employ the GPS function of the associated stakeholder computing device 716 to locate the nearest and/or most appropriate machine 500, 600 via the seller application 720 (802). The location of the nearest or most appropriate machine 500, 600 may be indicated by a pin or other indicator 748. The seller may click on the pin 748 to view logistics data 750 pertaining to the nearest machine (804), as shown in FIG. 26B. The logistics data 750 may include a number of machine parameters such as, for example, a machine ID, the distance from the computing device 716 to the machine, the current status of the machine, the currency paid by the machine, the size units used by the machine, a maximum size of the machine, and a machine-owner ("collector") ID.

Figure 26C:
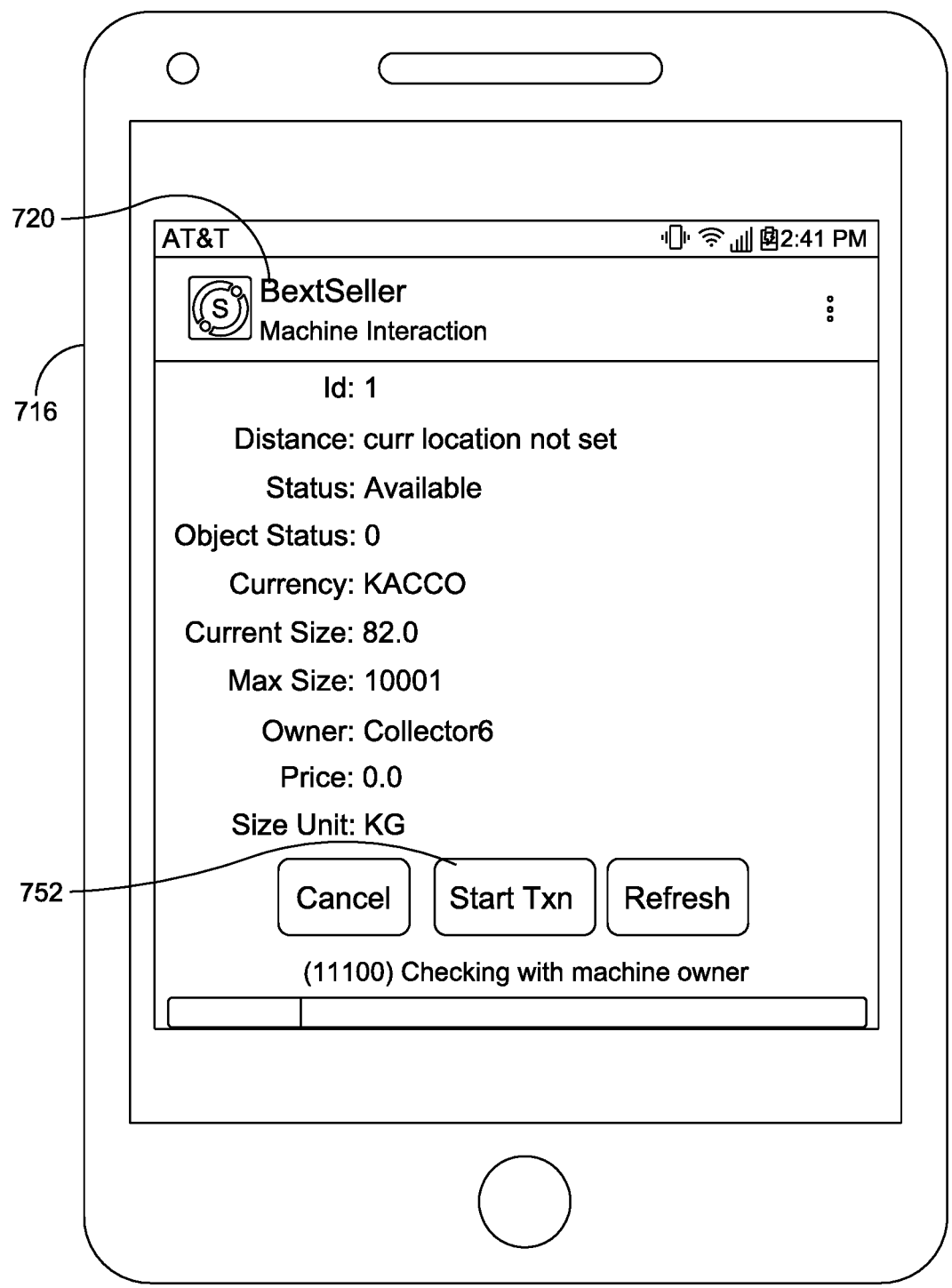
Figure 26D:
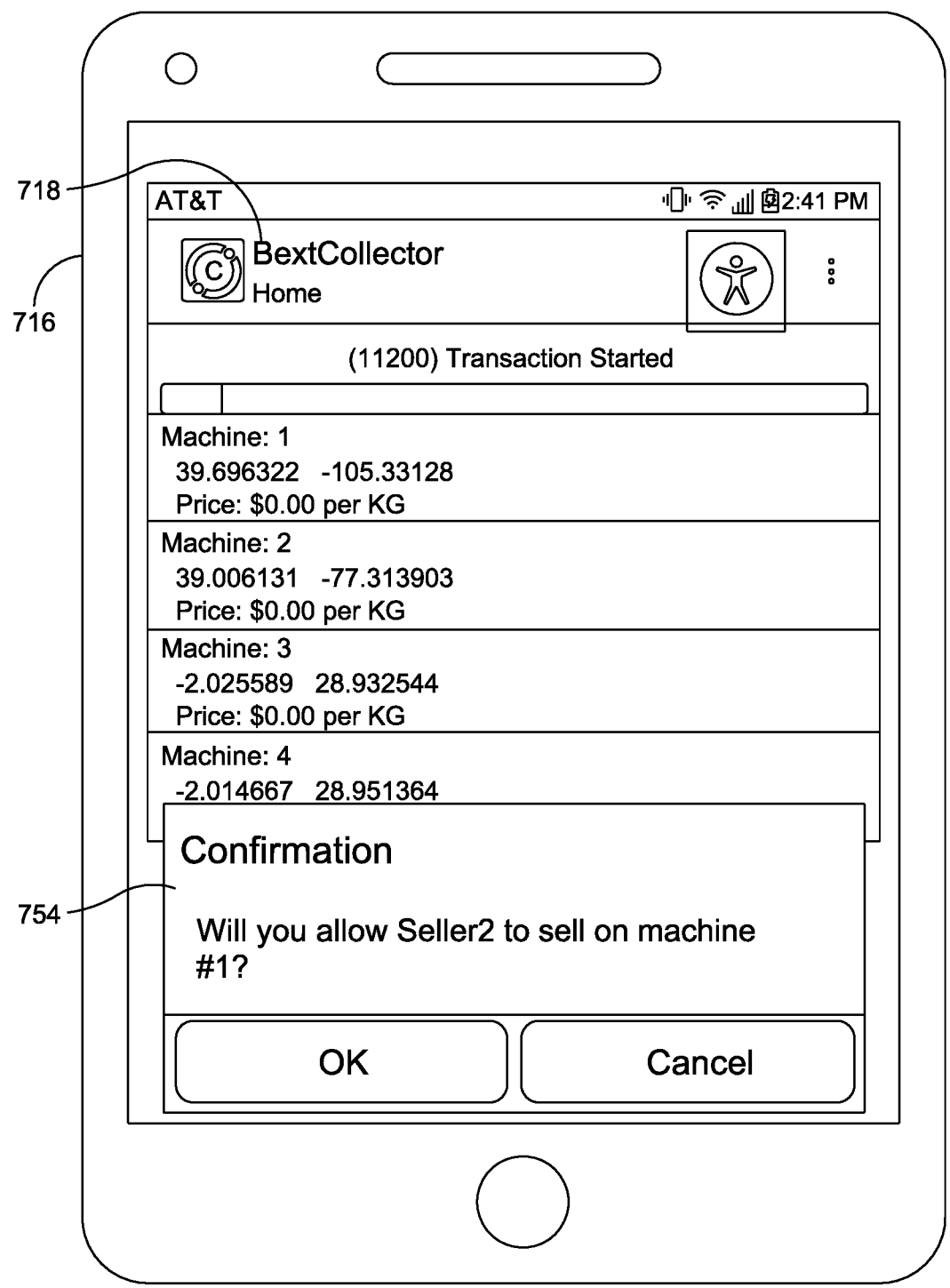
Figure 26E:
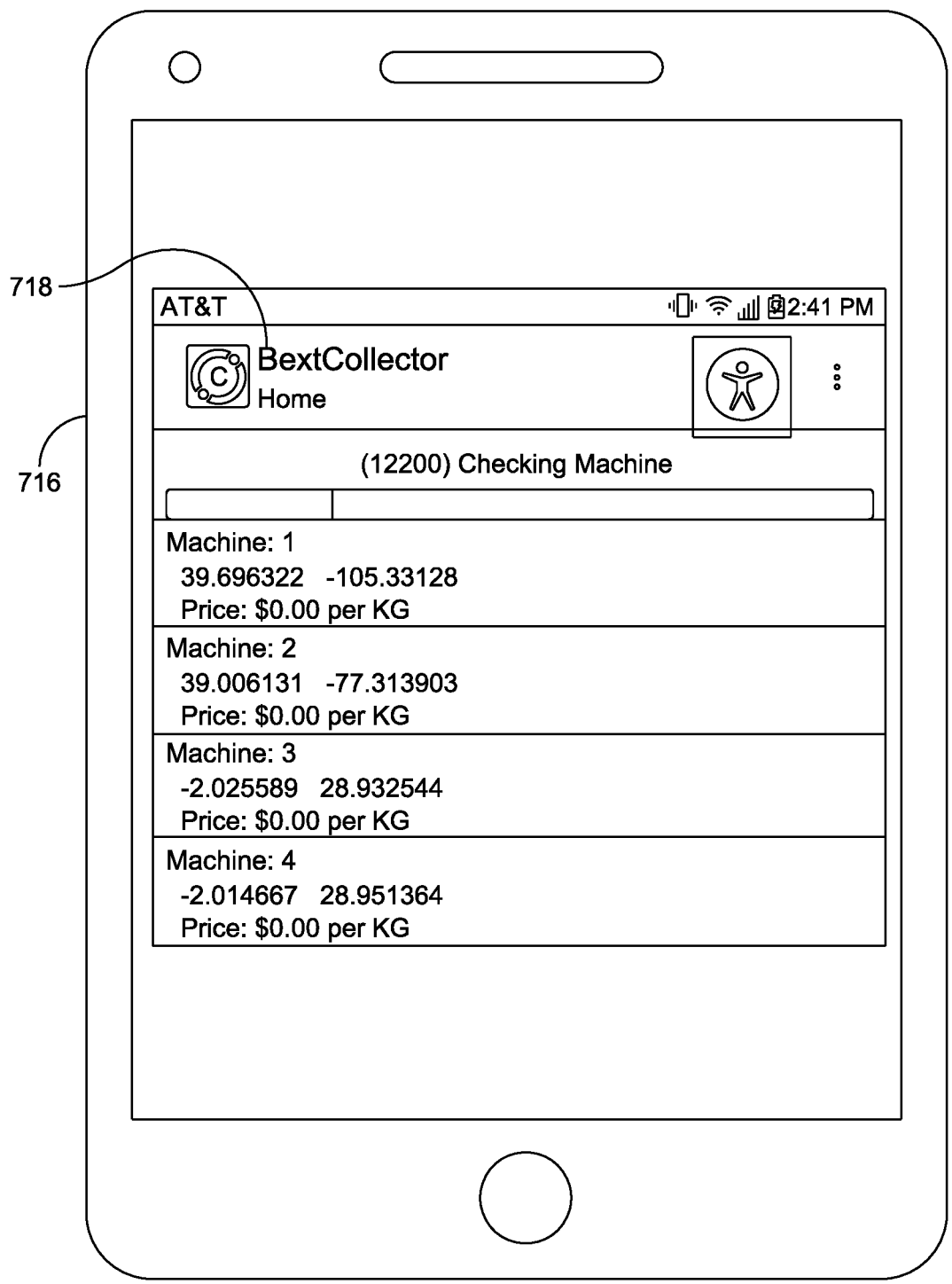
Figure 26F:
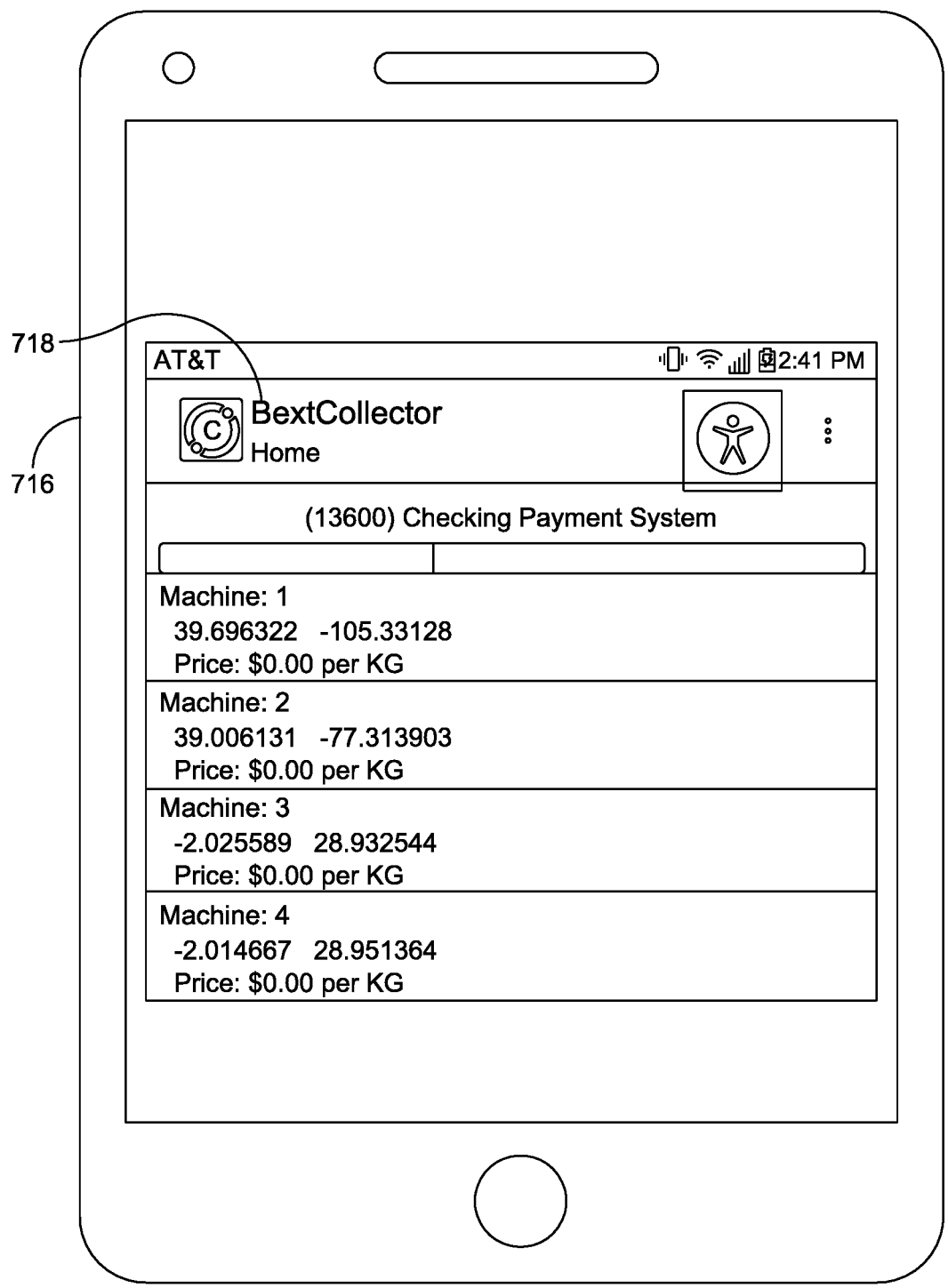
Figure 26G:
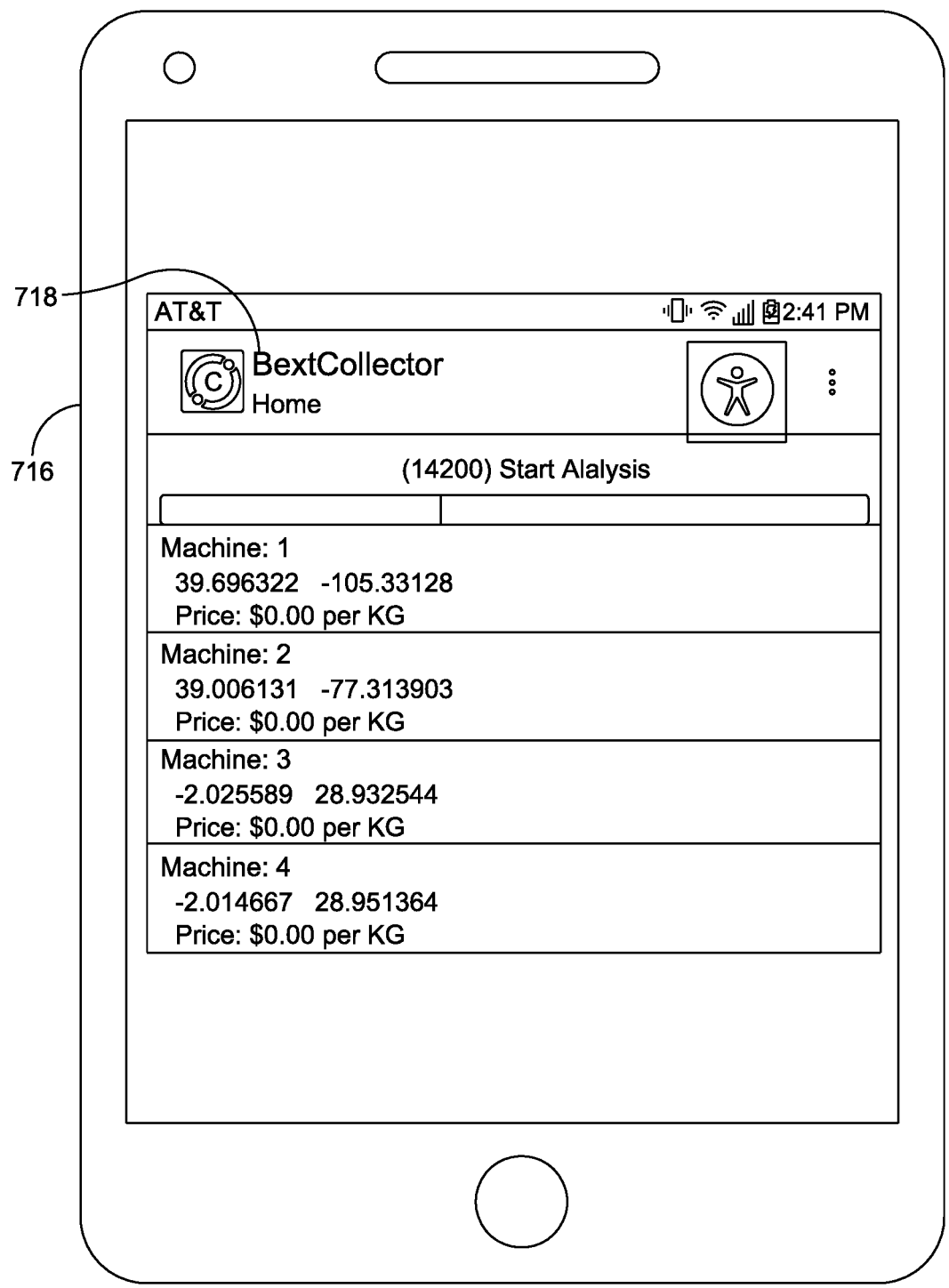
Figure 26H:
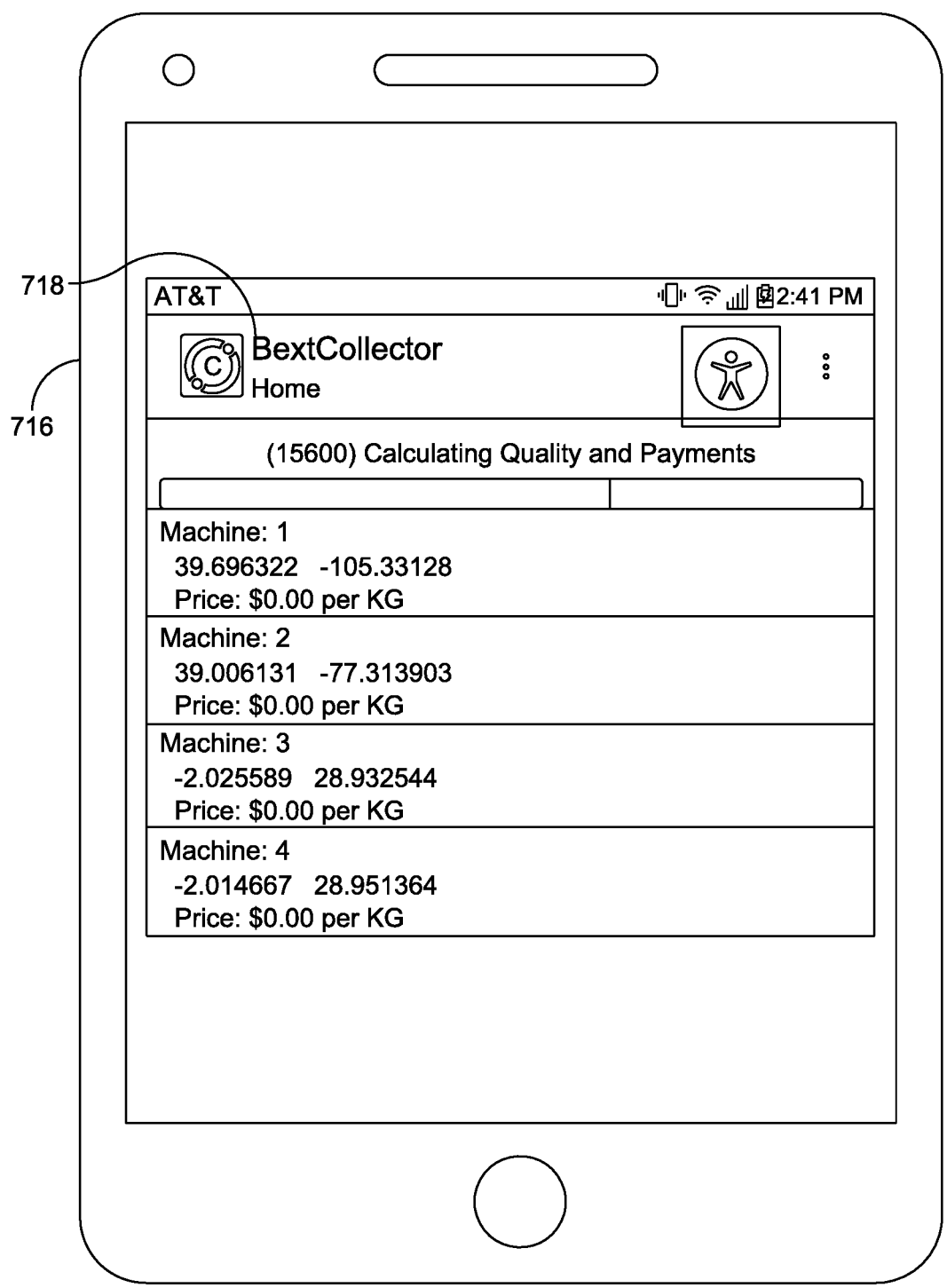

After approaching the machine, the seller may initiate the transaction (806) through the seller application 720 by pressing an initiate button 752 such as, for example, "Start Transaction" or "Start Txn," to wake the machine and request approval by the collector, as shown in FIG. 26C. In response, the collector receives and may approve a request 754 to proceed with the transaction (808) through the collection application 718, as shown in FIG. 26D. Once the collector approves the transaction, the seller's batch of particles 158 may be dispersed into the quality analysis system 120 of the machine 500, 600 (810), after which the seller and/or the collector applications 720, 718 may track the machine 500, 600 as it performs check-outs relating to the analysis, collection, and resource-allocation systems (812), performs the analysis (814), and determines and/or calculates the batch quality (816) and the associated payment price (818), as shown in FIGS. 26E-H.

Figure 26I:
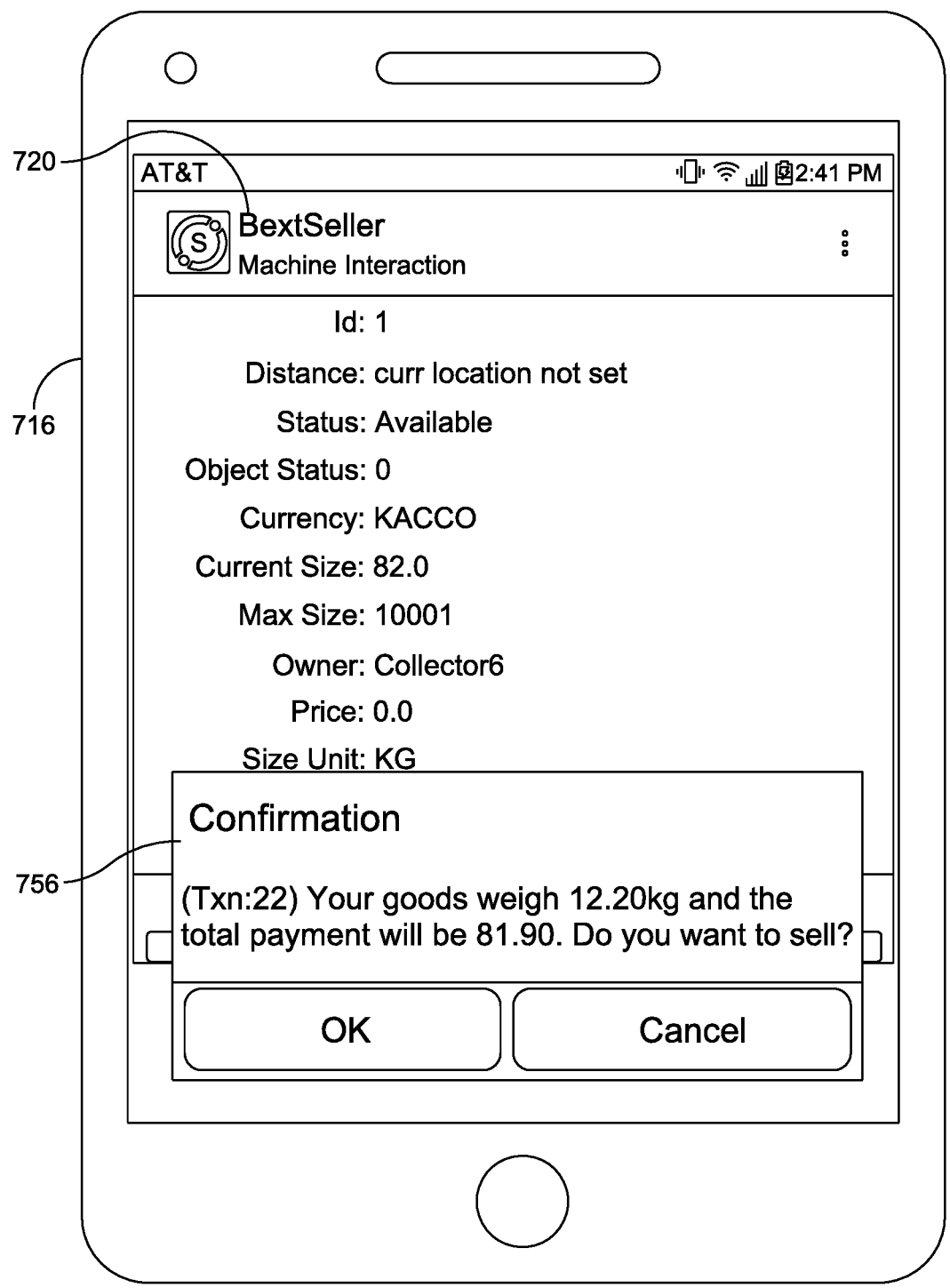
Figure 26J:
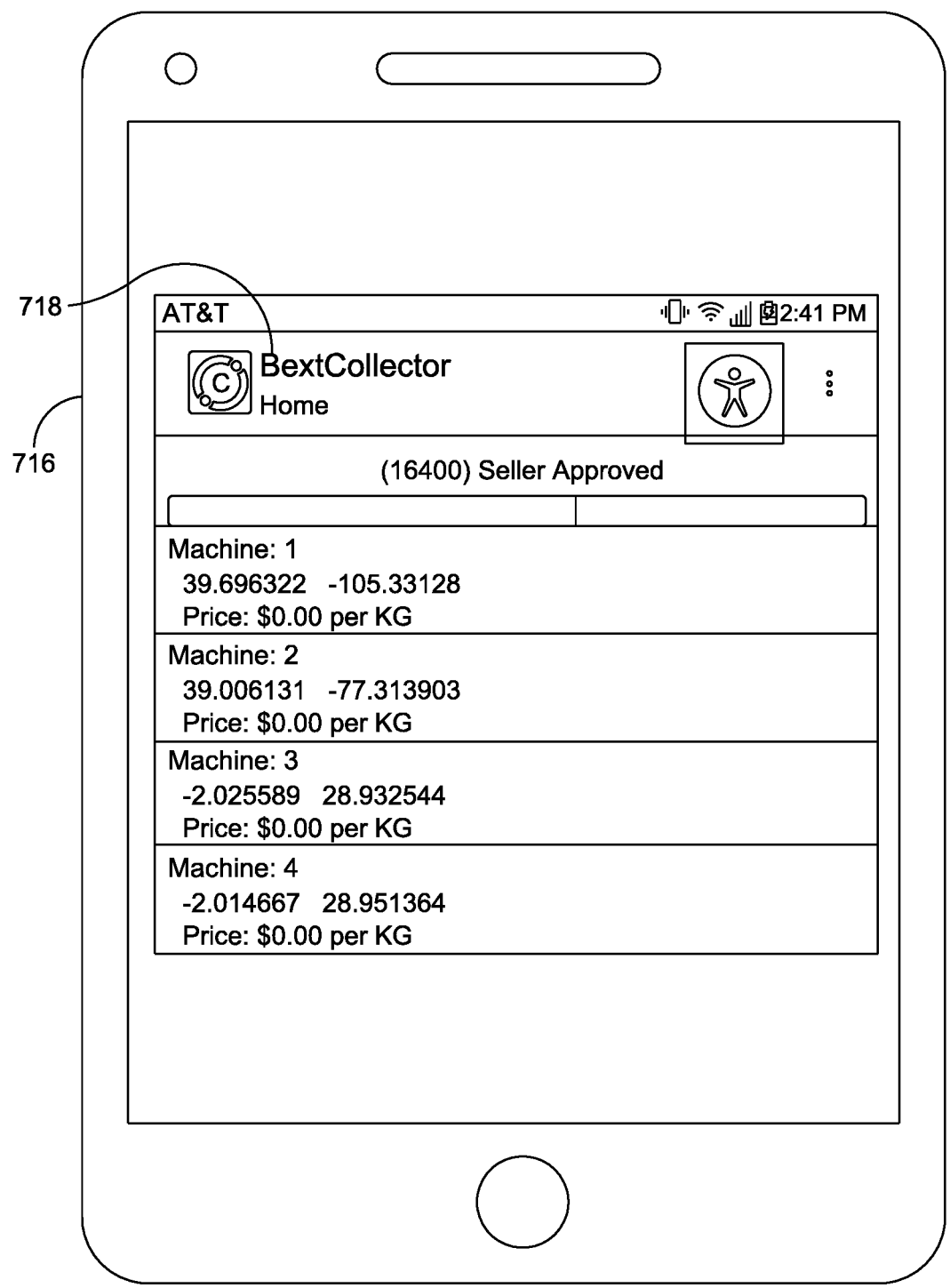
Figure 26K:
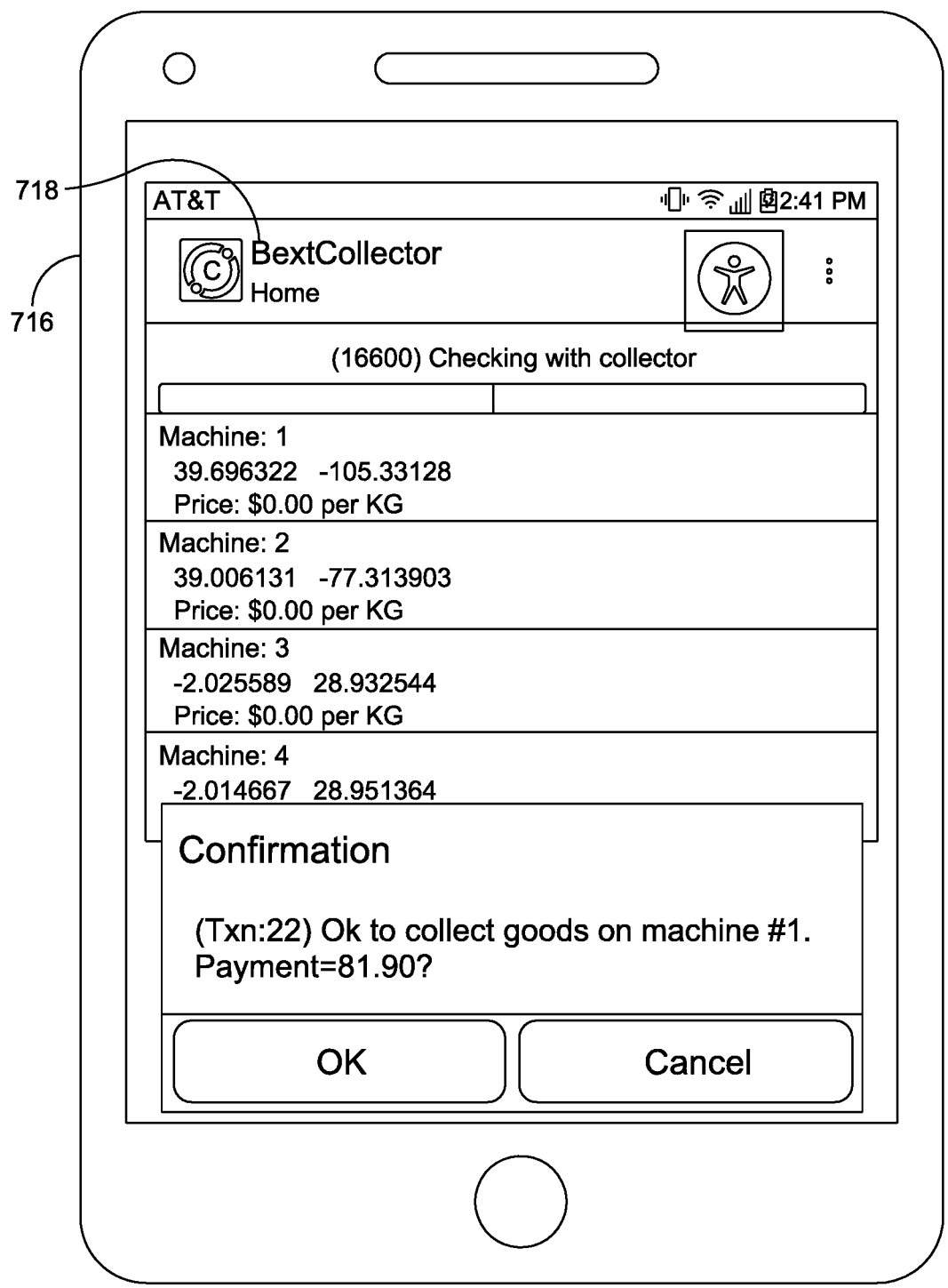

The seller may then receive a collection confirmation request 756 (820) that communicates one or more of the analysis attributes, the quality ratings, and/or the value or payment price to the seller via the seller application 720, thereby allowing the seller to determine whether to accept or reject the payment price and approve the sales transaction, as shown in FIGS. 26I-J. If the seller rejects the payment price, then the rotating weigh hopper 180 may be rotated in the direction of arrow C toward the second reject chute 200 (FIG. 11) to return the particles 158 to the seller (822). If the seller accepts the payment price, then the collector may confirm the sale (824) through the collector application 718, as shown in FIG. 26K, and the weigh scale lift 206 may lower before the rotating weigh hopper 180 of the collection system 122 is rotated in the direction of arrow D toward the material collection chute 202 (FIG. 11) and into the bulk storage container 502 (FIG. 19) (826).

Figure 26L:
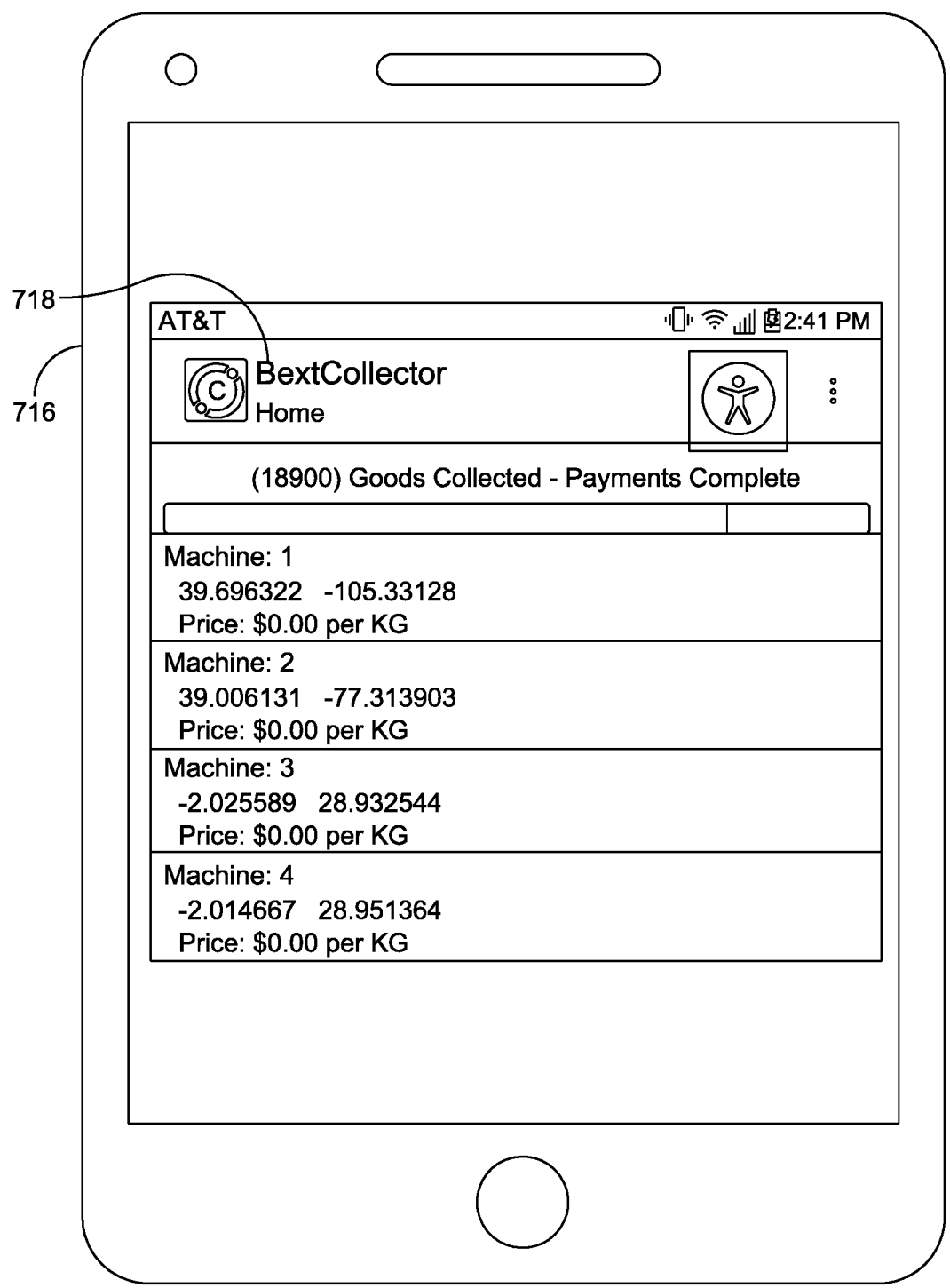
Figure 26M:
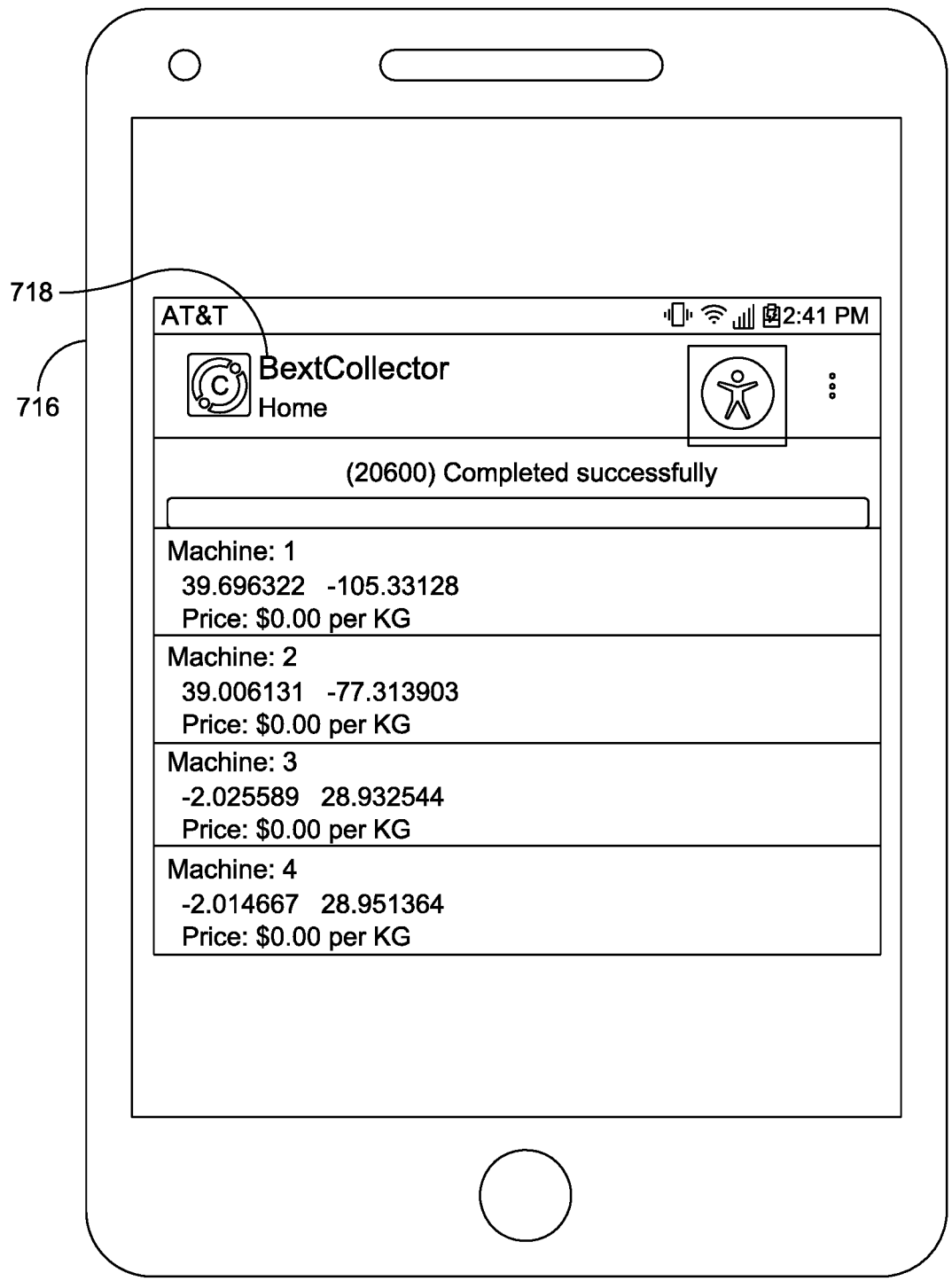
Figure 26N:
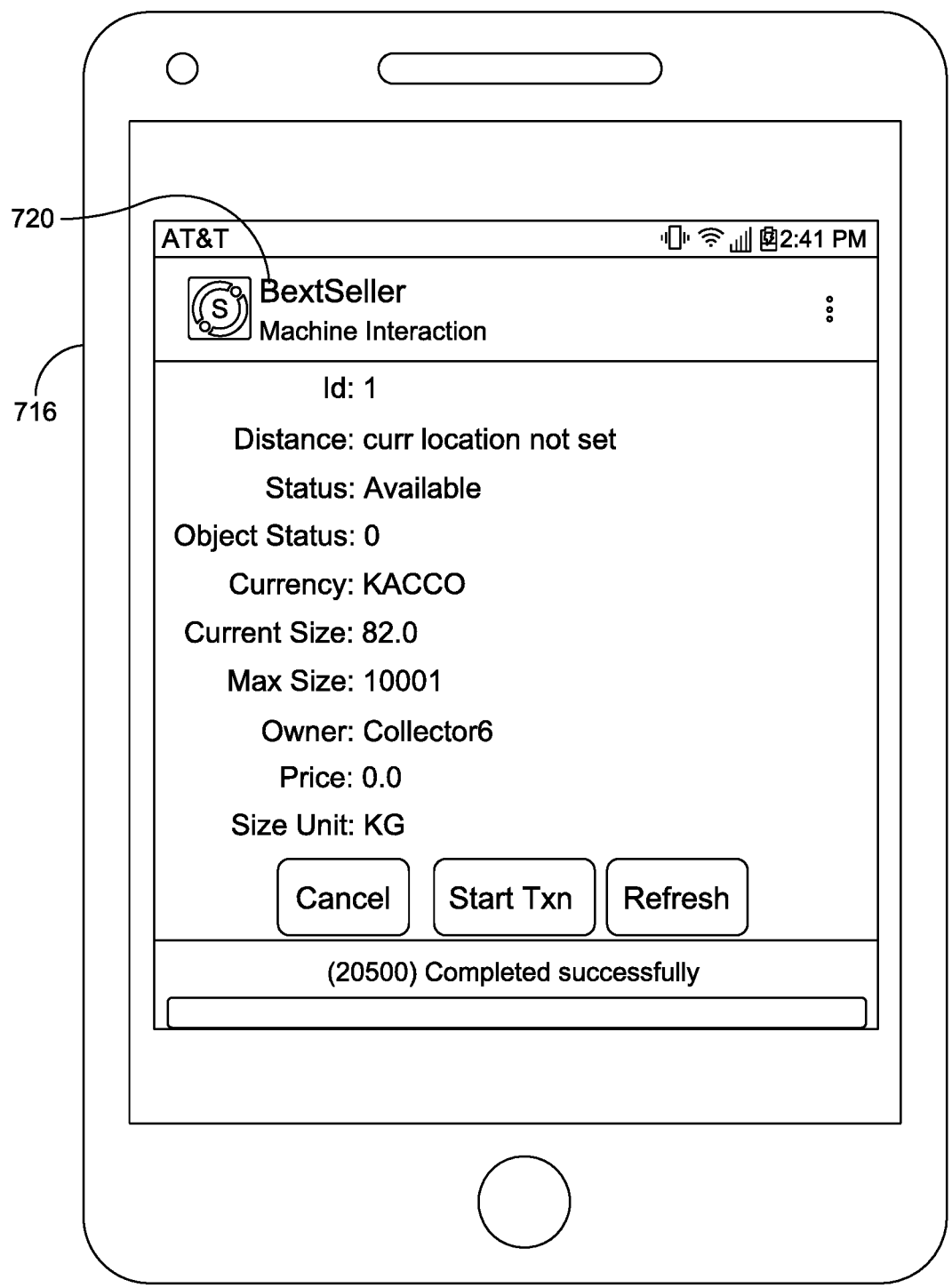

Once the batch of particles 128 is collected (826), the resource-allocation system 700 may employ the processor(s) 713 of the analysis, collection, storage & tracking server 712, in conjunction with the resource-allocation module 706, to automatically and digitally make all requisite payments, as mandated by the payment structure 734 (FIG. 24A) to the various stakeholders to the transaction (828). After collection (826) and payment (828), the seller and/or the collector applications 720, 718 may reflect the successful transaction (830) and reset for an additional transaction, as shown in FIGS. 26L-N.

Figure 26O:
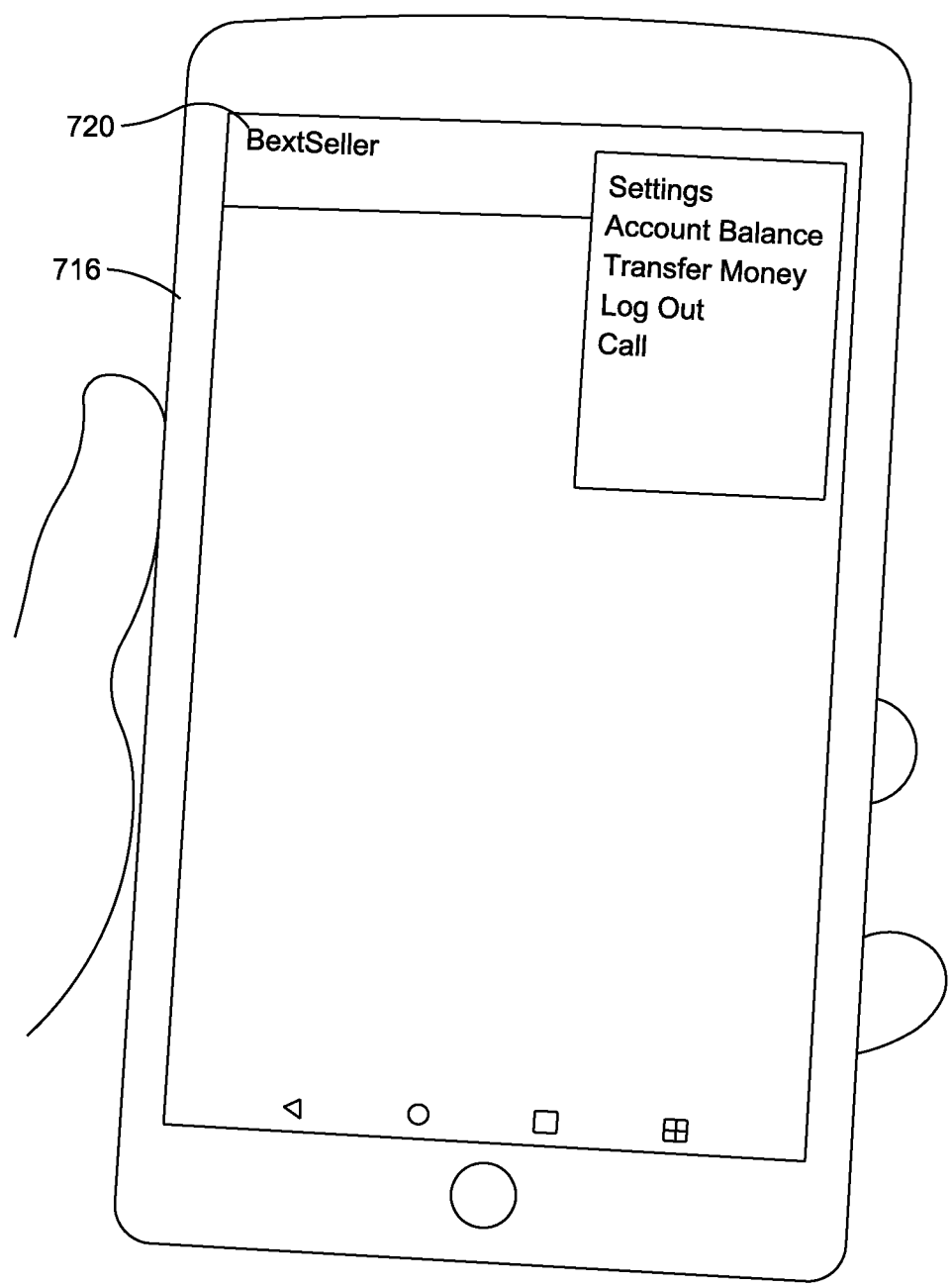
Figure 26P:
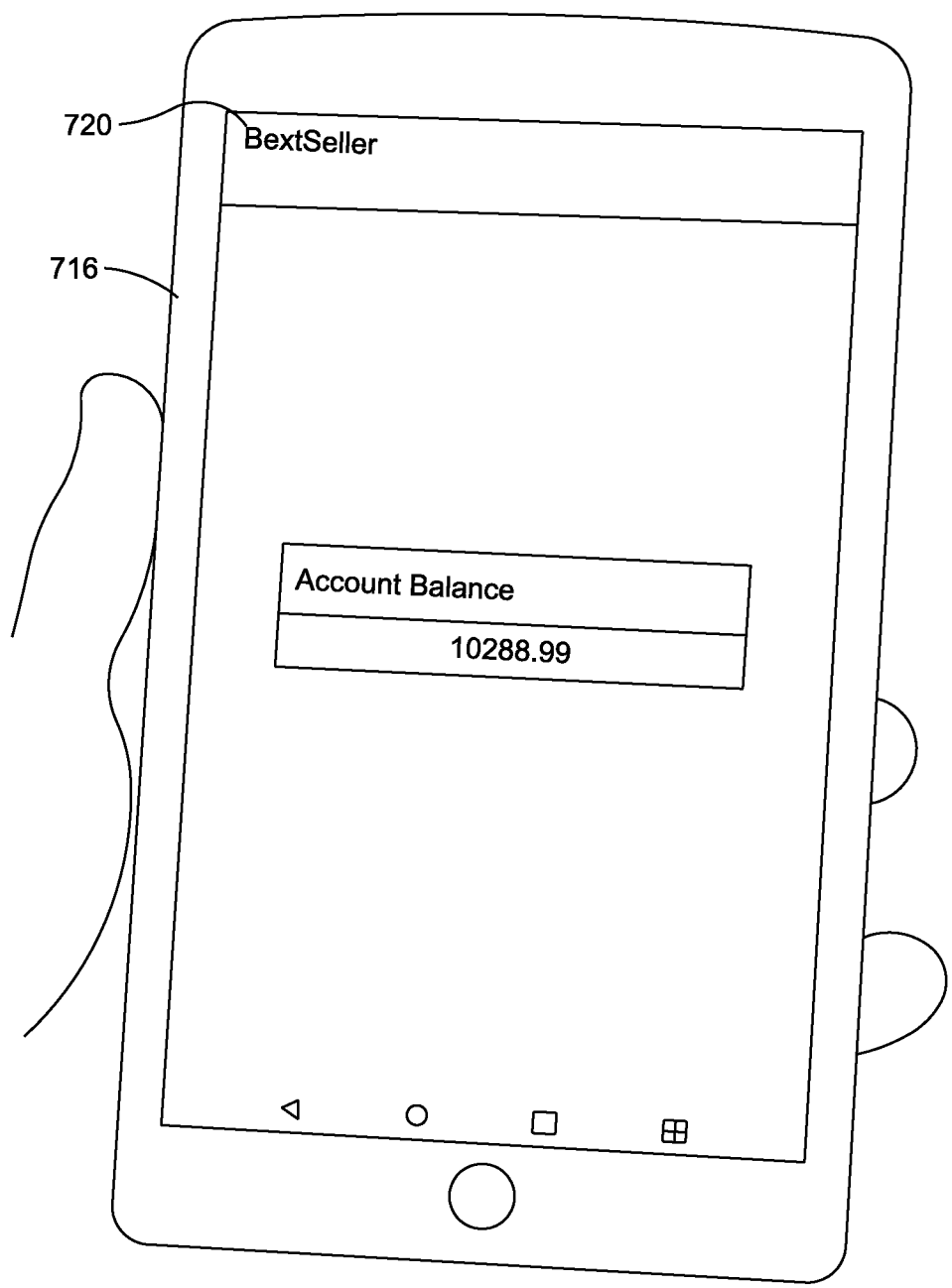

To confirm the transaction, the seller may access a number of options available via the seller application 720 including, for example, settings, account balance, transfer money, and the like. As shown in FIGS. 26O-P, the seller may review his or her account balance to ensure that the transaction was successful and that the appropriate amount of money, or proportion of the payment price, was transferred. In addition, while the value or the payment price discussed above refers to balances in USD, this amount may be represented by an equivalent amount of cryptocurrency tokens to be electronically packaged, along with other data collected during the transaction (e.g., the analysis attributes, total weight, etc.), as a transferable asset that is associated with the sold particles and moves with the particles through the subsequent supply chain, as discussed below in relation to the tracking system.

Notably, while the consumption-based resource-allocation system 700 is discussed herein in association with embodiments of the commodity analysis and collection system 100 and the commodity analysis, collection, and storage machine 500, it should be understood that the resource-allocation system 700 may include, be associated with, or be linked to any appropriate commodity or consumption-based product and/or service sales system to determine and collect a payment price in exchange for the transfer of a product or the rendering of a service and automatically and digitally disperse the payment price amongst a number of stakeholders to the sales transaction. That is, the resource-allocation system 700 may include or be linked with any type of consumption-based sales mechanism or system having one or more sensors or a sensor assembly that acquires a record of a sales transaction, i.e., that acquires data regarding a transfer of a product or a rendering of a service in the form of an intake of a product or receipt of a service or an output of a product or provision of a service in exchange for a payment price to be distributed amongst a number of stakeholders. By way of limited example, the resource-allocation system 700 may incorporate, leverage, or be linked with a vending-type food or beverage machine, a soda, beer, or other beverage tap or dispensing system, a fuel dispensing pump, a retail cash register, transportation systems such as a trucking system or a ride-for-hire system (e.g., a motorbike, a cab, a tuk tuk), and/or health-care diagnostic and/or analysis instruments or systems.

Commodity-to-Consumer Tracking System

Figure 27:
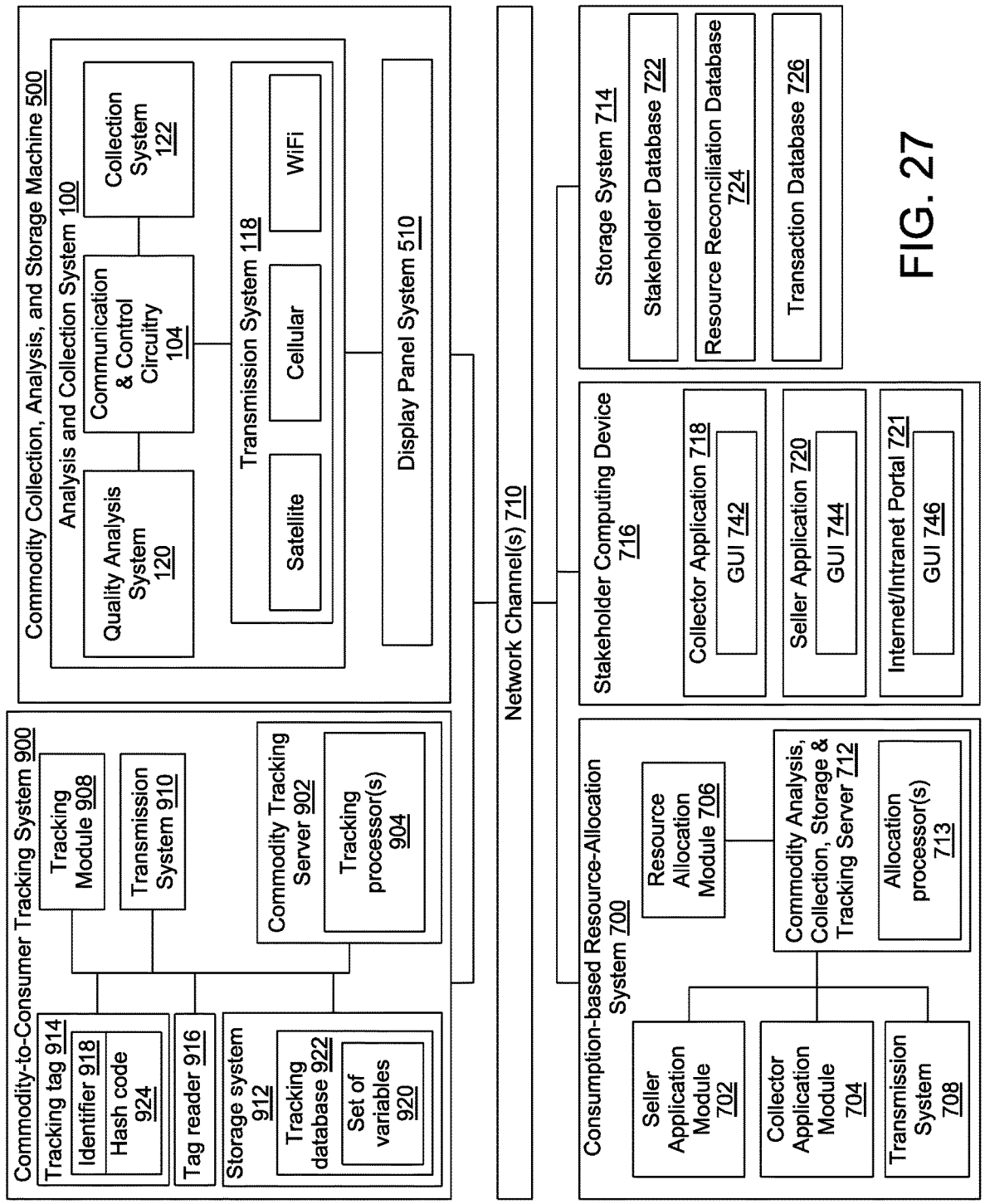
FIG. 27 provides a functional schematic of one embodiment of a commodity-to-consumer tracking system in communication with the consumption-based resource-allocation system, the commodity collection, analysis, and storage machine, the stakeholder computing device, and the storage system of FIG. 23.

In one embodiment, a commodity-to-consumer tracking system may be incorporated into or associated with embodiments of the commodity analysis and collection system 100, 300, 400, the commodity analysis, collection, and storage machine 500, 600, and/or the consumption-based resource-allocation system 700. For explanatory purposes, FIG. 27 provides a functional diagram depicting an exemplary commodity-to-consumer tracking system 900, as associated with embodiments of the machine 500, which includes one or more of the analysis and collection systems 100, and the resource-allocation system 700. The functionality of the commodity-to-consumer tracking system 900 may be combined in a single computing platform or distributed across a number of computing platforms as desired and/or necessary in various embodiments. The distribution of processing, storage, software modules, instructions and/or algorithms, and user interfaces may be distributed in any appropriate manner across any number of computing platforms that are similarly or disparately geographically situated.

In this embodiment, the tracking system 900 may include a commodity tracking server 902 having one or more tracking processors 904 configured to execute a tracking module 908 that includes instructions regarding the tracking of commodity batches at designated points along the supply chain. The tracking system 900 may be communicatively coupled with the commodity collection, analysis, and storage machine 500, the consumption-based resource-allocation system 700, the storage system 714, and the stakeholder computing device 716 via a transmission system 910 and the network/communication channels 710.

Embodiments of the tracking system 900 may be employed to track a number of variables from the point of sale at, for example, the machine 500, 600 to the point of consumption in a retail environment. The tracked commodity variables may encompass a wide array of data pertaining to the batch of commodity particles, its growth and/or harvest history, and its progression through the supply chain. In one embodiment, tracked variables are stored as a transaction record within the transaction database 726 of the storage system 714 and are available to the system 900 for lookup. In other embodiments, the tracking system 900 may include a dedicated storage system 912.

As discussed above and returning to the example of a batch of coffee cherries, the tracked variables of the transaction record may include or convey any appropriate and/or desired information relating to the batch of particles sold in a commodity transaction. For instance, the tracked commodity variables for a batch of coffee cherries may include:

(1) a batch ID;
(2) a seller ID or farmer ID;
(3) a farm ID;
(5) a cooperative ID;
(6) a country ID or region ID;

(7) harvest data including a date of harvest, a farm location (e.g., latitude and longitude), a farm altitude, growth conditions, weather history, and/or average rainfall;

(8) analysis and collection data including a date of collection at the machine 500, a location of the collector machine 500, and/or a number of analysis attributes recorded, measured, and/or calculated at the machine 500 at the time of initial collection or at any later point or node in the supply chain, such as a total weight or size of the batch, quality rating(s), a specific gravity, defect information, subsequent inspection information, and more;

(9) sales transaction-allocation data such as the payment price, price-allocation information, tax information, loan information, one or more social initiatives or social initiative entities benefiting from the transaction, a goal of each social initiative, a current amount raised by each social initiative, a status of each social initiative, an NGO administering each initiative, images and success stories associated with implementation of the initiatives, carbon credit information, and/or sustainability information;

(10) downstream supply chain data associated with any appropriate next steps or nodes in the commodity supply chain such as, for example, transport and later inspection as well as—using the example of coffee cherries—drying, cupping, wholesaling, roasting, labeling, and ultimately, a retail sale to the consumer; and/or

(11) a changing value of the batch of particles sold, expressed as a number of transferable cryptocurrency tokens, as the particles move through the nodes of the supply chain.

To accomplish the commodity-to-consumer tracking functionality discussed above, one embodiment of the tracking system 900 may include or leverage an electronic tracking tag 914 and a tag reader 916. In one embodiment, the electronic tracking tag 914 may be a read/write RFID tag (e.g., low frequency (LF), high frequency (HF), or ultra-high frequency (UHF) radio bands) that is programmed with a unique tracking identifier 918 that maps to an assigned or associated set of tracked variables 920 stored in a tracking database 922 housed within in the storage system 912, the storage system 714, or distributed across both of the storage systems 912, 714. The electronic tag 914 may be attached or affixed in any appropriate manner to the particles, including being attached to a container that houses the particles. At one or more nodes in the supply chain, the tracking tag 914 may be rewritten with an updated identifier 918 that maps to an updated set of tracked variables 920, thereby creating a continuously growing ledger of tracked variables, formed of increasing information blocks, that is linked via the identifiers 918. This tailored use of blockchain technology enables accurate and highly granular tracking of the variables 920 associated with a batch of particles 158 from the point of commodity harvest to the final sale to the consumer.

Notably, as discussed above, the tracked variables incorporate cryptocurrency tokens that represent the value of the particles initially sold and then transferred between the various nodes of the supply chain, meaning that tokens may be created and/or exchanged at each node as part of the transaction from node to node. As the value of the particles changes due to further processing (e.g., washing, drying, cupping), further analysis at additional machines 500, 600, or simply because the goods have been transported or transferred to a downstream node in the supply chain and have thus gained value because they are closer to the point of consumption, the increased value is represented in the cryptocurrency tokens assigned to particles in the growing ledger of the tracked variables 920. The cryptocurrency tokens act as a negotiable instrument attached to the particles, and in this regard, the evolving tracked variables 920 function as a fully transferable asset that may be exchanged to transact business at each node of the supply chain or any other relevant and/or desired transaction occurring outside the supply chain. Coupling the value of the particles, in a valid and exchangeable cryptocurrency, to the tracked data that conveys the analysis attributes, harvest data, downstream supply chain data, and so on, revolutionizes the concept of supply chain management. In addition to the electronic, automated, and highly-granular tracking of the particles and all of the relevant information pertaining to those particles as they progress through the supply chain, the value of the particles in transferable electronic currency is also associated with the particles, rendering the tracking variables a negotiable asset that itself can be used to transact business. The information trail, the money trail, and the actual exchangeable currency are combined to form a simple, traceable smart contract for each transaction occurring throughout the supply chain.

In one embodiment, a cryptographic hash function may be incorporated into the communications protocol (e.g., the RFID protocol) for the tracking tag 914 or applied by the tracking processor 904. The cryptographic hash function may be implemented in forming the unique tracking identifier 918 for storage on the tag 914, resulting in a hash code 924 that is infeasible to invert or reverse. In this regard, it is impossible or infeasible to recreate the input data, or the set of tracked variables 920 associated with the hash code 924, from the hash code 924 itself. Thus, the hash code 924 may be used solely for mapping to the corresponding ledger of tracked variables 920 stored securely within the tracking database 922, thereby linking and securing the blocks of data in the chain and thus securing the growing ledger the tracking data as the batch of particles progresses through the nodes of the supply chain to the end consumer.

Throughout the tracking process, all or select ones of the tracked variables 920 may be may be transmitted to the stakeholder device 716 for review by any of the stakeholders along the nodes of the supply chain, from the point of harvest to the end consumer. In one embodiment, the tracked variables 920 may be published to an Internet or intranet portal 721 implemented by the tracking server 902 and tracking module 908 and accessible through the stakeholder computing device 716. Via the Internet, the tracked variables 920 may be made available to the consuming public on a dedicated website, through a number of proprietary websites run by wholesalers, retailers, NGOs, COOPs, etc., or through a number of retailer marketing and loyalty program websites or applications. Via the private intranet network, the tracked variables 920 may be made accessible to the stakeholders to the transaction via a password protected supply-chain tracking portal. In one embodiment, the Internet/intranet portal 721 or portions thereof may be password protected with varying access permissions based on a status of a particular stakeholder accessing the portal (e.g., an end consumer vs. a commodity seller or a commodity wholesaler). In another embodiment, the tracking server 902 may implement a mobile tracking application that is web accessible or downloadable to the stakeholder device 716.

Figure 28:
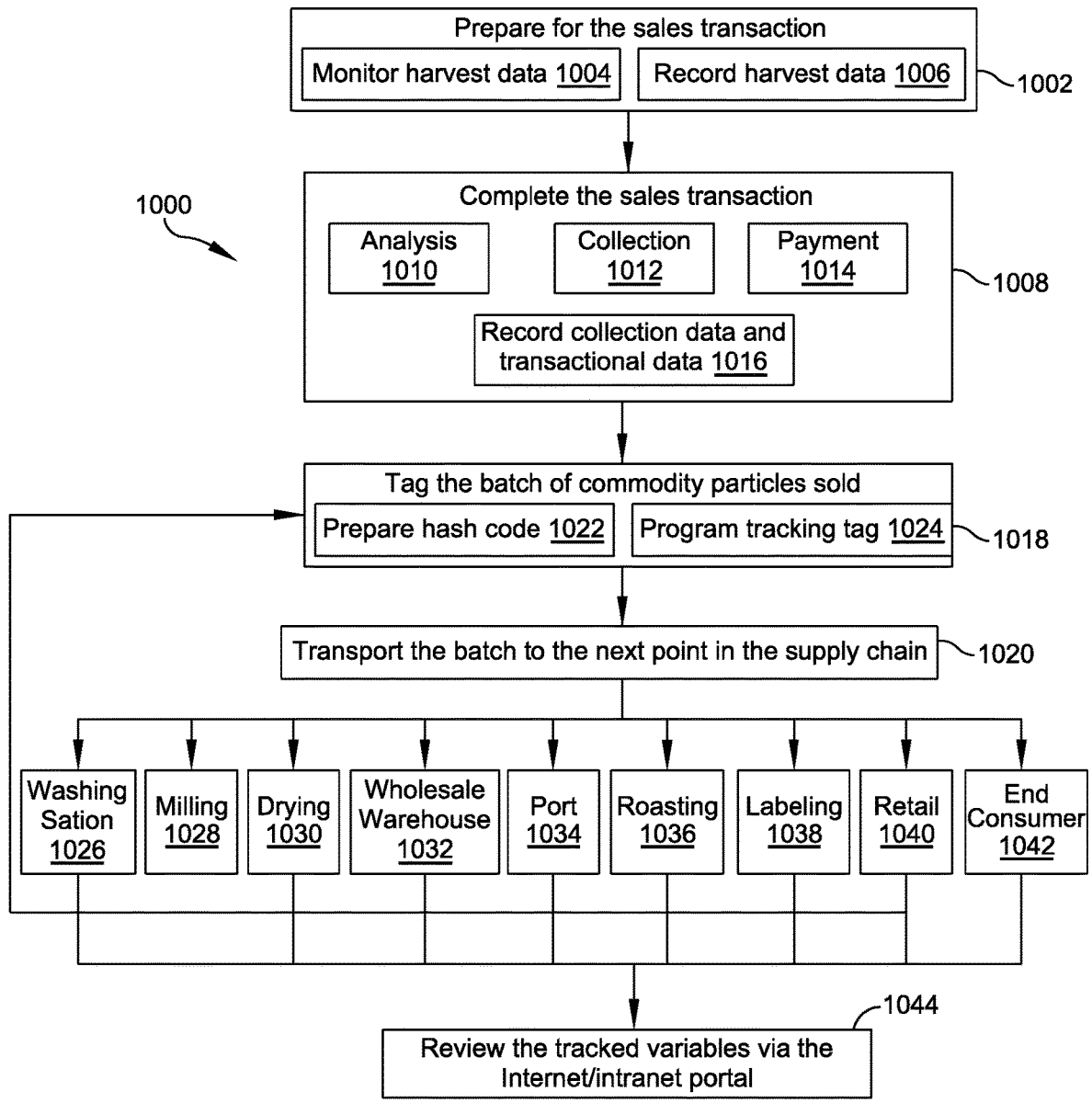
FIG. 28 provides a flowchart depicting an exemplary commodity tracking method using the commodity-to-consumer tracking system of FIG. 27.
Figure 29A:
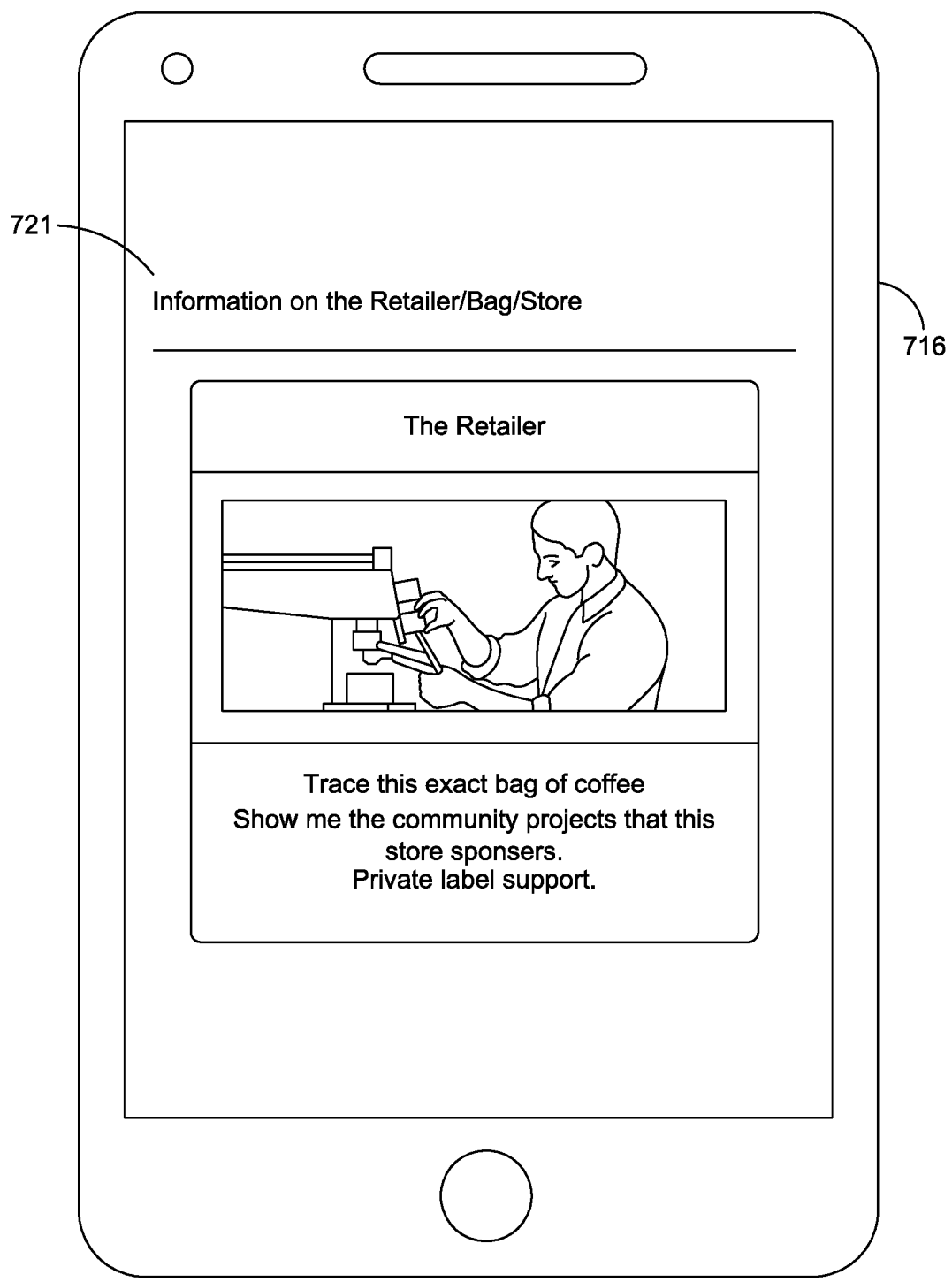
FIGS. 29A-29G illustrate a number of screenshots captured from an Internet/intranet portal providing access to information tracked via the commodity-to-consumer tracking system of FIG. 27.
Figure 29B:
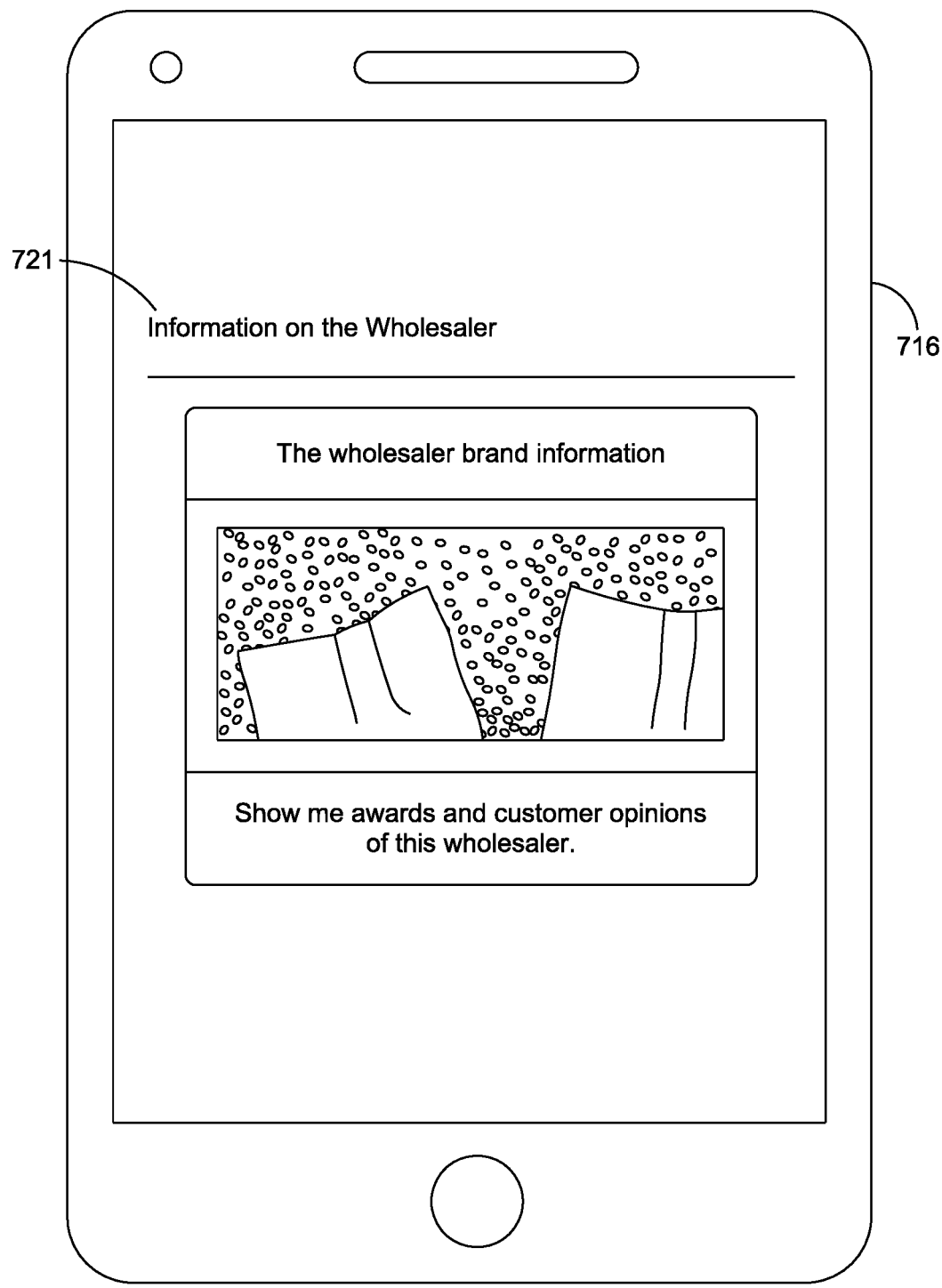
Figure 29C:
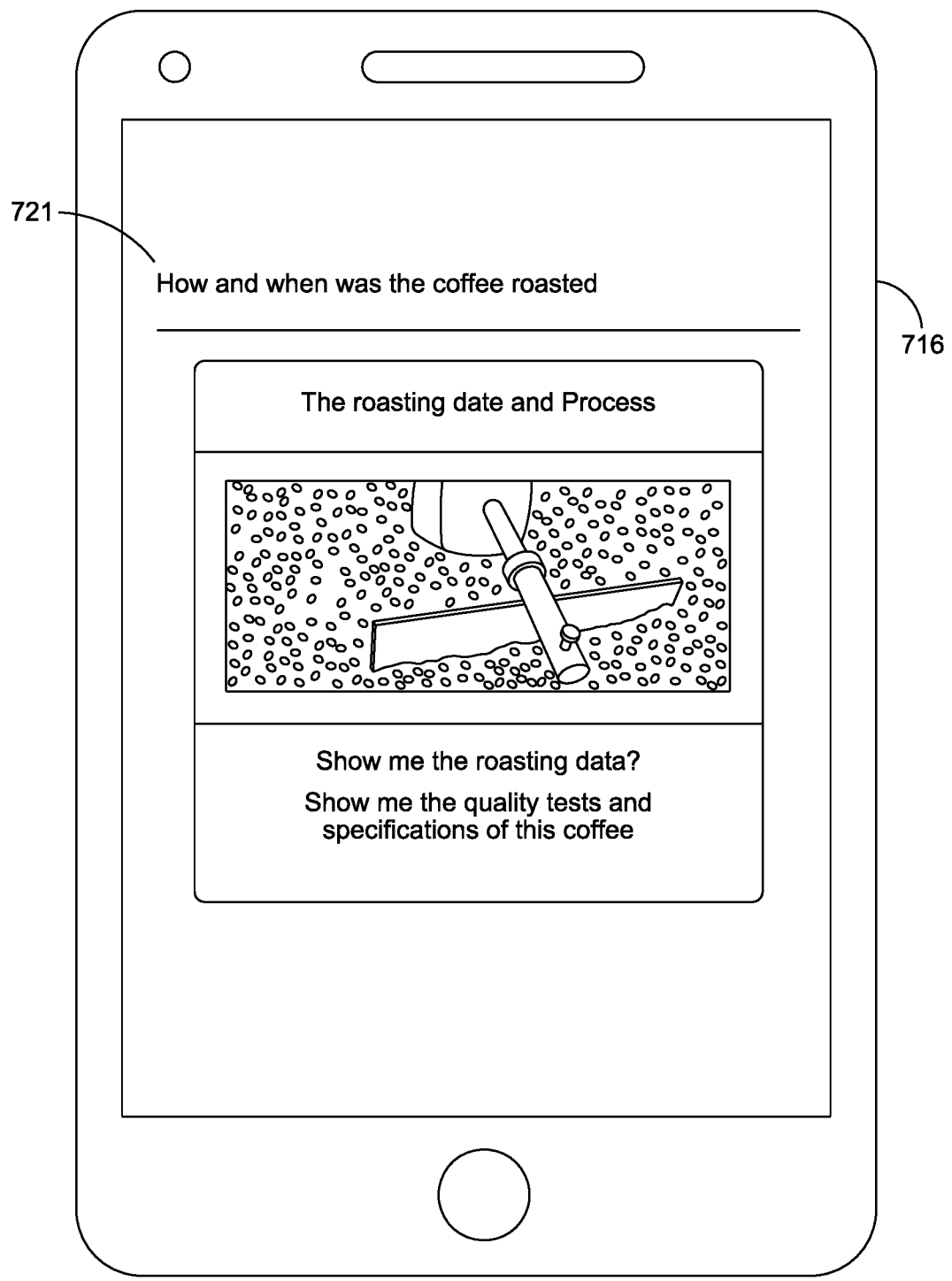
Figure 29D:
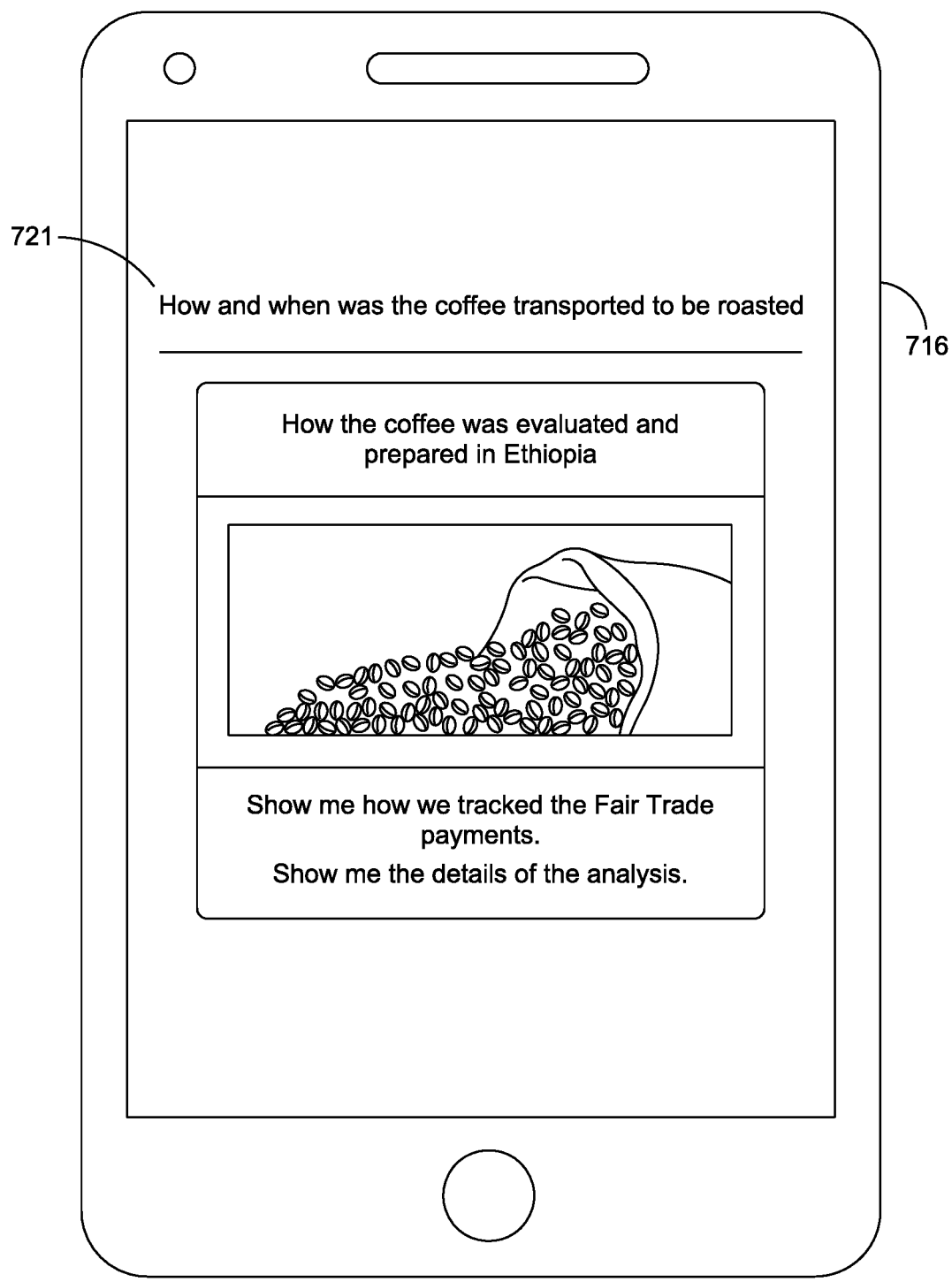
Figure 29E:
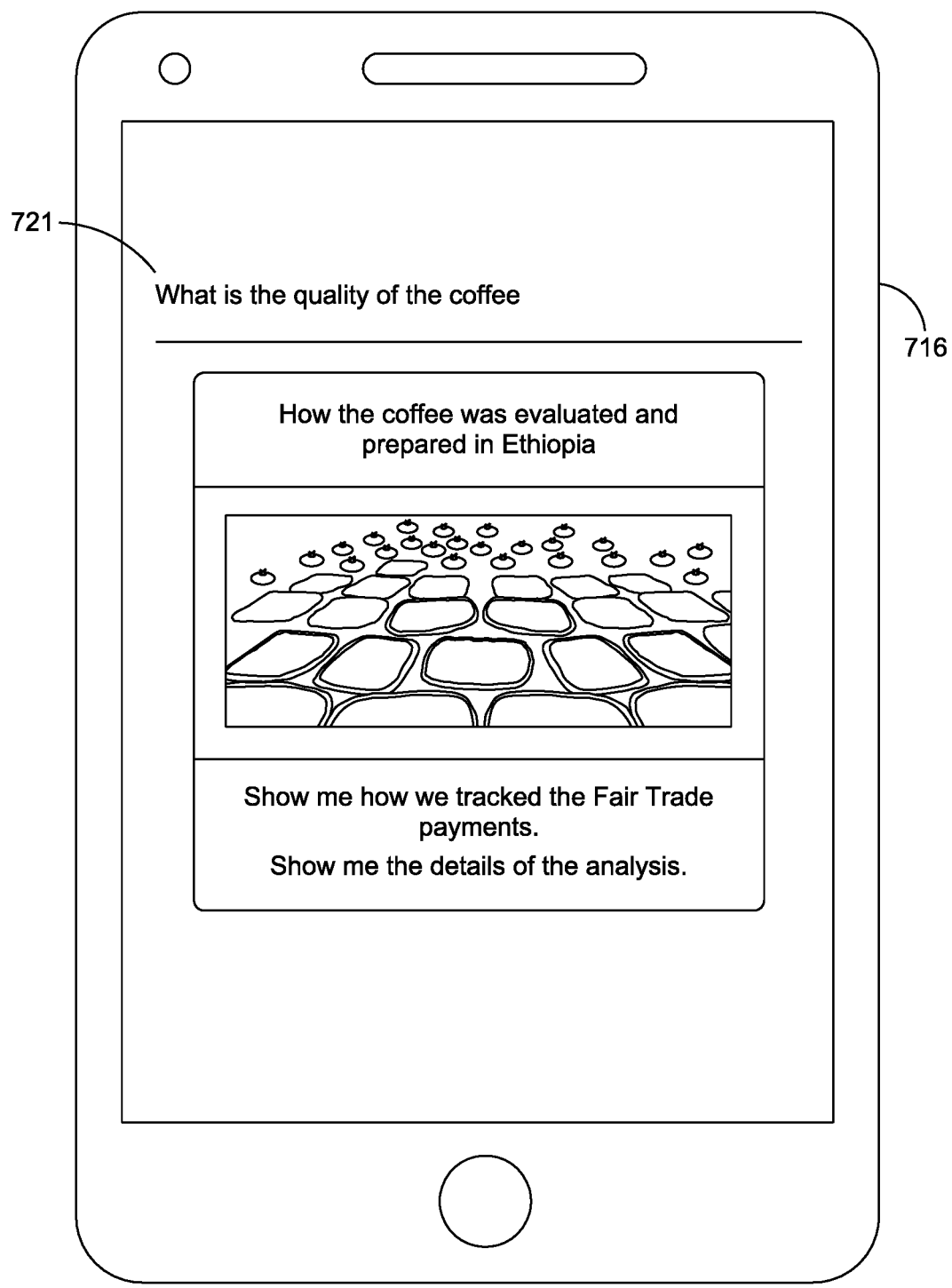
Figure 29F:
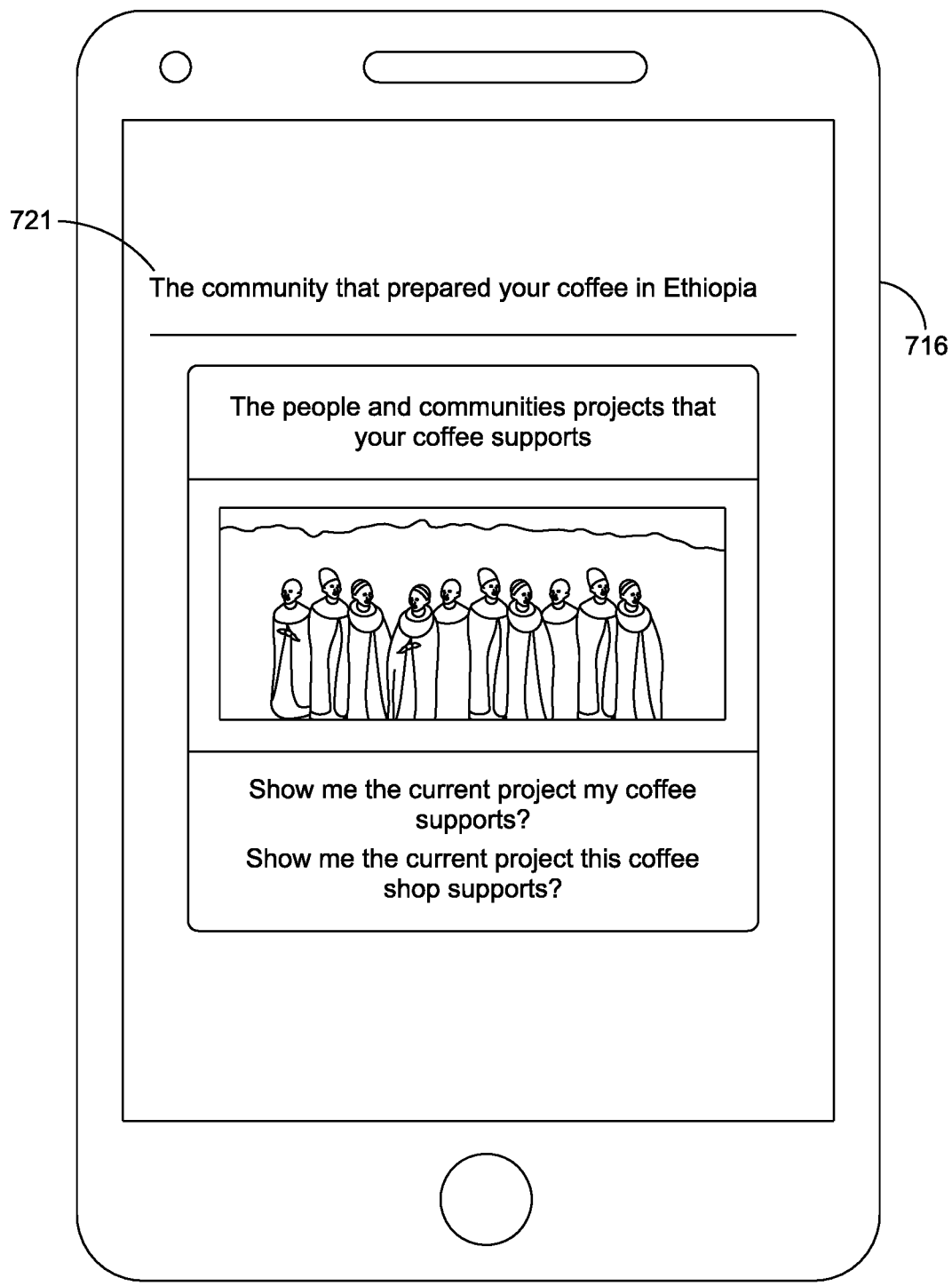
Figure 29G:
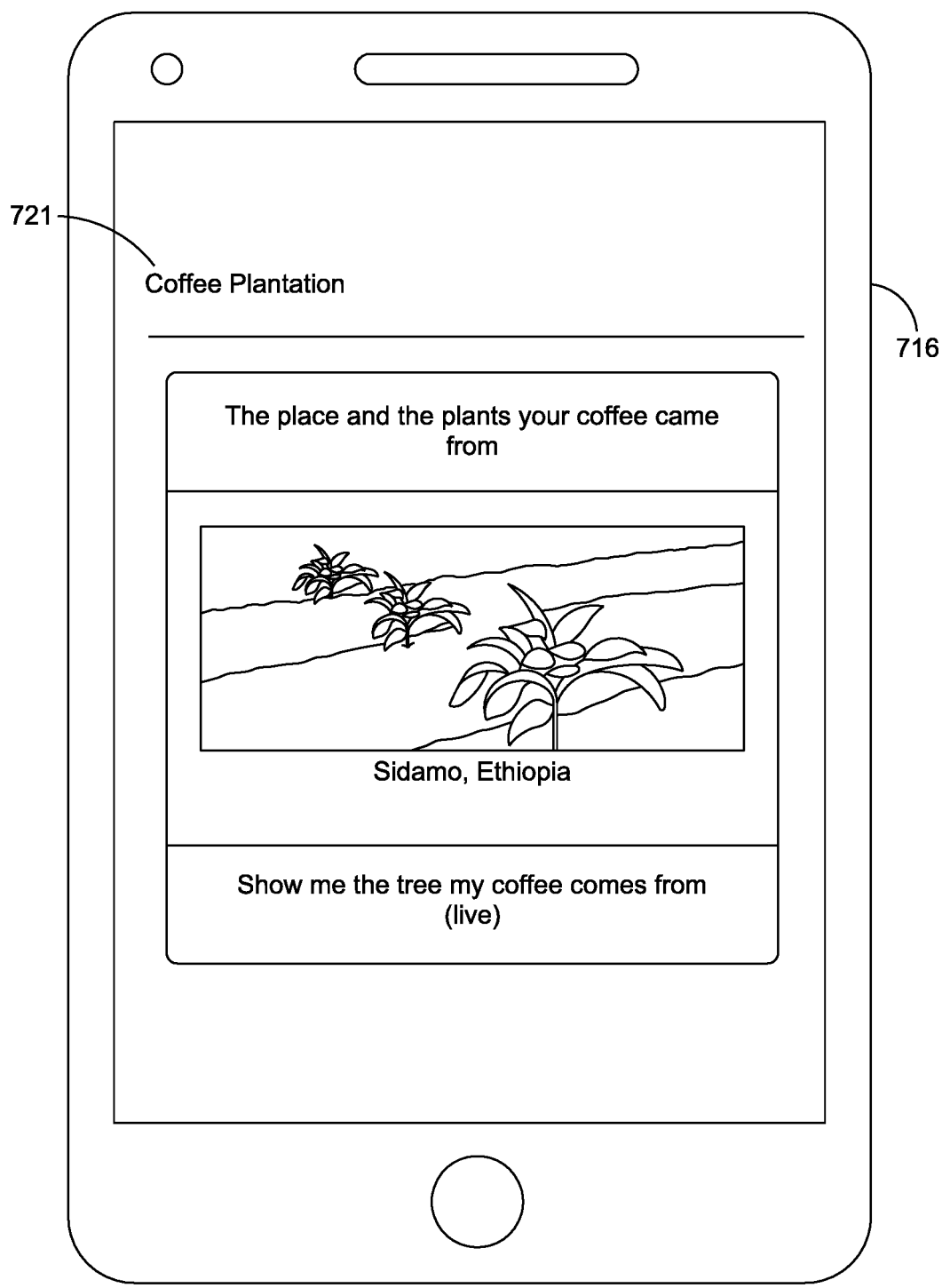

FIG. 28 provides a flowchart depicting a commodity tracking method (1000) using the commodity-to-consumer tracking system 900, discussed above, to track a batch of coffee cherries through the supply chain to the retail establishment where roasted coffee beans or prepared coffee beverages are sold to the end consumer. In this embodiment, the method (1000) initiates (1002) prior to a sales transaction of a batch of coffee cherries with the monitoring (1004) of the harvest data particular to the batch of coffee cherries and the recording (1006) the harvest data in the tracking system 900. In this regard, recording the harvest data (1006) may involve establishing the set of tracked variables 920 associated with the batch within the tracking database 922, including, for example, the date of harvest, the farm location (e.g., latitude and longitude), the farm altitude, growth conditions, weather history, average rainfall, and/or photos or video of the farm.

Next, and in this embodiment, the batch of coffee cherries may be sold (1008) by the farmer/COOP through a transaction that occurs at the commodity collection, analysis, and storage machine 500, 600. The sales transaction (1008) may involve an analysis (1010) of the batch, collection (1012) of the acceptable coffee cherries, and a digital payment (1014) of the total payment price for the batch, divided amongst all of the stakeholders to the transaction via the consumption-based resource-allocation system 700. The sales transaction (1008) may also involve recording the collection data and the transaction-allocation data (1016) associated with the transaction within the set of tracked variables 920 associated with the batch. As discussed above, the collection data may include, for example, a date of collection at the machine 500, 600, a location of the collector machine 500, 600, and/or a number of analysis attributes recorded, measured, and/or calculated by the commodity analysis and collection system 100, 300, 400 at the machine 500, 600 such as a total weight or size of the batch, quality rating(s), specific gravity, defect information, and more. The transaction-allocation data may include information such as the payment price, payment price allocation information, tax information, loan information, one or more social initiatives or social initiative entities benefiting from the transaction, a goal of each social initiative, a current amount raised by each social initiative, a status of each social initiative, an NGO administering each initiative, and/or images and success stories associated with implementation of the initiatives.

After the sales transaction (1008) is complete, the batch of collected coffee cherries may be tagged (1018) prior to transport (1020) to the next point in the supply chain. The step of tagging (1018) may, in this embodiment, involve applying a cryptographic hash function to the set of tracked variables 920 to prepare the hash code 924 (1022), which may be programmed or written onto the tracking tag 914 (e.g., a RFID tracking tag) using the tag reader 916 (1024). One tag 914 may be attached to the entire batch or to smaller portions thereof as appropriate.

The steps of tagging the batch (1018) and transporting the tagged batch 1020 may be repeated after each additional point in the supply chain, when a new and/or updated set of tracked variables 920 may be cryptographically hashed (1022) and written to the tracking tag (1024), thereby incorporating downstream supply-chain data and metrics into the tracked variables using blockchain principals and technology. In this embodiment for tracking coffee cherries, additional points in the supply chain may include washing (1026), milling (1028), drying (1030), wholesaling (1032), one or more shipping ports (1034), roasting (1036), labeling (1038), and transfer to a retail establishment (1040) before, ultimately, the coffee is sold to an end consumer (1042) in bean or beverage form.

Throughout the supply chain and the tracking process (1000), and depending on the access privileges granted to the stakeholder(s) at each point in the supply chain, the stakeholder(s) may also access the tracking system 900 via the Internet/intranet portal 721 available through the stakeholder computing device 716 to review one or more of the tracked variables associated with the tracked batch (or the relevant portion of the batch) at the various points along the supply chain (1044).

While the tracking method 900 of FIG. 28 is presented in terms of tracking a batch of coffee cherries from its associated pre-sale activities, through an initial sales transaction at the machine 500, 600, and through the supply chain to the end consumer, it should be understood that the method 900 or similar methods may apply to tracking key variables associated with the initial sales transaction and subsequent transactions in the supply chain for any commodity such as, for example, cocoa, nuts, fruits, vegetables, rice, wheat or other grains, soybeans, sugar, palm oil or other oils, seafood, crude oil, gold or silver, columbite-tantalite ("coltan"), and/or any other traceable commodity transaction, sold using or independent of embodiments of the machine 500, 600, discussed above.

The tracking system 900 and associated exemplary method (1000) provide true traceability of product analysis data for each batch of particles and link that traceability data with subsequently collected downstream metrics such as, for example, taste, yield, roasting time, processing time, brew quality, demand, product reviews, and retail price. The system 900 and method (1000) inject transparency, traceability, and accountability into every stage or transaction of the supply chain, which may serve as a feedback loop that enables and informs buyers and allows the various stakeholders to direct future decision-making paths to improve the quality of the commodity product and benefit the communities that provide the product.

To demonstrate an exemplary consumer experience, FIGS. 29A-G provide a number of sample screenshots illustrating a GUI 746 of the Internet/intranet portal 721 available through the end consumer's computing device 716, as made accessible for interaction with a coffee consumer at a retail establishment. The consumer may gain access to the portal 721 in any appropriate manner including, for example, through a link provided on a paper or electronic sales receipt, in an email or text sent as part of the retailer's rewards program, via an electronic or social media advertisement or banner, or through labeling placed on the consumer packaging. As shown in FIGS. 29A-G, the portal 721 may provide information relating to the retailer, the wholesaler, the roasting process, transport dates, coffee quality, the community within which the coffee was grown and harvested, and the coffee plantation that produced the coffee. Additional information provided through the portal 721 may relate to any appropriate variable that is tracked using the system 900, from growth and harvest, through sale, and through all the subsequent points in the supply chain.

While FIGS. 29A-G illustrate exemplary screenshots for review by the end consumer, the Internet/intranet portal 721 may be configured for a variety of stakeholders and present tailored information that is relevant to each, from the seller to the end consumer and every stakeholder therebetween including, for example, the collector, associated social initiative entities, relevant governing bodies, the lending financial institution, the washer, the miller, the dryer, the cupper, the wholesaler, various transport companies, various port authorities, the roaster, any label and packaging companies, and the retailer. Additionally, the stakeholders to the transaction may vary depending on the type and nature of the commodity supply chain being tracked.

Although the above embodiments have been described in language that is specific to certain structures, elements, compositions, and methodological steps, it is to be understood that the technology defined in the appended claims is not necessarily limited to the specific structures, elements, compositions and/or steps described. Rather, the specific aspects and steps are described as forms of implementing the claimed technology. Since many embodiments of the technology can be practiced without departing from the spirit and scope of the invention, the invention resides in the claims hereinafter appended.

What is claimed is:

1. A system for analyzing a quality of a batch of commodity particles, comprising:
   a material hopper having an inlet and an outlet, the inlet configured to receive the batch of the commodity particles;
   a vibratory assembly, comprising:
      a vibratory input feeder; and
      a vibratory plate having a proximal end and a distal end, the vibratory plate positioned to receive at the proximal end a continuous stream of the commodity particles exiting the outlet of the material hopper, the vibratory input feeder configured to vibrate the vibratory plate, causing the vibratory plate to repeatedly apply a vibrational force to each of the commodity particles on the vibratory plate, thereby translating each of the commodity particles toward the distal end of the vibratory plate by an incremental displacement with each application of the vibrational force;
   a first imaging assembly comprising a first camera, the first imaging assembly configured to capture a first image set of each of the commodity particles as the each of the commodity particles translate from the proximal end toward the distal end of the vibratory plate;
   a second imaging assembling comprising second and third cameras, the second imaging assembly configured to capture second and third image sets of each of the commodity particles as the each of the commodity particles free fall from the distal end of the vibratory plate; and
   one or more processors communicatively coupled with the vibratory assembly, the first imaging assembly, and the second imaging assembly, the one or more of the processors executing an analysis and collection module that uses the first, the second, and the third image sets, along with the vibrational force applied to each of the commodity particles, to perform a quality analysis for each of the commodity particles.

2. The system of claim 1, wherein the quality analysis includes a determination, for each of the commodity particles, of the incremental displacement in response to the vibrational force, a time over which the incremental displacement occurs, a velocity of the incremental displacement, a momentum, a volume, a mass, a density, and a presence of one or more internal defects.

3. The system of claim 2, wherein the quality analysis further includes an optical assessment, for each of the commodity particles, of a size consistency, a color, a color consistency, and a presence of one or more extrinsic defects.

4. The system of claim 3, wherein the one or more of the processors execute the analysis and collection module to determine, based upon the quality analysis for each of the commodity particles and a number of threshold quality limits, whether each of the commodity particles is an acceptable particle or a defective particle.

5. The system of claim 4, further comprising a number of air jet nozzles positioned downstream from the second imaging assembly, wherein aligned ones of the air jet nozzles cycle to divert the defective particles from the continuous stream of the commodity particles.

6. The system of claim 5, wherein the quality analysis further includes a determination, based on the mass of each of the acceptable particles, of a total weight of the acceptable particles.

7. The system of claim 6, wherein the quality analysis further includes a classification of all or a proportion of the acceptable particles according to one or more predefined quality ratings.

8. The system of claim 1, wherein the batch of commodity particles comprises a batch of coffee cherries.

9. An optical-sorting system for commodity particles, the optical-sorting system having a quality analysis system, the quality analysis system comprising:
   a vibratory plate having a proximal end in receipt of a stream of the commodity particles and a distal end, the vibratory plate configured to repeatedly apply a vibratory force to the stream of the commodity particles to translate each of the commodity particles proximally-to-distally through incremental displacements of each of the commodity particles in response to each application of the vibratory force;
   at least two cameras configured to capture a series of images of each of the commodity particles translating proximally-to-distally across the vibratory plate and falling from the distal end of the vibratory plate; and
   a processor communicatively coupled with the at least two cameras, the processor executing an analysis and collection module to:
      based on data collected from the series of the images and the vibratory force applied to the commodity particles translating across the vibratory plate, determine a number of analysis attributes associated with each of the commodity particles; and
      based on the number of the analysis attributes, sort each of the commodity particles into acceptable particles that are retained or defective particles that are rejected;
      wherein the analysis attributes include a volume of each of the commodity particles, a mass of each of the commodity particles, a density of each of the commodity particles, a color of each of the commodity particles, a color consistency of each of the commodity particles, a shape of each of the commodity particles, a shape consistency of each of the commodity particles, a presence of one or more extrinsic defects associated with each of the commodity particles, and a presence of one or more intrinsic defects associated with each of the commodity particles;
      further comprising a good product chute configured to deliver the acceptable particles from the analysis system to a collection system, the collection system comprising a weigh hopper mount supporting a weigh hopper above a weigh scale lift assembly, the weigh scale lift assembly having a weigh scale lift and a weigh scale, wherein:
      the acceptable particles exit the good product chute into the weigh hopper, and the weigh scale lift is configured to rise vertically until the weigh hopper is fully supported upon the weigh scale such that the weigh scale registers a total weight of the acceptable particles within the weigh hopper.

10. The optical-sorting system of claim 9, further comprising:
an array of air jet nozzles positioned at an outlet of the analysis system; and
a reject chute, wherein a select one of the air jet nozzles activates to divert each of the defective particles from the analysis system into the reject chute.

11. The optical-sorting system of claim 9, wherein the processor further executes the analysis and collection module to determine, based on the analysis attributes of each of the acceptable particles and the total weight of the acceptable particles, one or more quality ratings associated with the acceptable particles.

12. The optical-sorting system of claim 9, wherein the commodity particles are coffee cherries.

13. A method for analyzing a batch of commodity particles using a quality analysis system including (1) a vibratory assembly including a vibratory input feeder coupled with a vibratory plate having a proximal end and a distal end, (2) a material hopper positioned to feed material to the proximal end of the vibratory plate, (3) an overhead imaging assembly having a first camera positioned to view a first image-capture zone located on a top surface of the vibratory plate, (4) an imaging box assembly having a distally-facing second camera and a proximally-facing third camera positioned to view a second image-capture zone located below the distal end of the vibratory plate, and (5) a processor communicatively coupled with the vibratory assembly, the overhead imaging assembly, and the imaging box assembly, the processor configured to execute an analysis and collection module, the method comprising:
dispensing a batch of commodity particles into the material hopper;
actuating the vibratory input feeder to repeatedly generate a vibratory force that is applied by the vibratory plate to the commodity particles exiting the material hopper onto the proximal end of the vibratory plate, causing the commodity particles to translate proximally-to-distally across the vibratory plate;
using the overhead imaging assembly, capturing a first set of images of each of the commodity particles as the commodity particles move through the first image-capture zone;
using the imaging box assembly, capturing second and third sets of images of each of the commodity particles after the commodity particles fall from the distal end of the vibratory plate and move through the second image-capture zone; and
using the processor along with the analysis and collection module, analyzing each of the commodity particles to determine a number of analysis attributes associated with each of the commodity particles;
wherein the analysis attributes include an incremental displacement of each of the commodity particles in response to the vibrational force, a time over which the incremental displacement occurs, a velocity of the incremental displacement, a momentum of each of the commodity particles, a volume of each of the commodity particles, a mass of each of the commodity particles, a density of each of the commodity particles, and a presence of one or more intrinsic defects within each of the commodity particles.

14. The method of claim 13, wherein the analysis attributes further include a size consistency of each of the commodity particles, a color of each of the commodity particles, a color consistency of each of the commodity particles, and a presence of one or more extrinsic defects upon each of the commodity particles.

15. The method of claim 14, further comprising using the processor along with the analysis and collection module, and based on one or more of the mass, the density, and the presence of the one or more of the intrinsic defects associated with each of the commodity particles, making a determination regarding whether each of the commodity particles is a defective particle or an acceptable particle.

16. The method of claim 15, further comprising, using the processor along with the analysis and collection module and based on the analysis attributes associated with each of the commodity particles, assigning a quality rating to all or a proportion of the acceptable particles.

17. The method of claim 16, further comprising:
cycling an aligned one of a number of air jet nozzles positioned at an outlet of the imaging box assembly to divert each of the defective particles to a reject chute; and
collecting each of the acceptable particles in a collection and weigh system via a good product chute.

* * * * *